US012763561B2

(12) United States Patent
Saline

(10) Patent No.: US 12,763,561 B2
(45) Date of Patent: Oct. 13, 2026

(54) POWER POST

(71) Applicant: Hubbell Incorporated, Shelton, CT (US)

(72) Inventor: Lon Benjamin Saline, Gilbert, AZ (US)

(73) Assignee: Hubbell Incorporated, Shelton, CT (US)

(*) Notice: Subject to any disclaimer, the term of this patent is extended or adjusted under 35 U.S.C. 154(b) by 309 days.

(21) Appl. No.: 18/191,180

(22) Filed: Mar. 28, 2023

(65) Prior Publication Data

US 2023/0238788 A1 Jul. 27, 2023

Related U.S. Application Data

(63) Continuation of application No. PCT/US2021/052599, filed on Sep. 29, 2021.

(60) Provisional application No. 63/094,482, filed on Oct. 21, 2020, provisional application No. 63/084,629, filed on Sep. 29, 2020.

(51) Int. Cl.
*H02G 3/08* (2006.01)

(52) U.S. Cl.
CPC ............. *H02G 3/081* (2013.01); *H02G 3/088* (2013.01)

(58) Field of Classification Search
CPC ............ H02G 3/08; H02G 3/081; H02G 3/14; H02G 3/121; H02G 3/18; H02G 3/088; H02G 3/0493; H01R 13/5213; H01R 13/717; H05K 5/00; H05K 5/02; E04C 1/39
USPC ............... 174/50, 37, 60, 53, 57, 58, 38, 39; 220/3.2, 3.3, 3.8, 4.02; 248/906
See application file for complete search history.

(56) References Cited

U.S. PATENT DOCUMENTS

| | | | | |
|---|---|---|---|---|
| 991,913 | A | 5/1911 | Engeln | |
| 2,135,389 | A | 11/1938 | Dempsey | |
| 2,723,385 | A | 11/1955 | Benander | |
| 3,147,338 | A | 9/1964 | Ekvall | |
| 3,257,496 | A * | 6/1966 | Douglas | F21V 23/00 174/45 R |
| 3,334,770 | A | 8/1967 | Stanback | |
| 3,343,996 | A | 9/1967 | Micksch | |
| 3,872,234 | A * | 3/1975 | Smith | H02G 9/10 174/50 |
| 4,015,397 | A | 4/1977 | Flachbarth | |
| 4,365,108 | A * | 12/1982 | Bright | H05K 5/03 52/169.9 |
| 4,543,007 | A | 9/1985 | Quiogue | |
| 5,183,406 | A | 2/1993 | Glen | |

(Continued)

FOREIGN PATENT DOCUMENTS

| | | | |
|---|---|---|---|
| CN | 1445095 | A | 10/2003 |
| CN | 108350703 | A | 7/2018 |
| WO | 2012006735 | A1 | 1/2012 |

OTHER PUBLICATIONS

Stutz "Why Use Press Fittings? The Top 5 Reasons" Feb. 16, 2018, Retrieved from URL:ferguson.com/content/trade-talk/tricks-of-the-trade/why-use-press-fittings.

*Primary Examiner* — Angel R Estrada
(74) *Attorney, Agent, or Firm* — Ruggiero McAllister & McMahon LLC

(57) ABSTRACT

A post for holding an electrical device includes a body having an interior volume to hold the electrical device and a cover that is slidable on the body between an open position to access the volume and a closed position covering the volume.

23 Claims, 49 Drawing Sheets

(56) References Cited

U.S. PATENT DOCUMENTS

| | | | | |
|---|---|---|---|---|
| D342,233 | S | 12/1993 | Berlin | |
| D372,018 | S | 7/1996 | Byrne | |
| 5,586,742 | A * | 12/1996 | Carter | F21V 21/0824 52/156 |
| D395,283 | S | 6/1998 | Monaco | |
| 5,867,371 | A | 2/1999 | Denzene | |
| D424,524 | S | 5/2000 | Guercio | |
| D434,001 | S | 11/2000 | Sayger | |
| 6,300,570 | B1 | 10/2001 | Lai | |
| 6,455,772 | B1 | 9/2002 | Leschinger et al. | |
| 6,457,843 | B1 | 10/2002 | Kester et al. | |
| D473,518 | S | 4/2003 | Hellwig et al. | |
| 6,585,221 | B1 | 7/2003 | Gretz | |
| 6,598,949 | B2 * | 7/2003 | Frazier | H01R 13/6397 312/263 |
| 6,669,492 | B1 | 12/2003 | McIlvenna | |
| 6,736,486 | B2 | 5/2004 | Nakamura et al. | |
| 6,742,748 | B1 | 6/2004 | Gretz | |
| 6,752,362 | B1 | 6/2004 | Gretz | |
| 6,779,764 | B1 | 8/2004 | Gretz | |
| 6,831,222 | B2 | 12/2004 | Pastuch | |
| 6,863,251 | B1 | 3/2005 | Gretz | |
| 6,915,992 | B1 | 7/2005 | Gretz | |
| D517,481 | S | 3/2006 | Nipke | |
| 7,025,311 | B1 | 4/2006 | Gretz | |
| 7,036,960 | B1 | 5/2006 | Gretz | |
| 7,163,409 | B1 | 1/2007 | Chen et al. | |
| 7,234,670 | B1 | 6/2007 | Gretz et al. | |
| 7,246,929 | B2 | 7/2007 | Schuster | |
| D569,545 | S | 5/2008 | Shuster | |
| D573,096 | S | 7/2008 | Guercio | |
| D580,870 | S | 11/2008 | Guercio | |
| 7,598,453 | B1 | 10/2009 | Shotey | |
| D608,731 | S | 1/2010 | Amit | |
| D608,733 | S | 1/2010 | Smith | |
| 7,700,874 | B2 * | 4/2010 | Maloney | H02B 1/50 174/37 |
| 7,807,924 | B2 * | 10/2010 | Wurzer | H02G 3/0493 174/45 R |
| 7,862,210 | B2 | 1/2011 | Zhang et al. | |
| 7,886,492 | B2 | 2/2011 | Kelly et al. | |
| 8,089,747 | B2 * | 1/2012 | Storck | H02G 3/0493 174/59 |
| 8,110,743 | B2 * | 2/2012 | Drane | H02G 3/14 174/67 |
| D669,856 | S | 10/2012 | Rosendahl | |
| D671,397 | S | 11/2012 | McLaughlin | |
| 8,668,347 | B2 | 3/2014 | Ebeling | |
| D718,241 | S | 11/2014 | Gretz | |
| 9,048,636 | B2 | 6/2015 | Borden et al. | |
| D736,016 | S | 8/2015 | Gelissen | |
| D745,680 | S | 12/2015 | Gelissen | |
| 9,385,514 | B2 * | 7/2016 | Dively | H02G 3/0493 |
| D768,577 | S | 10/2016 | Elbaz | |
| 9,614,359 | B2 * | 4/2017 | Drane | H02G 3/086 |
| D792,614 | S | 7/2017 | Thomas | |
| D799,421 | S | 10/2017 | Hernandez | |
| D810,699 | S | 2/2018 | Velez | |
| 10,276,319 | B1 | 4/2019 | Birdsong | |
| 10,415,809 | B2 | 9/2019 | Agus | |
| 10,869,401 | B1 | 12/2020 | Thompson et al. | |
| D922,952 | S | 6/2021 | Alexander | |
| D947,414 | S | 3/2022 | Newman | |
| 11,387,596 | B1 * | 7/2022 | Smith | H01R 13/5213 |
| D1,004,552 | S | 11/2023 | Saline | |
| D1,013,639 | S | 2/2024 | Saline | |
| D1,044,734 | S | 10/2024 | Saline | |
| 2003/0209356 | A1 | 11/2003 | Schenk | |
| 2005/0103780 | A1 | 5/2005 | Maloney et al. | |
| 2006/0160384 | A1 | 7/2006 | Brazina | |
| 2007/0284370 | A1 | 12/2007 | Dively | |
| 2010/0051310 | A1 | 3/2010 | Wurzer | |
| 2010/0237757 | A1 | 9/2010 | Wakileh et al. | |
| 2013/0032594 | A1 | 2/2013 | Smith | |
| 2020/0011516 | A1 | 1/2020 | Agus | |
| 2020/0116318 | A1 | 4/2020 | Bembridge et al. | |
| 2024/0178642 | A1 * | 5/2024 | Beristany | H02G 3/081 |

* cited by examiner

POWER POST

CROSS REFERENCE TO RELATED APPLICATIONS

This application is a continuation of International Application PCT/US2021/052599 filed Sep. 29, 2021, which claims the benefit under 35 USC § 119 of U.S. Patent Application Ser. No. 63/084,629 filed Sep. 29, 2020 and U.S. Patent Application Ser. No. 63/094,482 filed Oct. 21, 2020, the entire contents of all of which are incorporated herein by reference.

BACKGROUND

1. Field of the Invention

The present disclosure is related to landscaping posts for electrical devices. More particularly, the present disclosure is related to landscaping posts for electrical devices that house electrical devices in such a way as to hide the electrical device inside the post while maintaining while-in-use weatherproof requirements. In addition, the present disclosure allows for the posts to serve multiple purposes via interchangeable covers that, while providing the protection for the internal electrical device, incorporate accessory features such as, but not limited to, path, area, spotlights and wireless speakers.

2. Description of Related Art

Users such as electricians or do-it-yourself individuals working on a home or landscaping have the need to install low profile weatherproof electrical devices in an outdoor setting, such as a landscaping path or garden. Current options for while-in-use (WIU) posts for electrical devices in landscaping, sometimes referred to as Bollards, provide the electrical device with cumbersome unsightly flip covers. These designs conventionally include a bulky flip cover design. These WIU posts conventionally also have limited functionality.

Accordingly, it has been determined by the present disclosure that there is a continuing need for a post that overcomes, alleviates, and/or mitigates one or more of the aforementioned and other deleterious effects of prior devices.

SUMMARY

The present disclosure provides an improved landscaping post having a sleek slide cover that provides weatherproof WIU protection.

The present disclosure also provides an aesthetically designed weatherproof and while-in-use post with interchangeable heads providing different applications that can be utilized for, including but not limited to, path, spot, area lights and wireless speakers.

A post for holding an electrical device is provided that includes a body having an interior volume to hold the electrical device and a cover that is slidable from the body between an open position to access the volume and a closed position covering the volume.

In some embodiments either alone or together with any one or more of the aforementioned and/or after-mentioned embodiments, the cover is removably connected to the post.

In some embodiments either alone or together with any one or more of the aforementioned and/or after-mentioned embodiments, a plurality of different covers are connectable to the body so that the post has interchangeable covers.

In some embodiments either alone or together with any one or more of the aforementioned and/or after-mentioned embodiments, the cover further comprises a second electrical device that is selected from a group consisting of a wireless speaker, a Bollard style LED light, a Pagoda Style Path light, an area path light, and any combinations thereof.

In some embodiments either alone or together with any one or more of the aforementioned and/or after-mentioned embodiments, the cover has a top wall and a side wall that extends from the top wall.

In some embodiments either alone or together with any one or more of the aforementioned and/or after-mentioned embodiments, the body is a base connected to a top member.

In some embodiments either alone or together with any one or more of the aforementioned and/or after-mentioned embodiments, the top member has a sidewall surrounding an interior that has an open front portion.

In some embodiments either alone or together with any one or more of the aforementioned and/or after-mentioned embodiments, the top member has a plurality of tracks on an exterior of the sidewall.

In some embodiments either alone or together with any one or more of the aforementioned and/or after-mentioned embodiments, the cover has an interior surface and an exterior surface, and the interior surface of the cover has a plurality of ridges that mate with the plurality of tracks of the top member.

In some embodiments either alone or together with any one or more of the aforementioned and/or after-mentioned embodiments, the plurality of tracks are each formed between two ridges on a sidewall of the top member.

In some embodiments either alone or together with any one or more of the aforementioned and/or after-mentioned embodiments, the interior surface of the cover has a plurality of protuberances, and the top member has a plurality of top walls each between adjacent pair of tracks so that the plurality of protuberances are each urged against one of the plurality of top walls to pass over the one of the plurality of top walls so that the cover connects to the top member.

In some embodiments either alone or together with any one or more of the aforementioned and/or after-mentioned embodiments, the cover is disconnected from the top member by applying a sufficient force to the cover moving the cover away from the base to urge the plurality of protuberances over the one of the plurality of top walls.

In some embodiments either alone or together with any one or more of the aforementioned and/or after-mentioned embodiments, the interior is accessible through the open front portion for installing/operating/removing the electrical device.

In some embodiments either alone or together with any one or more of the aforementioned and/or after-mentioned embodiments, the top member has depression in a top connection portion that connects to the base, and the cover covers the electrical device in the closed position while allowing a plug wire to pass between the depression and the cover.

In some embodiments either alone or together with any one or more of the aforementioned and/or after-mentioned embodiments, the base and the top member are connected by snap or interference fit.

In some embodiments either alone or together with any one or more of the aforementioned and/or after-mentioned embodiments, the top member has a plurality of ribs adjacent a top wall portion, and the cover has a plurality of tabs extending from an interior surface of the top wall so that each of the plurality of tabs of the cover selectively mate with one of the plurality of ribs of the top member to maintain the cover in the closed position.

In some embodiments either alone or together with any one or more of the aforementioned and/or after-mentioned embodiments, the side wall of the cover surrounds a cover portion of the top member in the closed position.

In some embodiments either alone or together with any one or more of the aforementioned and/or after-mentioned embodiments, the side wall of the cover has an outer perimeter that is the same shape as an outer perimeter of a top connection portion of the top member.

In some embodiments either alone or together with any one or more of the aforementioned and/or after-mentioned embodiments, the side wall of the cover moves vertically to slide between the closed position and the open position.

In some embodiments either alone or together with any one or more of the aforementioned and/or after-mentioned embodiments, the interior of the top member further comprises a plurality of bosses for connection of the electrical device.

In some embodiments either alone or together with any one or more of the aforementioned and/or after-mentioned embodiments, the base connects to a stabilizer that has four members of the same shape that connect around the base.

In some embodiments either alone or together with any one or more of the aforementioned and/or after-mentioned embodiments, the cover has one or more cover contacts and the top member has one or more electrical contacts, and, when the cover is in a closed position, the one or more electrical contacts can conduct electricity to the one or more cover contacts and, when the cover is in the open position, the one or more electrical contacts do not conduct electricity to the one or more cover contacts.

In some embodiments either alone or together with any one or more of the aforementioned and/or after-mentioned embodiments, a plurality of stabilizer bars are connected to the cover and move with the cover between the open position and the closed position.

In some embodiments either alone or together with any one or more of the aforementioned and/or after-mentioned embodiments, the base connects to a stabilizing fin.

In some embodiments either alone or together with any one or more of the aforementioned and/or after-mentioned embodiments, when the cover is in a closed position, one or more wires can conduct electricity to the cover.

In some embodiments either alone or together with any one or more of the aforementioned and/or after-mentioned embodiments, a splash guard/insect guard is attached to prevent water and insect ingress while the cover is in the closed position.

DETAILED DESCRIPTION

Figure 1:
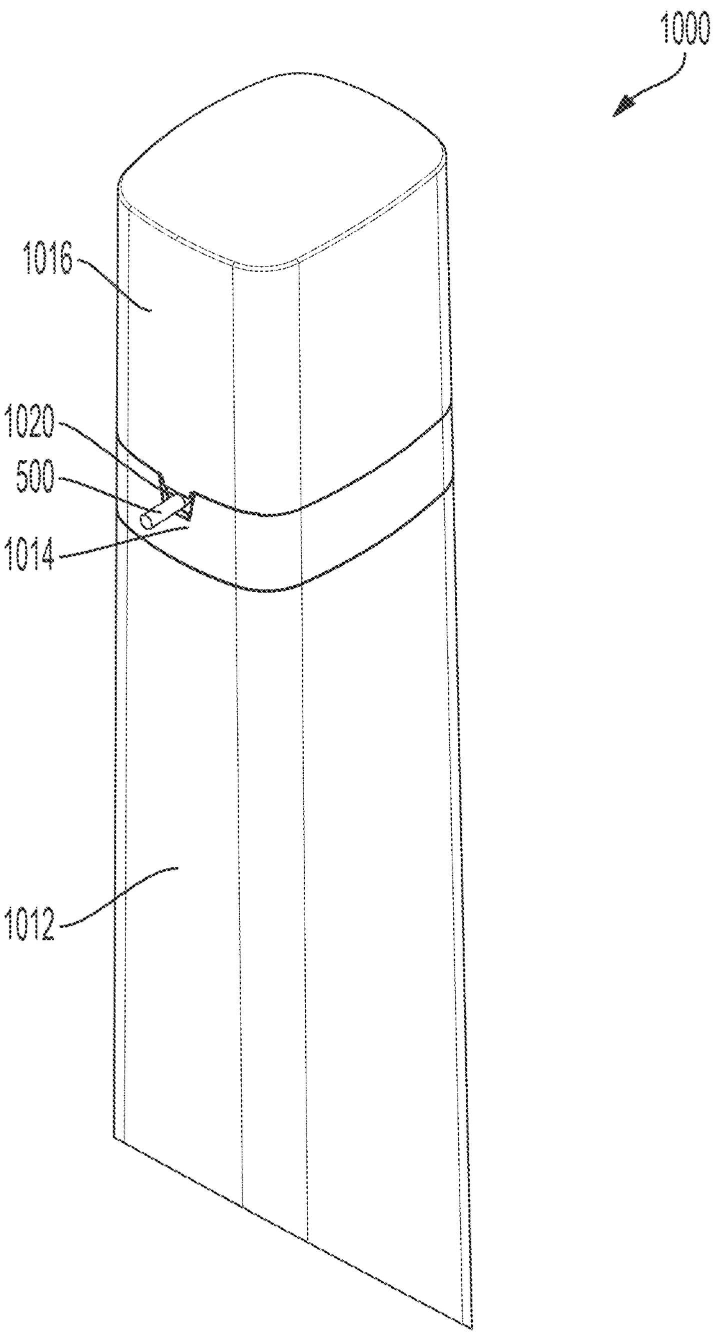
FIG. 1 is a perspective view of an exemplary first embodiment of a post of the present disclosure with the cover in a closed position.

Referring to the drawings and in particular to FIG. 1, an exemplary embodiment of a post according to the present disclosure is shown and is generally referred to by reference numeral 1000. Post 1000 is a landscaping post for electrical devices. Post 1000 has a base 1012, a top member 1014 and a cover 1016. A plug wire 500 is shown between cover 1016 and a depression 1020 in top member 1014. Base 1012, top member 1014 and cover 1016 are made of materials, for example, PVC, ABS, Polycarbonate, Die-cast Aluminum or steel.

Advantageously, post 1000 includes a sleek design that differentiates it from landscaping posts in the marketplace, which are typically rectangular or cylindrical shaped designs incorporating bulky flip covers to achieve while-in-use (WIU) weatherproof usability. In contrast, post 1000 houses the electrical device, for example, an electrical outlet 22, in such a way as to hide the electrical device inside the design while maintaining the WIU weatherproof requirements. In addition, post 1000 allows for serving multiple purposes via interchangeable heads or cover assemblies that interchange with cover 1016 that, while providing the protection for the internal electrical device, incorporate accessory features such as, but not limited to, path, area, spotlights and wireless speakers. Wireless speakers include wireless speakers that are compatible with WIFI and marketed under the trademark, BLUETOOTH®.

Figure 2:
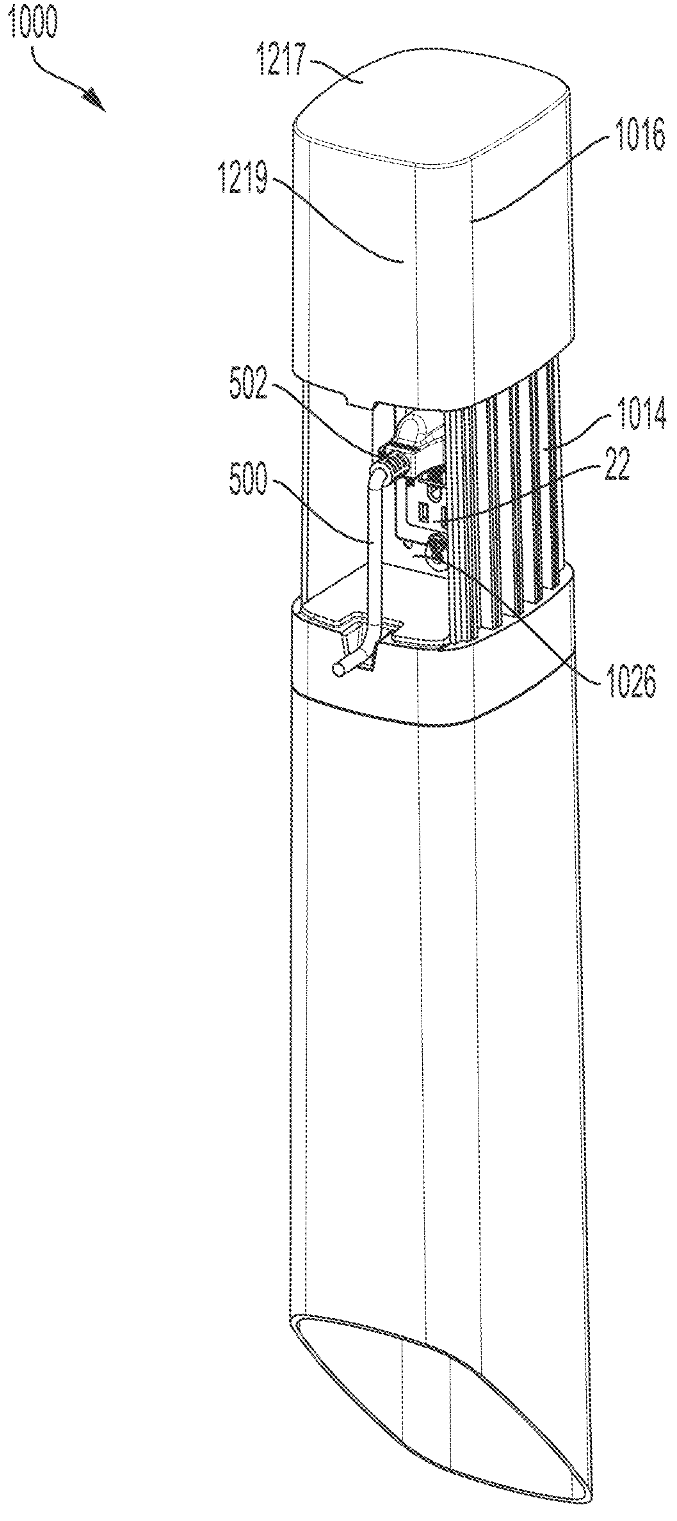
FIG. 2 is a perspective view of the post of FIG. 1 with the cover in an open position.

Cover 1016 slides from a closed position as shown in FIG. 1 to an open position as shown in FIG. 2 to access electrical outlet 22 such as a ground-fault circuit interrupter ("GFCI"). Electrical outlet 22 is housed in top member 1014. Plug 502 having plug wire 500 can be removably connected to electrical outlet 22. Cover 1016 has a top wall 1217 and a side wall 1219. Cover 1016 can be shaped to allow more room for plug 502, for example, cover 1016 can be bulged or curved outwards in front of electrical outlet 22.

Figure 3:
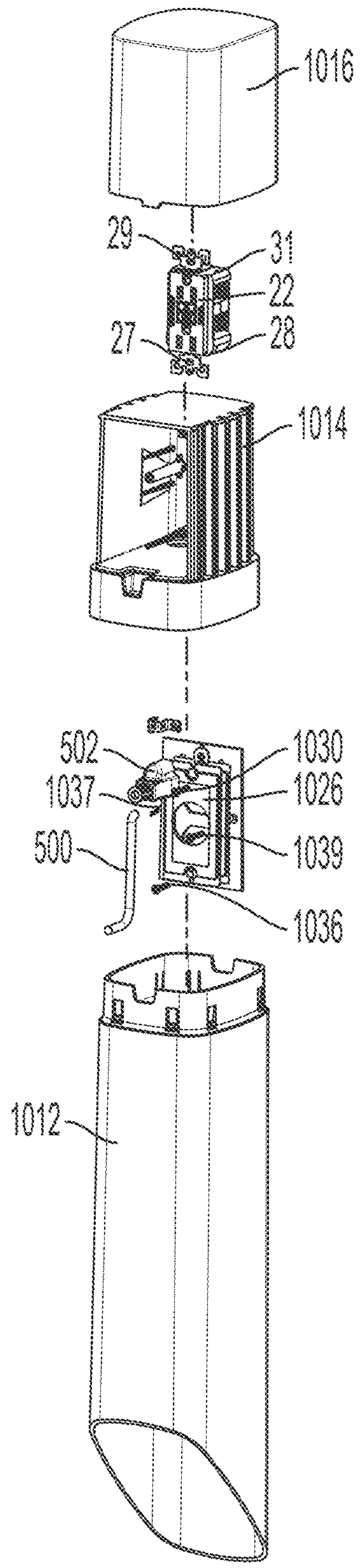
FIG. 3 is an exploded perspective view of the post of FIG. 1.
Figure 3A:
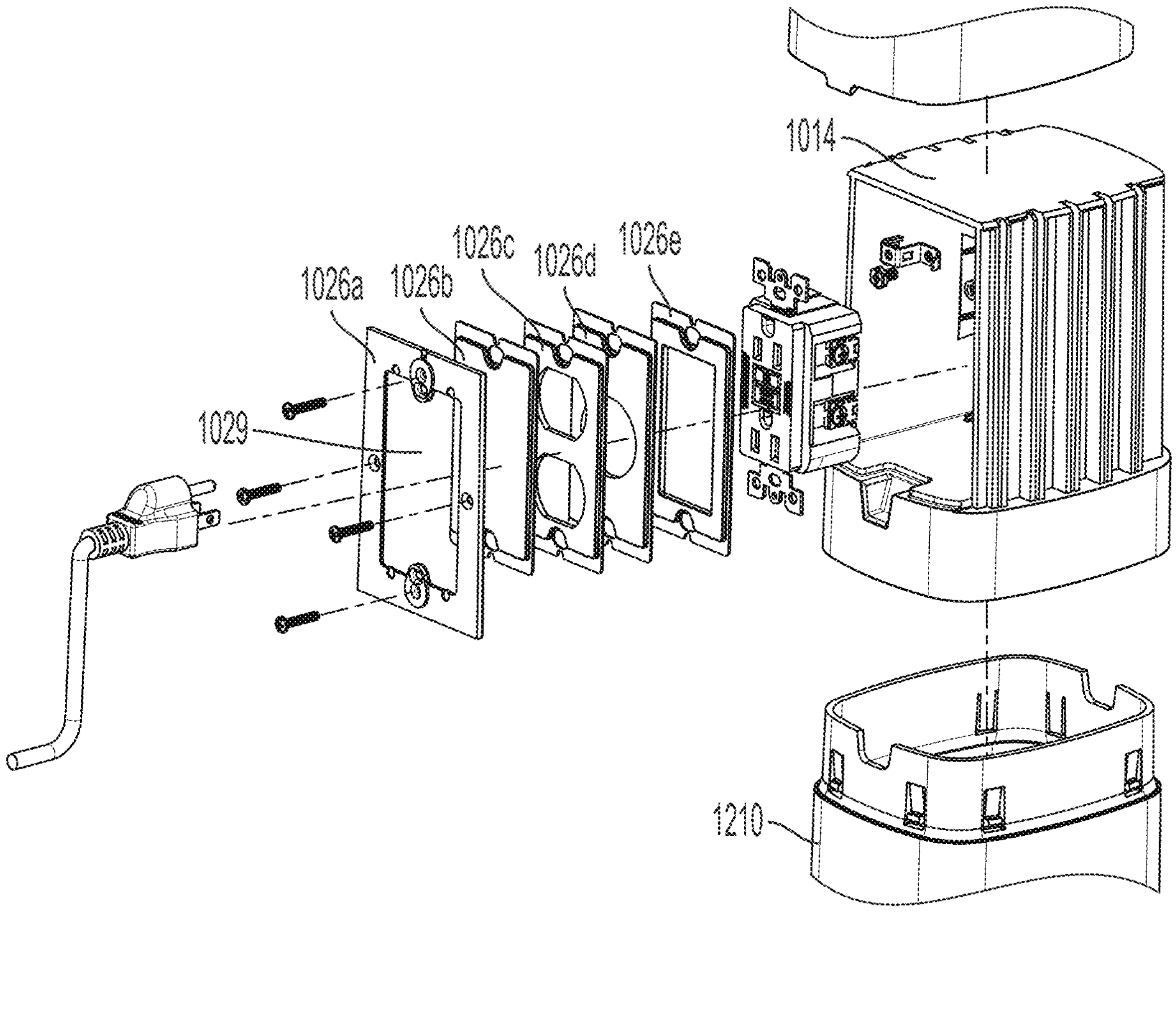
FIG. 3*a* is a partial enlarged exploded view of the post of FIG. 1.

Referring to FIG. 3, post 1000 has base 1012, top member 1014 and cover 1016. Electrical outlet 22 has a bottom flange 27 that is connected to a bottom portion 28 and a top flange 29 that is the same as bottom flange 27 that is inverted and extends from a top portion 31 that is opposite bottom portion 28. Top flange 29 and the bottom flange are connectable to top member 1014. An upper screw 1030, a lower screw 1036, a first side screw 1037 and a second side screw 1039 connect a plate assembly 1026 and electrical outlet 22 to top member 1014. As shown in FIG. 3*a*, plate assembly 1026 includes a front plate 1026*a* that has a plate assembly opening 1029. One of adapter plates 1026*b*, 1026*c*, 1026*d*, 1026*e* snap on to a back of front plate 1026*a* depending on the electrical device used with post 1000, for example, adapter plate 1026*c* can be used with electrical outlet 22.

Figure 4:
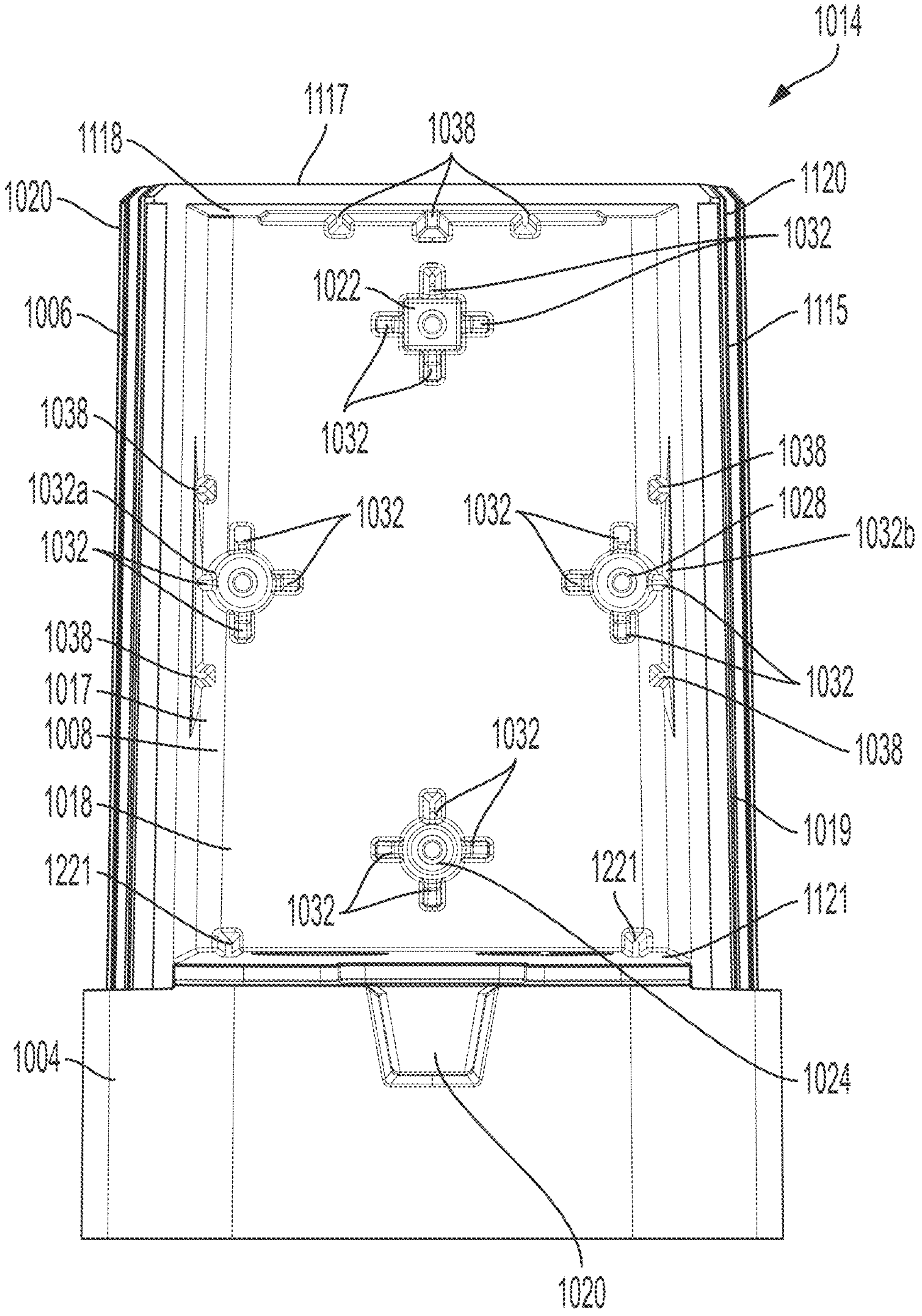
FIG. 4 is a front view of a top member of the post of FIG. 1.
Figure 4A:
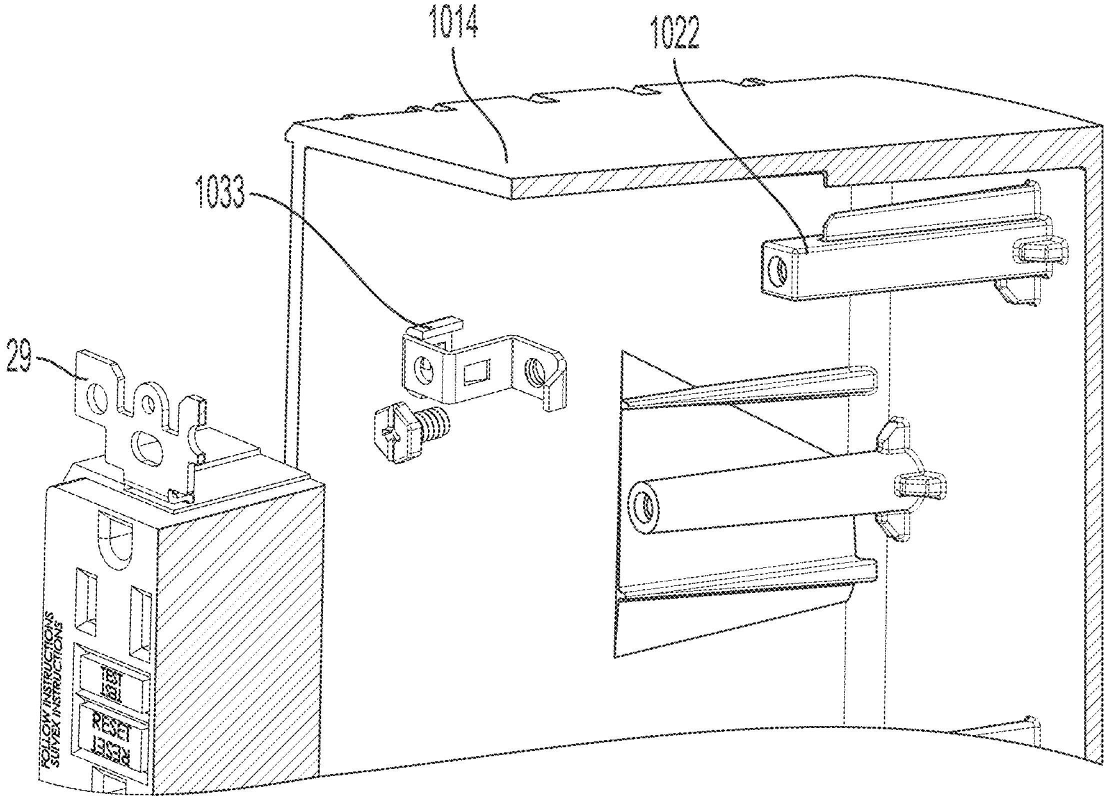
FIG. 4*a* is a partial enlarged exploded view of the post of FIG. 1 modified to include a ground lug.
Figure 10:
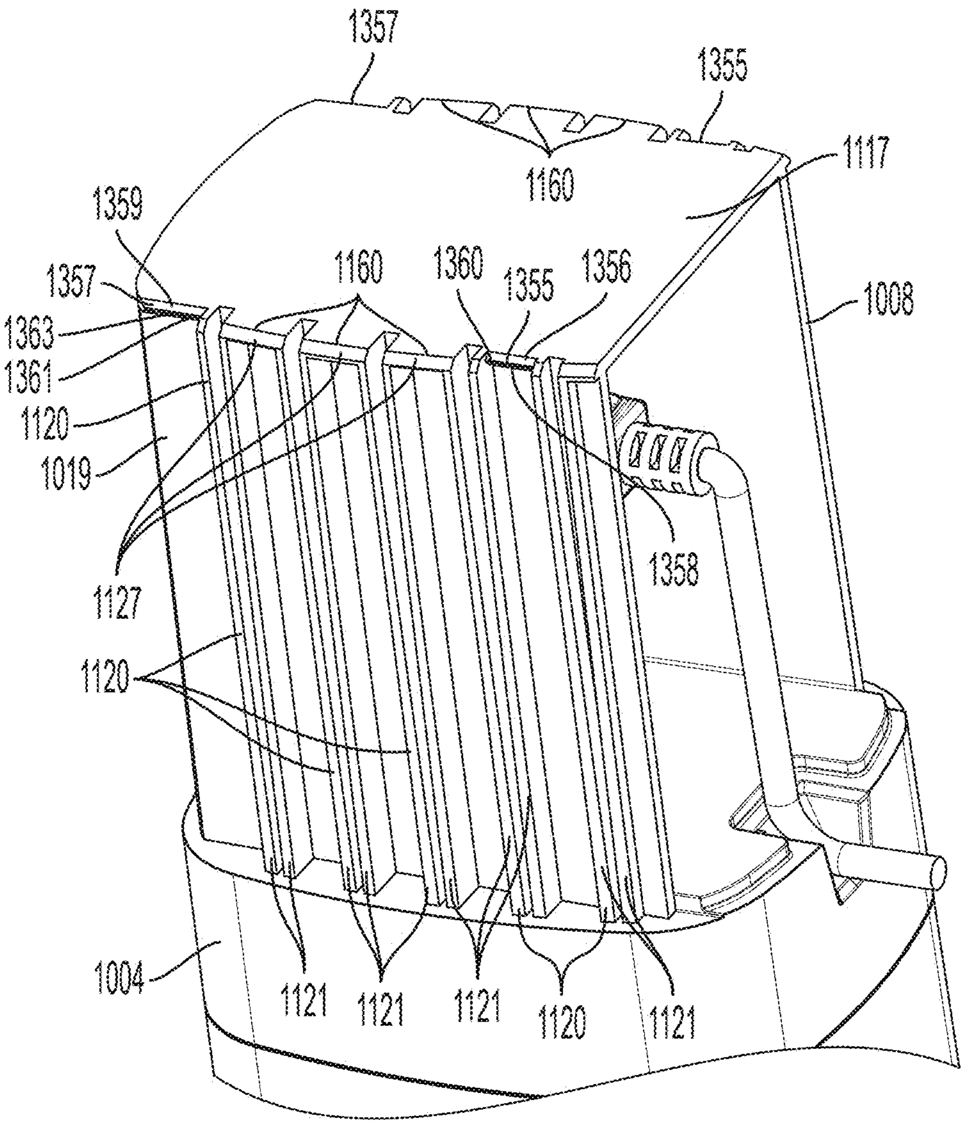
FIG. 10 is a partial enlarged side perspective view of the post of FIG. 1 having the cover removed.

Referring to FIG. 4, top member 1014 has a top connection portion 1004 and a cover portion 1006 that extends from top connection portion 1004. Top connection portion 1004 and cover portion 1006 surround an opening 1008. Cover portion 1006 has a sidewall portion 1115 and a top wall portion 1117. Sidewall portion 1115 has an inner surface 1017 that surrounds an interior 1018 and an outer surface 1019 opposite inner surface 1017. Cover portion 1006 has tracks 1120 formed on outer surface 1019. Referring to FIG. 10, tracks 1120 are each formed by a pair of outer ridges 1021 on outer surface 1019 of cover portion 1006. Tracks 1120 are the same on opposite sides of cover portion 1006. Referring back to FIG. 4, inner surface 1017 of sidewall portion 1115 has a first boss 1022, a second boss 1024, a third boss 1028 and a fourth boss 1032. Each of first boss 1022, second boss 1024, third boss 1028 and fourth boss 1032 have four gussets 1034 on a top, bottom, right side and left side. One of gussets 1032*a* of fourth boss 1032 also connects to inner surface 1017 of sidewall portion 1115. One of gussets 1032*b* of third boss 1028 also connects to inner surface 1017 of sidewall portion 1115. Referring to FIG. 4*a*, a ground lug 1033 can be positioned between top flange 29 of electrical outlet 22 and first boss 1022. Inner surface 1017 of sidewall portion 1115 and an inner surface 1118 of top wall portion 1117 have ribs 1038 to provide strength. Top member 1014 has depression 1020 in top connection portion 1004. Top connection portion 1004 is sized to connect to base 1012 and has an open end opposite cover portion 1006. Top member 1014 has an inner wall 1121 at an intersection of top connection portion 1004 and cover portion 1006. Inner wall 1121 has strengthening ribs 1221.

Figure 5:
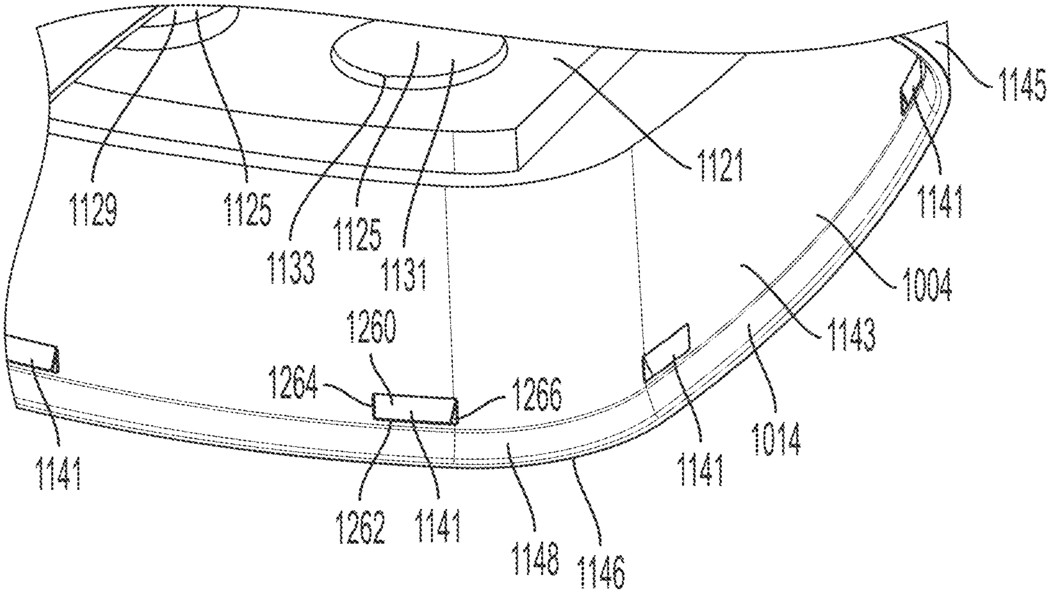
FIG. 5 is a partial enlarged bottom perspective view of the top member of FIG. 4.

As shown in FIG. 5, inner wall 1121 has knockouts 1125 over openings 1129. One of knockouts 1125 is shown as removed in FIG. 5. Knockouts 1125 each have a cover portion 1131 that is connected by breakable strips 1133. Breakable strips 1133 are breakable so that cover portion 1131 can be removed to uncover openings 1129.

Top connection portion 1004 has an interior surface 1143 opposite an exterior surface 1145. Interior surface 1143 has depressions 1141 that are each shaped with opposing upper slanted portion 1260 and lower slanted portion 1262 meeting at an apex where upper slanted portion 1260 is larger than lower slanted portion 1262. Each of depressions 1141 has sidewalls 1264, 1266 that slant outwards from lower slanted portion 1262 toward upper slanted portion 1260. Top connection portion 1004 has a rim 1146 on a side opposite inner wall 1121. Rim 1146 has a rim portion 1148 that slants inward.

Figure 6:
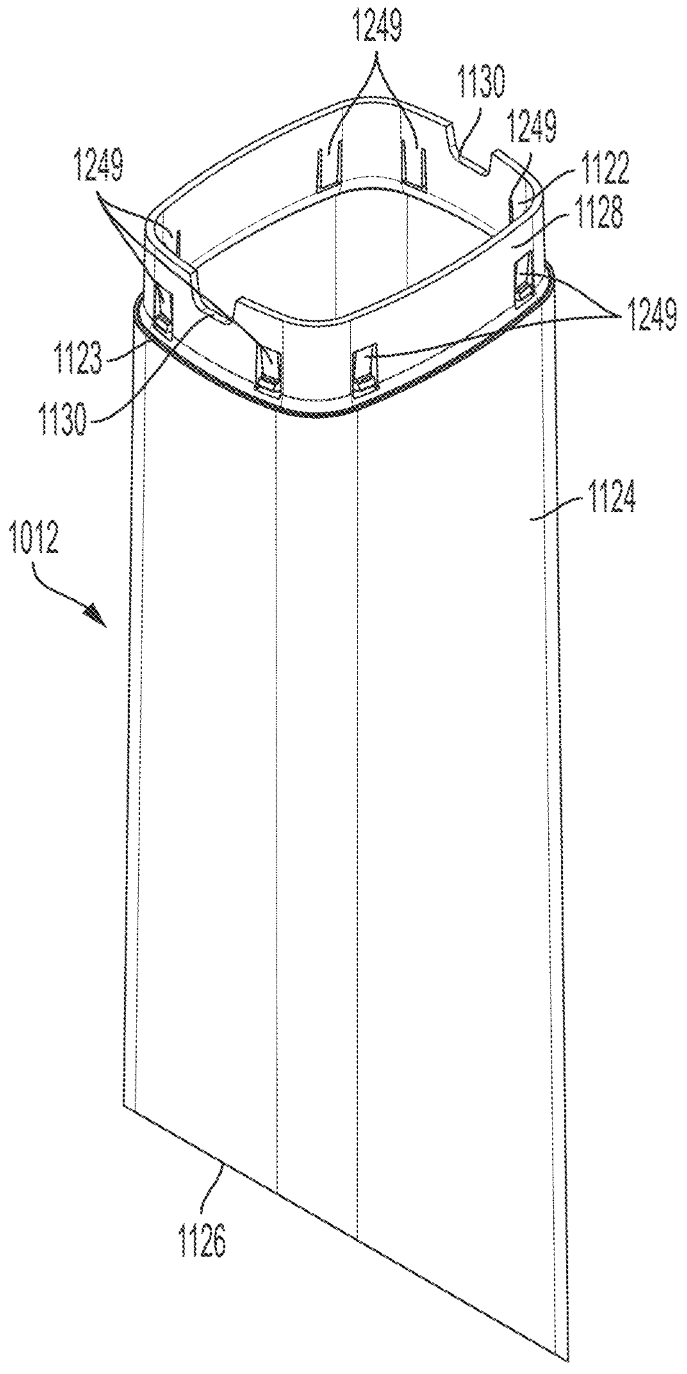
FIG. 6 is a perspective view of a base of the post of FIG. 1.
Figure 7:
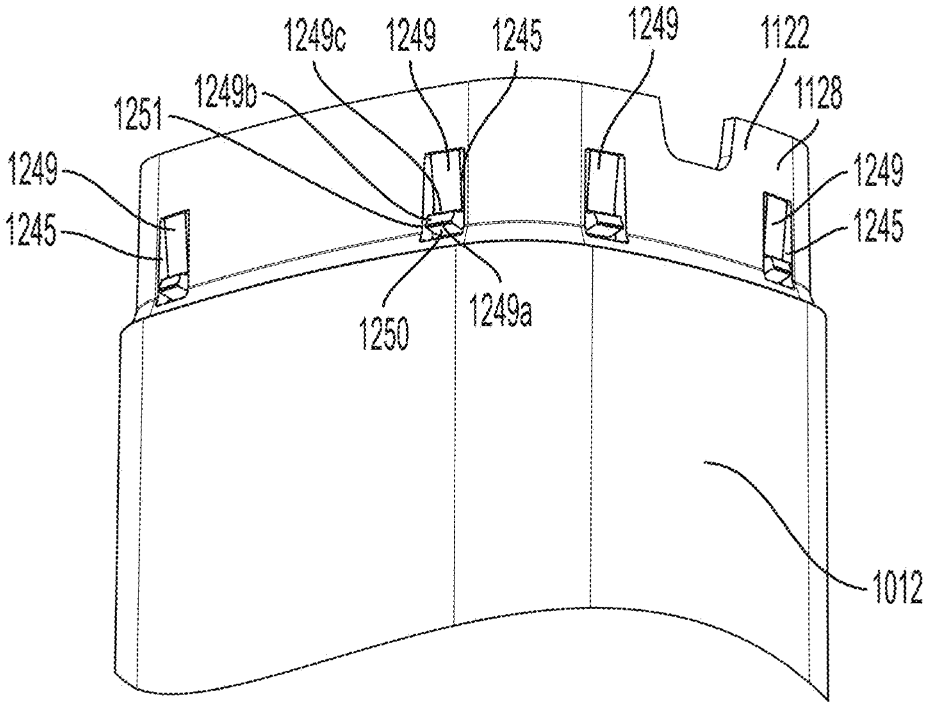
FIG. 7 is a partial enlarged perspective view of the base of FIG. 6.

Referring to FIG. 6, base 1012 has a base connection portion 1122 that extends from a first end 1123 of a body portion 1124 that is open. Body portion 1124 has a second end 1126 opposite first end 1123 that is open. Second end 1126 has a slanted shape. Connection portion 1122 has a sidewall 1128 that has cutouts 1130. Cutouts 1130 are an alignment feature to help ensure top member 1014 seats to base 1012 in the proper orientation during installation. Sidewall 1128 is sized to connect to top connection portion 1004 of top member 1014. As shown in FIG. 7, openings 1245 are through sidewall 1128. A tongue 1249 extends from sidewall 1128 into each of openings 1245. Tongue 1249 has a free end 1250 on a first end and a connection to a remainder of sidewall 1128 on a second end that is opposite the first end. Tongue 1249 has a protrusion 1251. Protrusion 1251 has a first ramp 1249*a* that slants outward toward free end 1250 and a second ramp 1249*b* that slants in an opposite direction and second ramp 1249*b* has a horizontal portion 1249*c* on a side opposite first ramp 1249*a*. Tongues 1249 and openings 1245 of base 1012 are positioned to mate with depressions 1141 in top member 1014.

Still referring to FIG. 7, when post 1000 is assembled, top connection portion 1004 of top member 1014 is connected to base connection portion 1122 of base 1012. Top connection portion 1004 of top member 1014 is connected to base connection portion 1122 of base 1012, for example, by snap fit by top connection portion 1004 of top member 1014 being moved toward base connection portion 1122 of base 1012 so that second ramp 1249*b* of each protrusions 1251 of base 1012 contacts rim portion 1148 of top member 1014 to deform tongues 1249 inward allowing each of protrusions 1251 to be moved over one of depressions 1141 in top member 1004 where tongues 1049 then urge each of protrusions 1251 into the one of depressions 1141 connecting top member 1014 to base 1012.

Figure 8:
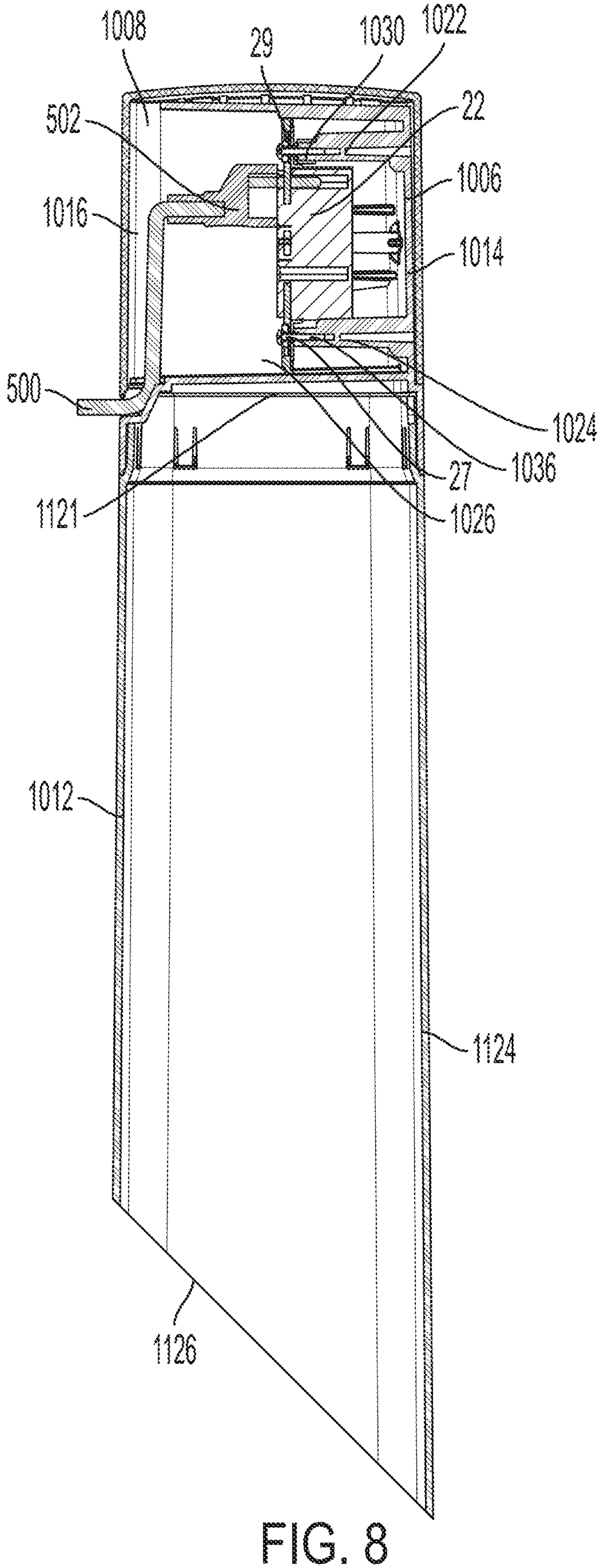
FIG. 8 is a side cross-sectional view of the post of FIG. 1.
Figure 9:
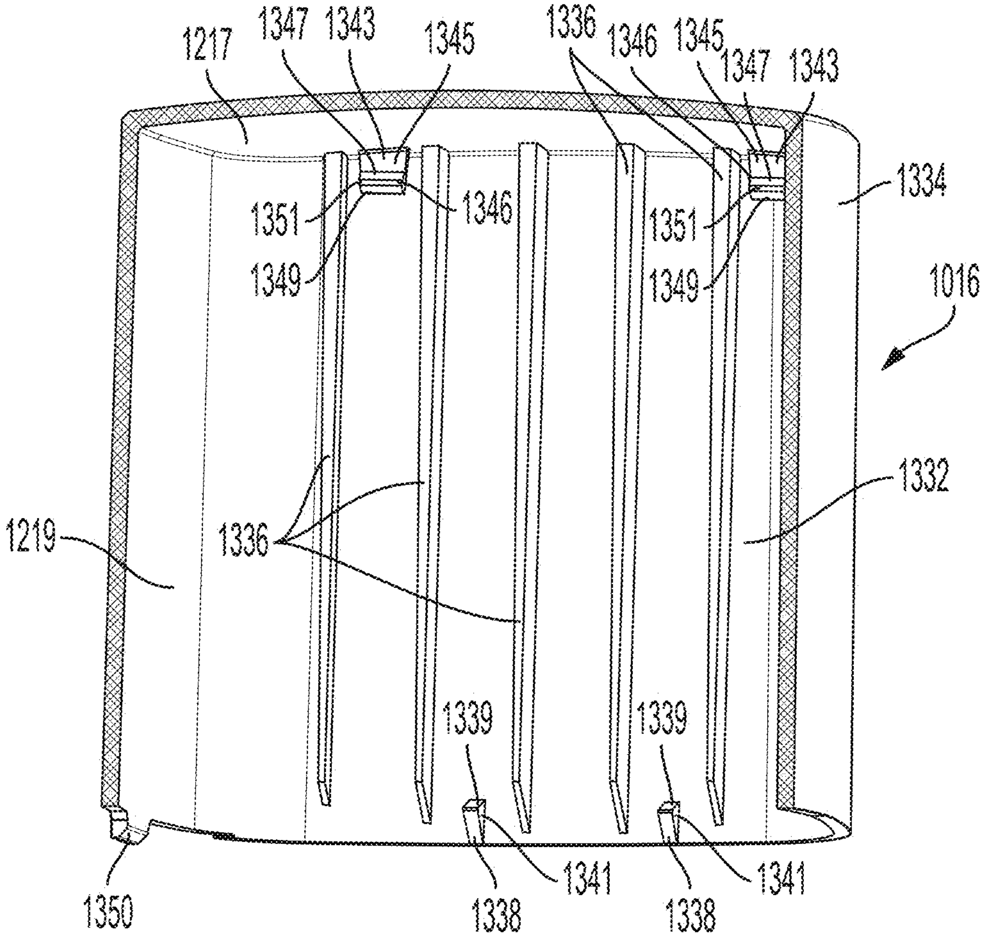
FIG. 9 is a cross-sectional view of a cover of the post of FIG. 1.
Figure 11:
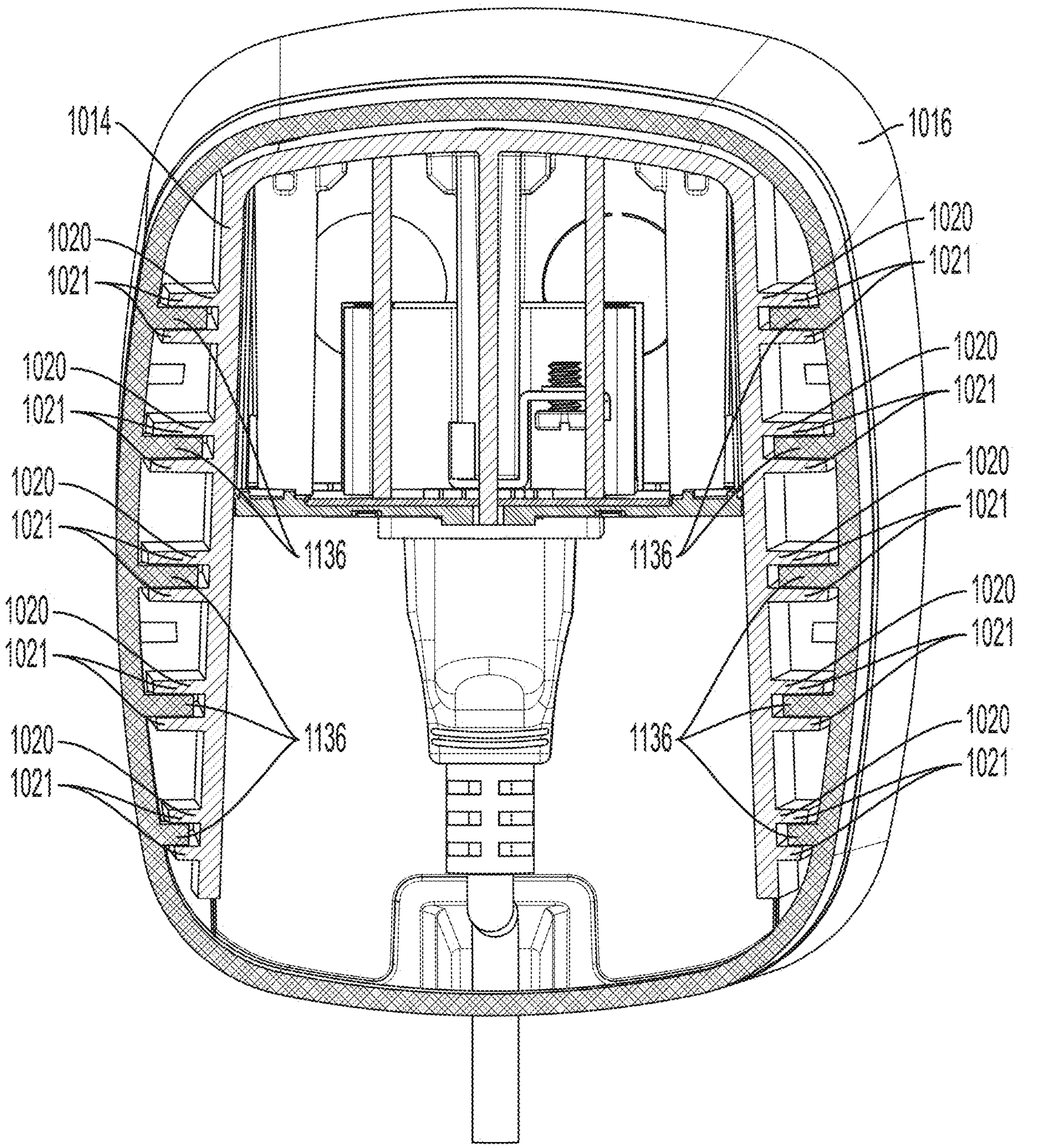
FIG. 11 is a top cross-sectional view of the post of FIG. 1.

Referring to FIG. 8, when post is assembled, cover 1016 fits over cover portion 1006 of top member 1014 so that cover 1016 can slide between the closed position shown in FIG. 1 and the open position shown in FIG. 2. Side wall 1219 of cover 1016 has an outer perimeter that is the same shape as an outer perimeter of top connection portion 1004 of top member 1014. Referring to FIG. 9, cover 1016 has an interior surface 1332 and an exterior surface 1334. Cover 1016 has ridges 1336 positioned to mate with tracks 1120 on top member 1014 that are shown in FIG. 10. As shown in FIG. 11, when cover 1016 is assembled on top member 1014, one of ridges 1336 is positioned in each of tracks 1120. Ridges 1336 and tracks 1120 guide cover 1016 as it slides between the closed position and the open position on top member 1014.

Referring to FIG. 9, two protuberances 1338 extend from a first side of interior surface 1332 on side wall 1219 of cover 1016 and two protuberances 1338 extend from a second side of interior surface 1332 on side wall 1219 of cover 1016 that is opposite the first side. Each protuberance 1338 has a top ramp 1339 that opposes a bottom ramp 1341 that meet at an apex with bottom ramp 1341 being longer than top ramp 1339. Cover 1016 has two tabs 1343 extending from interior surface 1332 of top wall 1217 and two tabs 1343 that extend from a second side of interior surface 1332 of top wall 1217 that is opposite the first side. Each of tabs 1343 has an extension portion 1345 and a protrusion 1346. Each protrusion 1346 has a top ramp 1347 and bottom ramp 1349 that meet at a flat apex 1351. Top ramp 1347 slants in an opposite direction to bottom ramp 1349 and top ramp 1347 is longer than bottom ramp 1349. Cover 1016 has a mating tab 1350 that fits in depression 1020 in base 1012 when cover is in the closed position. Mating tab 1350 can have a shape that fits in depression 1020 by friction fit.

Referring to FIG. 10, top member 1014 has top walls 1160 between each adjacent pair of tracks 1120 except the pair of tracks 1120 closest to opening 1008. Top walls 1160 have edges that form ramps 1127 that slant inward toward top wall portion 1117. To connect cover 1016 to top member 1014, bottom ramp 1341 of each of protuberances 1338 of cover 1016 is urged against one of top walls 1160 of top member 1014 so that protuberances 1338 each pass over the one of top walls 1160 so that cover 1016 and top member 1014 are connected. Once cover 1016 and top member 1014 are connected, cover 1016 is movable from the closed position, where protuberances 1338 are adjacent top connection portion 1004, to the open position, where protuberances 1338 contact the one of top walls 1160 that limit further movement. To disconnect cover 1016 from top member 1014, a sufficient force is applied to cover 1016 in a direction away from base 1012 to urge protuberances 1338 over the one of top walls 1160 so that cover 1016 disconnects from top member 1014.

Still referring to FIG. 10, top member 1014 has two front ribs 1355. A first of two front ribs 1355 is adjacent top wall portion 1117 between the pair of tracks closest to opening 1008 on a first side of opening. A second of the two front ribs 1355 is between the pair of tracks closest to opening 1008 on a second side of opening that is opposite the first side of opening. Each of two front ribs 1355 has a top ramp 1356 and bottom ramp 1358 that meet at a flat apex 1360. Top ramp 1356 slants in an opposite direction to bottom ramp 1358. Top member 1014 has two rear ribs 1357. Two rear ribs 1357 are on opposite sides of top member 1014. Each of two rear ribs 1357 is adjacent top wall portion 1117 and extends from one of tracks 1120 positioned at a rear portion of top member 1014 in a direction away from opening 1008. Each two rear ribs 1357 has a top ramp 1359 and bottom ramp 1361 that meet at a flat apex 1363. Top ramp 1359 slants in an opposite direction to bottom ramp 1361 and top ramp 1359 is longer than bottom ramp 1361.

When post 1000 is assembled, each of tabs 1343 of cover 1016 selectively mate with one of two front ribs 1355 or two rear ribs 1357 to maintain cover 1016 in the closed position as show in FIG. 1. When cover 1016 moves from the open position as show in FIG. 2 to the closed position as shown in FIG. 1, bottom ramp 1349 of each tab 1343 is urged against one of two front ribs 1355 or two rear ribs 1357 to deform extension portion 1345 toward side wall 1219 of cover 1016 allowing protrusion 1349 of each of tabs 1343 to pass over the one of two front ribs 1355 or two rear ribs 1357 maintaining cover 1016 in the closed position. When cover 1016 moves from the closed position as show in FIG. 1 to the open position as shown in FIG. 2, a sufficient force is applied to cover 1016 so that top ramp 1347 is urged against the one of two front ribs 1355 or two rear ribs 1357 to deform extension portion 1345 toward side wall 1219 of cover 1016 allowing protrusion 1349 of each of tabs 1343 to pass over the one of two front ribs 1355 or two rear ribs 1357 so that cover 1016 is movable from the closed position to the open position.

Figure 12:
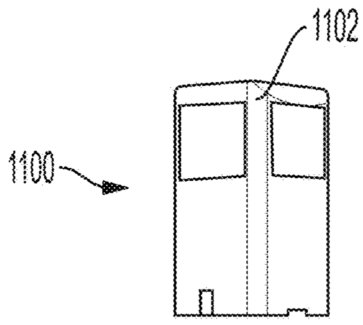
FIG. 12 is a perspective view of a cover and speaker assembly that is interchangeable with the cover of FIG. 1.
Figure 13:
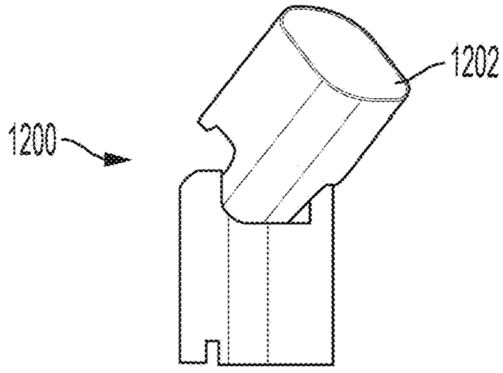
FIG. 13 is a perspective view of a cover and Bollard style LED light assembly that is interchangeable with the cover of FIG. 1.
Figure 14:
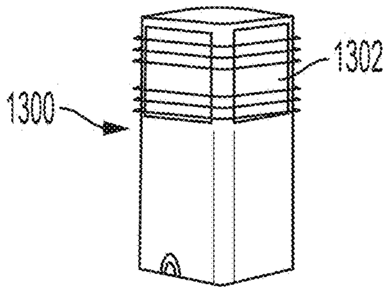
FIG. 14 is a perspective view of a cover and pagoda light assembly that is interchangeable with the cover of FIG. 1.
Figure 15:
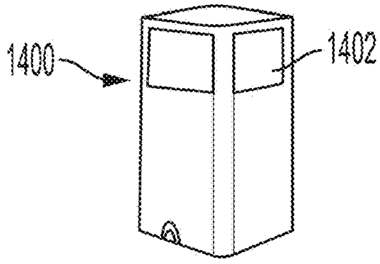
FIG. 15 is a perspective view of a cover and area path light assembly that is interchangeable with the cover of FIG. 1.

Referring to FIGS. 12-15, post 1000 has cover 1016 that is removably connected to top member 1014 so that post 1000 can interchange cover 1016 with covers 1100, 1200, 1300, 1400. Cover 1100 of FIG. 12 is the same as cover 1016 except that a wireless speaker 1102 is connected to top wall 1217. Cover 1200 of FIG. 13 is the same as cover 1016 except that a Bollard style LED light 1202 is connected to top wall 1217. Cover 1300 of FIG. 14 is the same as cover 1016 except that a Pagoda Style Path light 1302 is connected to top wall 1217. Cover 1400 of FIG. 15 is the same as cover 1016 except that an area path light 1402 is connected to top wall 1217. Each of covers 1100, 1200, 1300, 1400 can connect and disconnect from top member 1014 the same as cover 1016.

Figure 11A:
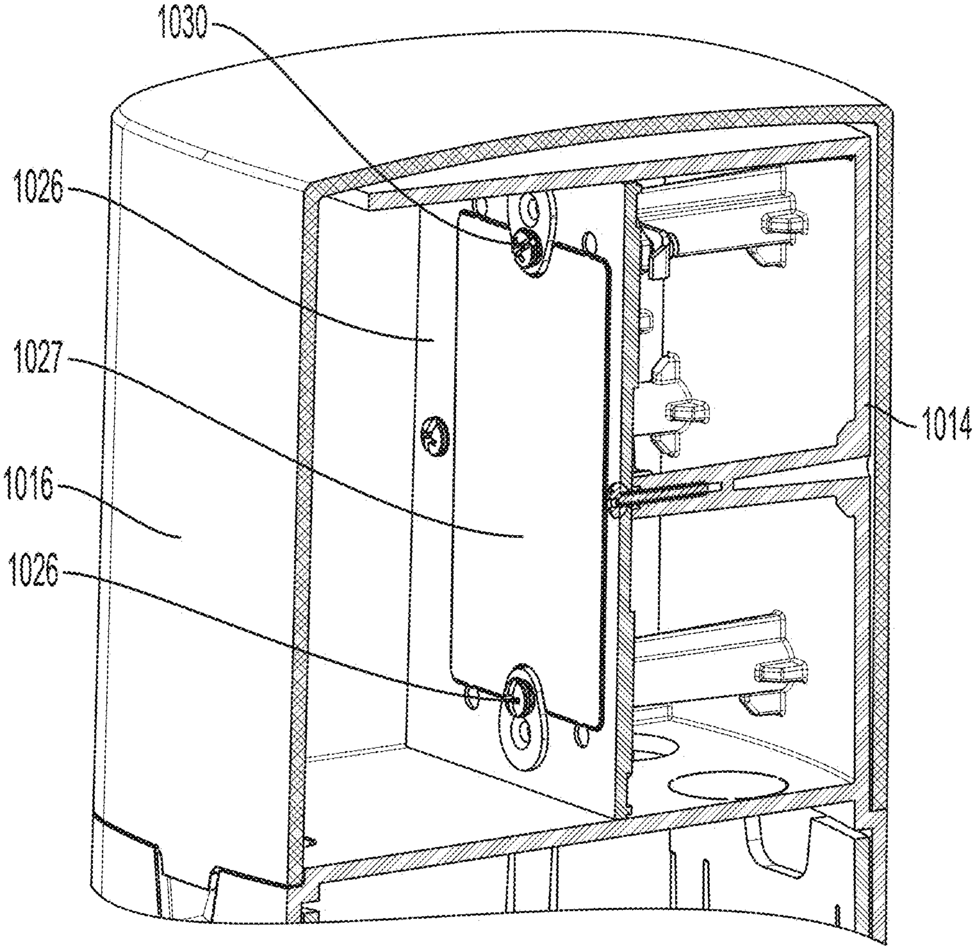
FIG. 11*a* is a partial enlarged cross-sectional view of the post of FIG. 1 that excludes an electrical outlet and has a solid plate.

Referring to FIG. 8, to install post 1000, wires from one or more power sources are inserted through second end 1126 of body portion 1124 that is open and through one or both knockouts 1125. One or more of the wires passes through one of knockouts 1125 in inner wall 1121 to connect to electrical outlet 22. Electrical outlet 22 is connected to top member 1014 through opening 1008. To connect electrical outlet 22 to top member 1014, upper screw 1030 passes through openings in plate assembly 1026 and top flange 29 of electrical outlet 22 to connect to first boss 1022, lower screw 1036 passes through openings in plate assembly 1026 and bottom flange 27 of electrical outlet 22 to connect to second boss 1024, first side screw 1037 (FIG. 3) passes through openings in plate assembly 1026 connecting to fourth boss 1032 (FIG. 4), and a second side screw 1039 (FIG. 3) passes through openings in plate assembly 1026 connecting to third boss 1028 (FIG. 4). Referring to FIG. 11*a*, if electrical outlet 22 is not desired or prior to installation of electrical outlet, plate assembly opening 1029 is covered by solid plate 1027 that is removably connectable to top member 1014 by upper screw 1030 that passes through openings in plate assembly 1026 and solid plate 1027 and lower screw 1036 passes through openings in plate assembly 1026 and solid plate 1027. One of wires can also pass through the other of knockouts 1125 to connected to wireless speaker 1102, Bollard style LED light 1202, Pagoda Style Path light 1302, or area path light 1402 depending on if one of covers 1100, 1200, 1300, 1400 is connected to inner slide 1014. Alternatively, the other of knockouts 1125 can remain covered when using cover 1016 as shown in FIG. 5. Once wires are connected, then a portion of base 1012 is buried in a desired location in the ground. Alternatively, base 1012 of post 1000 can be connected to a stabilizing fin 18 described herein so that once wires are connected, then a portion of base 1012 that is connected to stabilizing fin 18 is buried in a desired location in the ground. Once installed, one of covers 1016, 1100, 1200, 1300, 1400 can be lifted to the open position to access electrical outlet 22 to plug plug 502 into electrical outlet 22 so that electricity conducts through plug 502 and plug wire 500. Cover 1016 can then be moved to the closed position so that mating tab 1350 fits in depression 1020 in base 1012 as shown in FIG. 1 covering electrical outlet 22 while allowing plug wire 500 to pass between depression 1020 and cover 1016 providing while-in-use (WIU) weatherproof usability. If one of covers 1100, 1200, 1300, 1400 are connected to top member 1014, electricity is conducted to one of wireless speaker 1102, Bollard style LED light 1202, Pagoda Style Path light 1302, or area path light 1402 by the wires. Covers 1016, 1100, 1200, 1300, 1400 can be subsequently interchanged after post 1000 has been installed.

Figure 16:
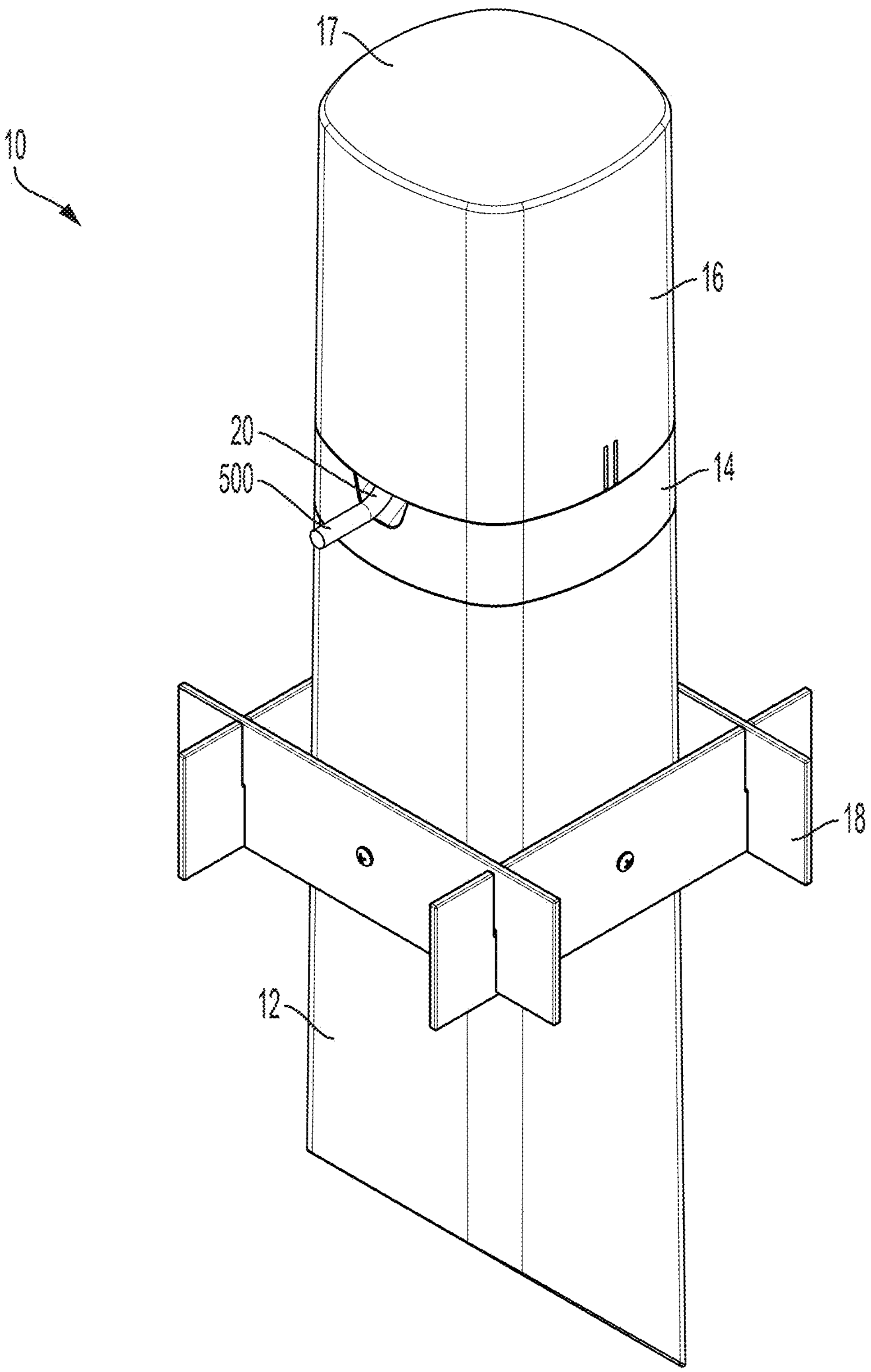
FIG. 16 is a perspective view of an exemplary second embodiment of a post of the present disclosure with the cover in a closed position.

Referring to the drawings and in particular to FIG. 16, a second embodiment of a post according to the present disclosure is shown and is generally referred to by reference numeral 10. Post 10 has a base 12, an inner slide 14, a cover 16 and stabilizing fin 18. A plug wire 500 is shown between cover 16 and a depression 20 in inner slide 14.

Figure 17:
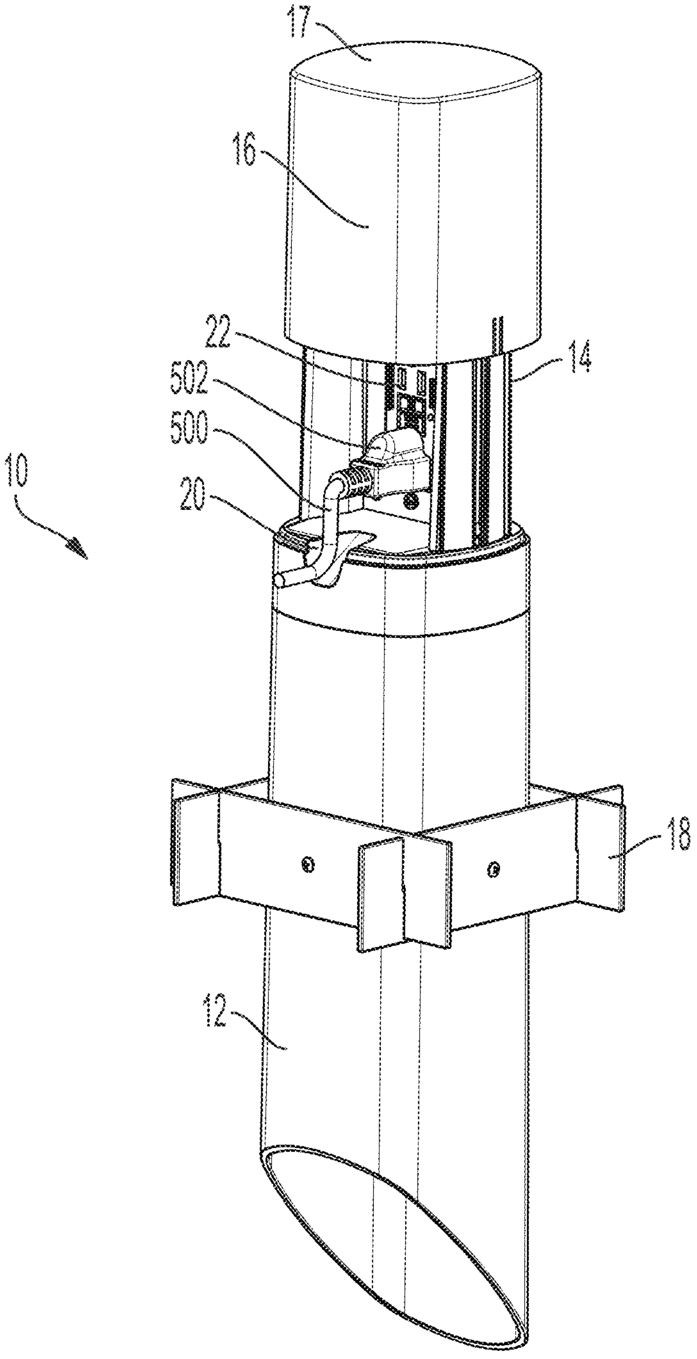
FIG. 17 is a perspective view of the post of FIG. 16 with the cover in an open position.

Cover 16 slides from a closed position as shown in FIG. 16 to an open position as shown in FIG. 17 to access an electrical outlet 22 such as a ground-fault circuit interrupter ("GFCI"). Electrical outlet 22 is housed in inner slide 14. Plug 502 having plug wire 500 can be removably connected to electrical outlet 22. Cover 16 can be shaped to allow more room for plug 502, for example, cover 16 can be bulged or curved outwards in front of electrical outlet 22.

Figure 18:
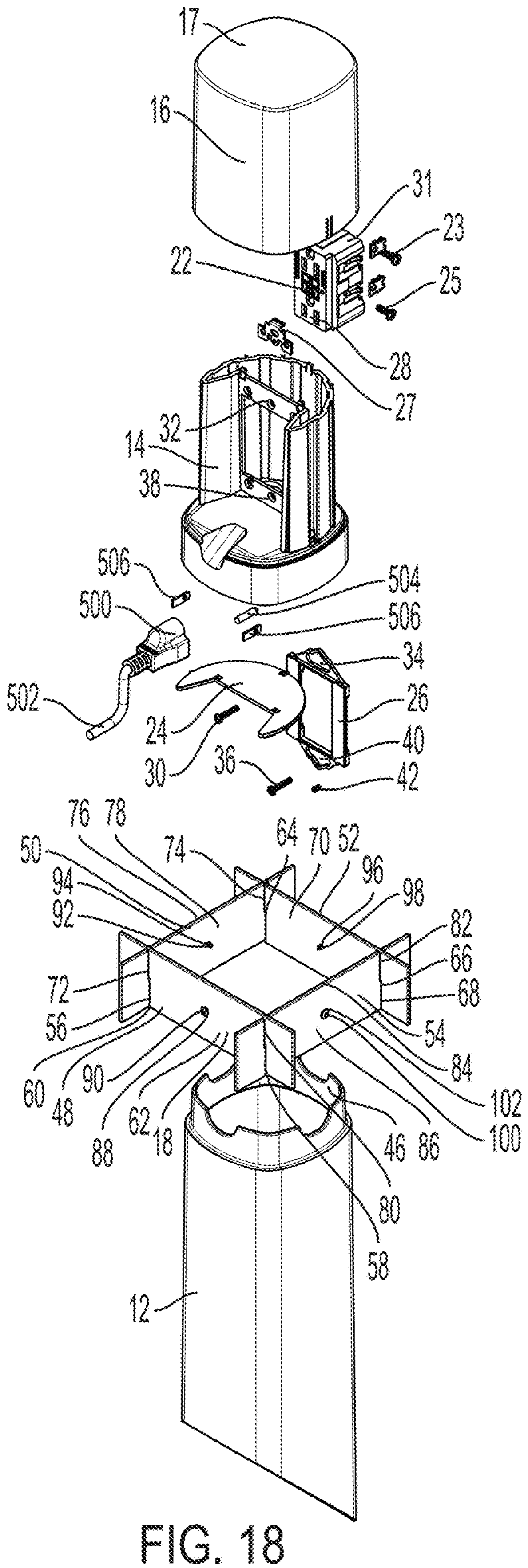
FIG. 18 is an exploded perspective view of the post of FIG. 16.

Referring to FIG. 18, post 10 has base 12, stabilizing fin 18, inner top clip 24, inner slide 14 and cover 16. Electrical outlet 22 has two screws 23, 25 on a first side and two screws that are on an opposite second side. Electrical outlet 22 has a bottom flange 27 that is connected to a bottom portion 28 and a top flange 29 (FIG. 21) that is the same as bottom flange 27 that is inverted and extends from a top portion 31 that is opposite bottom portion 28. Top flange 29 and the bottom flange are connectable to inner slide 14. A portion of electrical outlet 22 fits in a plate 26. An upper screw 30 passes through a top aperture 32 in inner slide 14, through an upper opening 34 in plate 26 and through top flange 29 of electrical outlet 22 connecting plate 26 between inner slide 14 and electrical outlet 22. A lower screw 36 passes through a bottom aperture 38 in inner slide 14 through a lower opening 40 in plate 26 and through bottom flange 27 of electrical outlet 22 connecting plate 26 between inner slide 14 and electrical outlet 22. Plug 502 has prongs 504, 506, 508. A screw 42 passes through a hole 44 (FIG. 21) through inner slide 14 and a hole 46 through base 12 to connect inner slide 14 to base 12.

Stabilizing fin 16 has a first member 48, a second member 50, a third member 52, and a fourth member 54. First member 48 has two slits 56, 58 that extend from a lower edge 60 into a body 62 of first member 48. Third member 52 has two slits 64, 66 that extend from a lower edge 68 into a body 70 of third member 52. Second member 50 has two slits 72, 74 that extend from an upper edge 76 into a body 78 of second member 50. Fourth member 54 has two slits 80, 82 that extend from an upper edge 84 into a body 86 of second member 54. Slit 56 of first member 48 receives second member 50 at slit 72. Slit 58 of first member 48 receives fourth member 54 at slit 80. Slit 74 of second member 50 receives third member 52 at slit 64. Slit 66 of third member 52 receives fourth member 54 at slit 82. First member 48 has an aperture 88 and a screw 90 that passes through aperture 88. Second member 50 has an aperture 92 and a screw 94 that passes through aperture 92. Third member 52 has an aperture 96 and a screw 98 that passes through aperture 96. Fourth member 54 has an aperture 100 and a screw 102 that passes through aperture 100.

Figure 19:
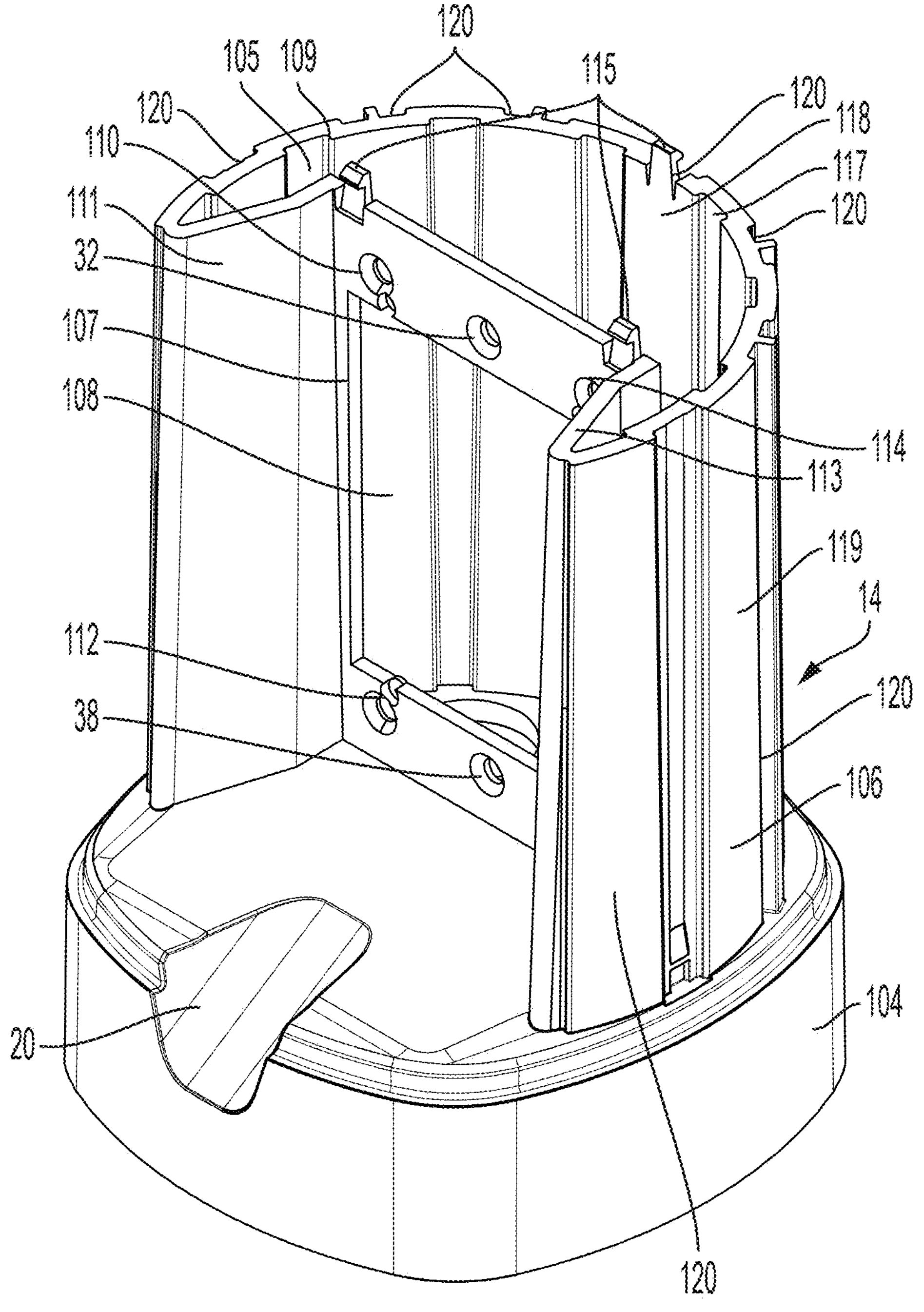
FIG. 19 is a perspective view of an inner slide of the post of FIG. 16.
Figure 23:
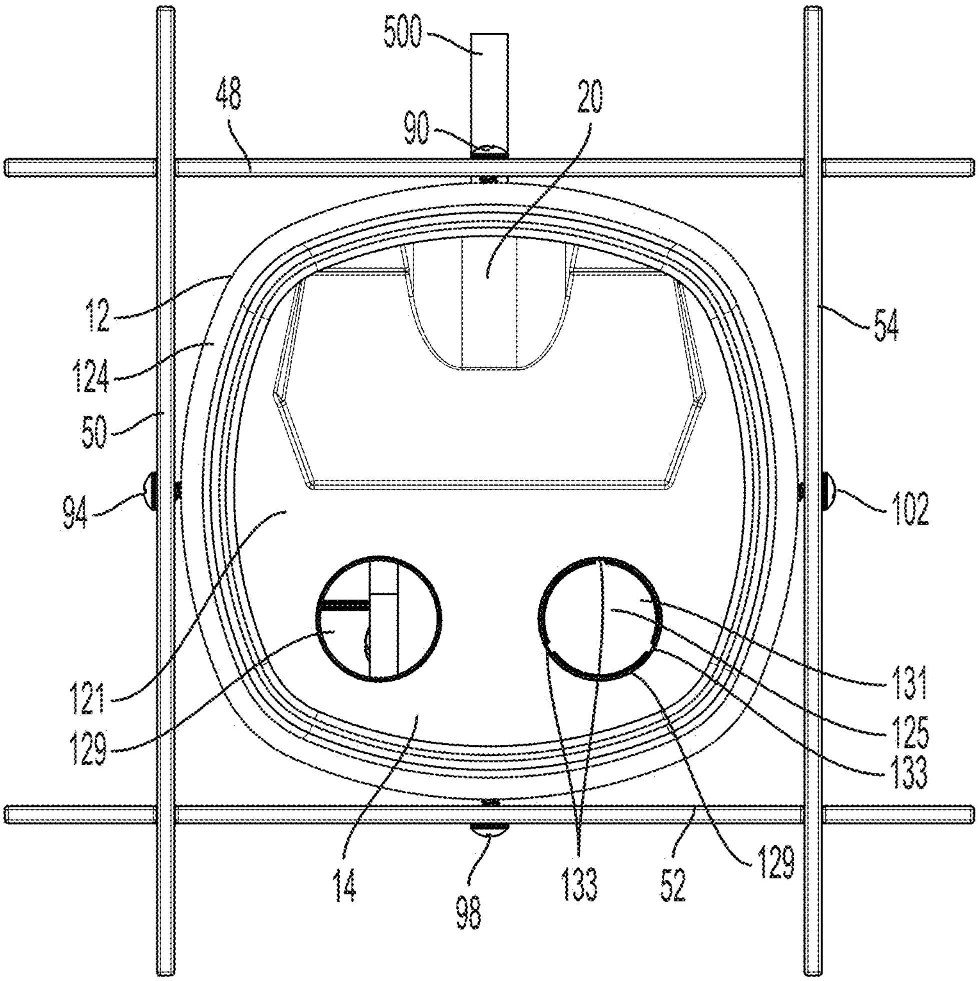
FIG. 23 is a bottom view of the post of FIG. 16.

Referring to FIG. 19, inner slide 14 has an inner slide connection portion 104 and a sidewall 106 that extends from inner slide connection portion 104. Sidewall 106 has hooks 115. Sidewall 106 has an open end 105 on a side opposite to inner slide connection portion 104. Sidewall 106 has an outlet portion 107 and a cover portion 109. Sidewall 106 has intermediate portions 111, 113 that each connect outlet portion 107 to opposite sides of cover portion 109. Sidewall 106 has an opening 108 through outlet portion 107 sized to receive electrical outlet 22. Sidewall 106 has an inner surface 117 that surrounds an interior 118 and an outer surface 119 opposite inner surface 117. Outlet portion 107 has depressions 110, 112, 114, and a depression on a side of bottom aperture 38 opposite depression 112. Sidewall 106 has tracks 120 formed in cover portion 109. Tracks 120 are depressions in outer surface 119 of sidewall 106. Top aperture 32 and bottom aperture 38 are through outlet portion 107 of sidewall 106. Inner slide 14 has depression 20 in inner slide connection portion 104. Inner slide connection portion 104 is sized to connect to base 12. Inner slide connection portion 104 has an open end opposite sidewall 106. As show in FIG. 21, inner slide 14 has an inner wall 121 at an intersection of inner slide connection portion 104 and sidewall 106. As shown in FIG. 23, inner wall 121 has knockouts 125 over openings 129. One of knockouts 125 is shown as removed in FIG. 23. Knockouts 125 each have a cover portion 131 that is connected by breakable strips 133. Breakable strips 133 are breakable so that cover portion 131 can be removed to uncover openings 129.

Figure 20:
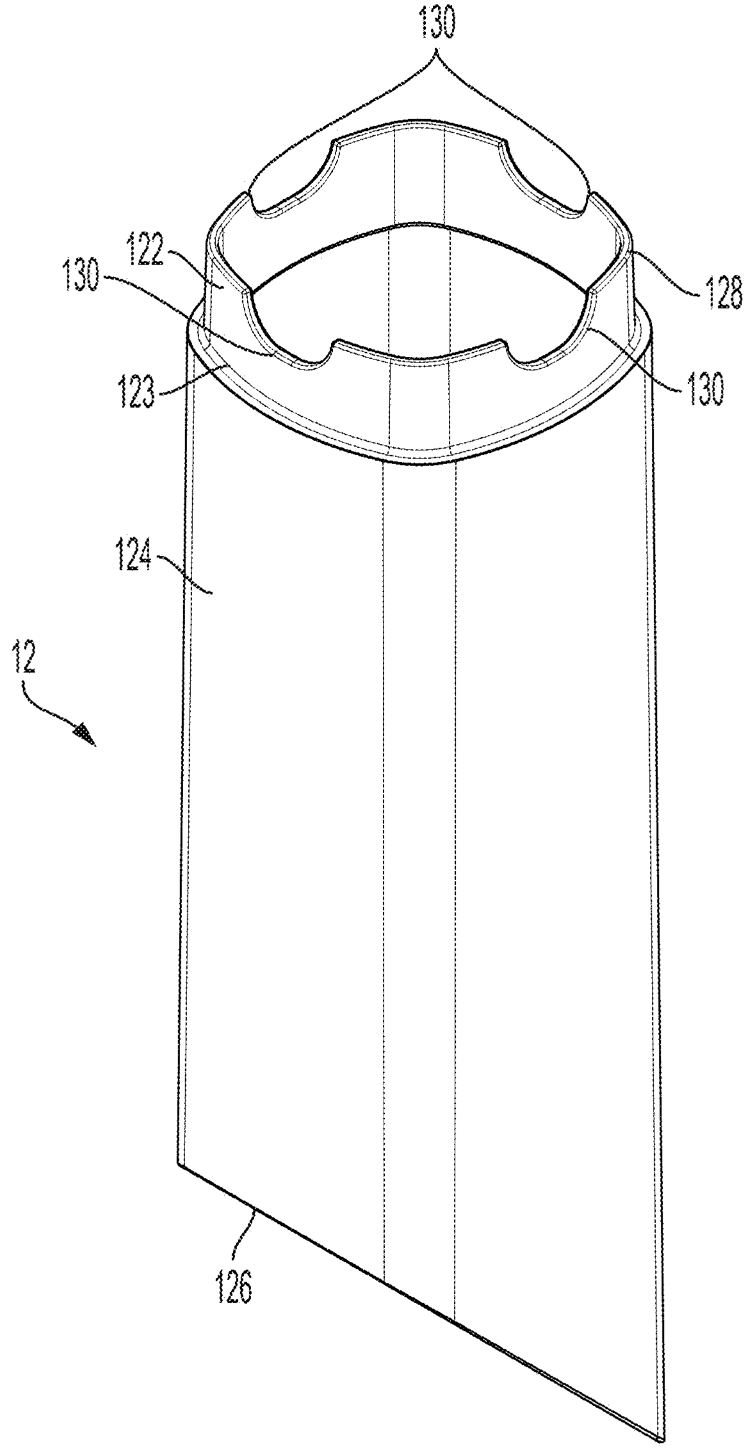
FIG. 20 is a perspective view of a base of the post of FIG. 16.

Referring to FIG. 20, base 12 has a base connection portion 122 that extends from a first end 123 of a body portion 124 that is open. Body portion 124 has a second end 126 opposite first end 123 that is open. Second end 126 has a slanted shape. Connection portion 122 has a sidewall 128 that has cutouts 130. Cutouts 130 are an alignment feature to help ensure inner slide 14 seats to base 12 in the proper orientation during installation. Sidewall 128 is sized to connect to slide connection portion 104 of inner slide 14.

Referring to FIG. 20, when post is assembled, inner slide connection portion 104 of inner slide 14 is positioned over base connection portion 122 of base 12. Screw 42 passes through hole 44 (FIG. 21) through inner slide 14 and hole 46 through base 12 to connect inner slide 14 to base 12.

Upper screw 30 passes through top aperture 32 in inner slide 14, through upper opening 34 in plate 26 and through top flange 29 of electrical outlet 22, and lower screw 36 passes through bottom aperture 38 in inner slide 14 through lower opening 40 in plate 26 and through bottom flange 27 of electrical outlet 22 connecting plate 26 between inner slide 14 and electrical outlet 22.

Figure 22:
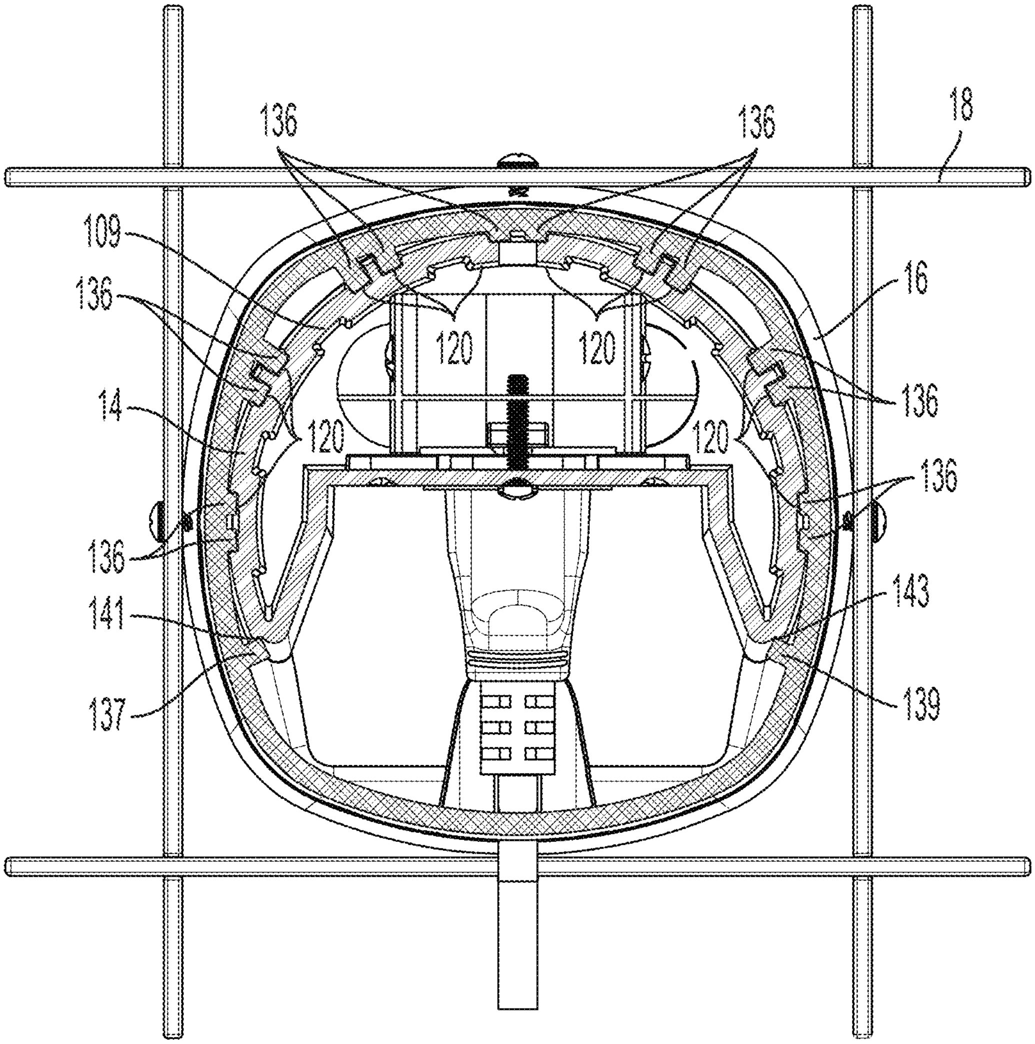
FIG. 22 is a top cross-sectional view of the post of FIG. 16

Cover 16 fits over side wall 106 of inner slide 14 so that cover 16 can slide between the closed position shown in FIG. 1 and the open position shown in FIG. 2. Cover 16 has an interior surface 132 and an exterior surface 134. Cover 16 has ridges 136 that mate with tracks 120 on inner slide 14 that are shown in FIG. 22. Cover 16 has one of ridges 136 in one of tracks 120 for some of ridges 136 and two ridges 136 in one of tracks 120 for other of ridges 136. Ridges 136 and tracks 120 guide cover 16 as it slides between the closed position and the open position on inner slide 14. Cover 16 has first end ridge 137 and a second end ridge 139. Cover portion 109 of inner slide 14 has a first groove 141 and a second groove 143. First end ridge 137 fits in first groove 141 and second end ridge 139 fits in second groove 143. Ridges 136, tracks 120, first end ridge 137, second end ridge 139, first groove 141 and a second groove 143 guide cover 16 as it slides between the closed position and the open position on inner slide 14.

Figure 24:
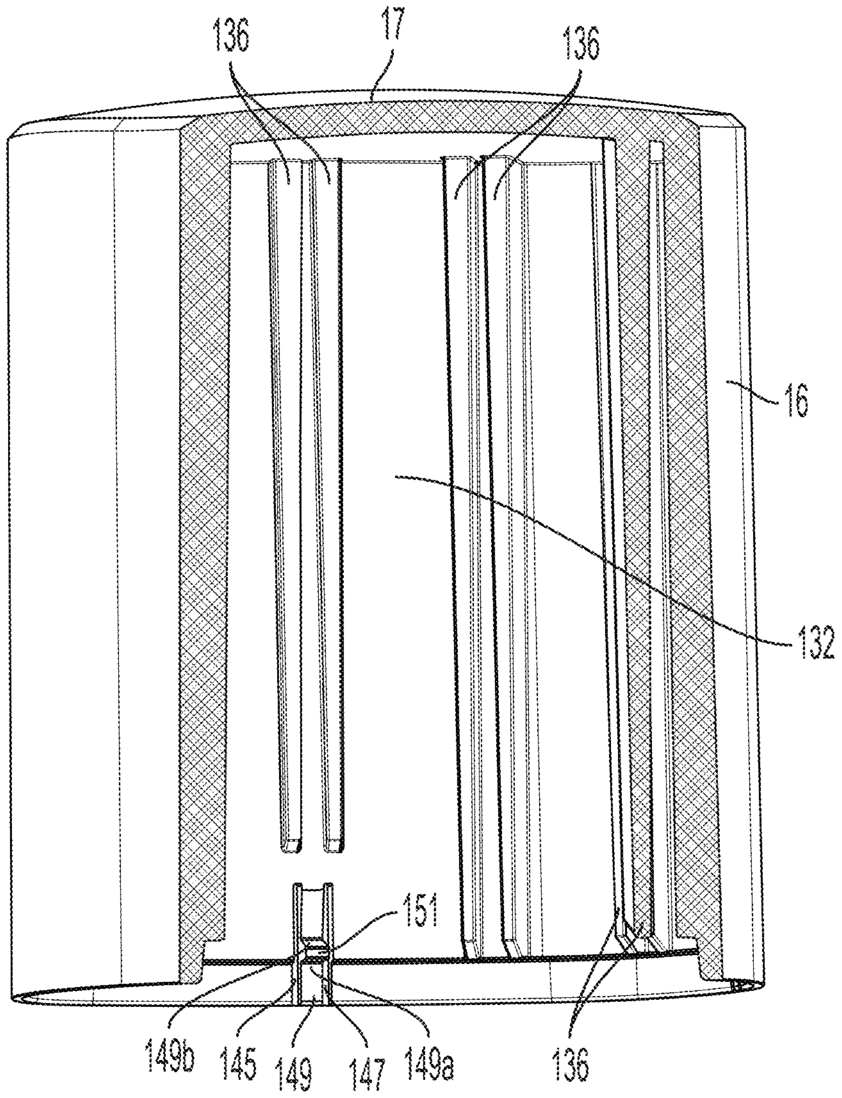
FIG. 24 is a perspective view of a cover of the post of FIG. 16 having a portion removed.
Figure 25:
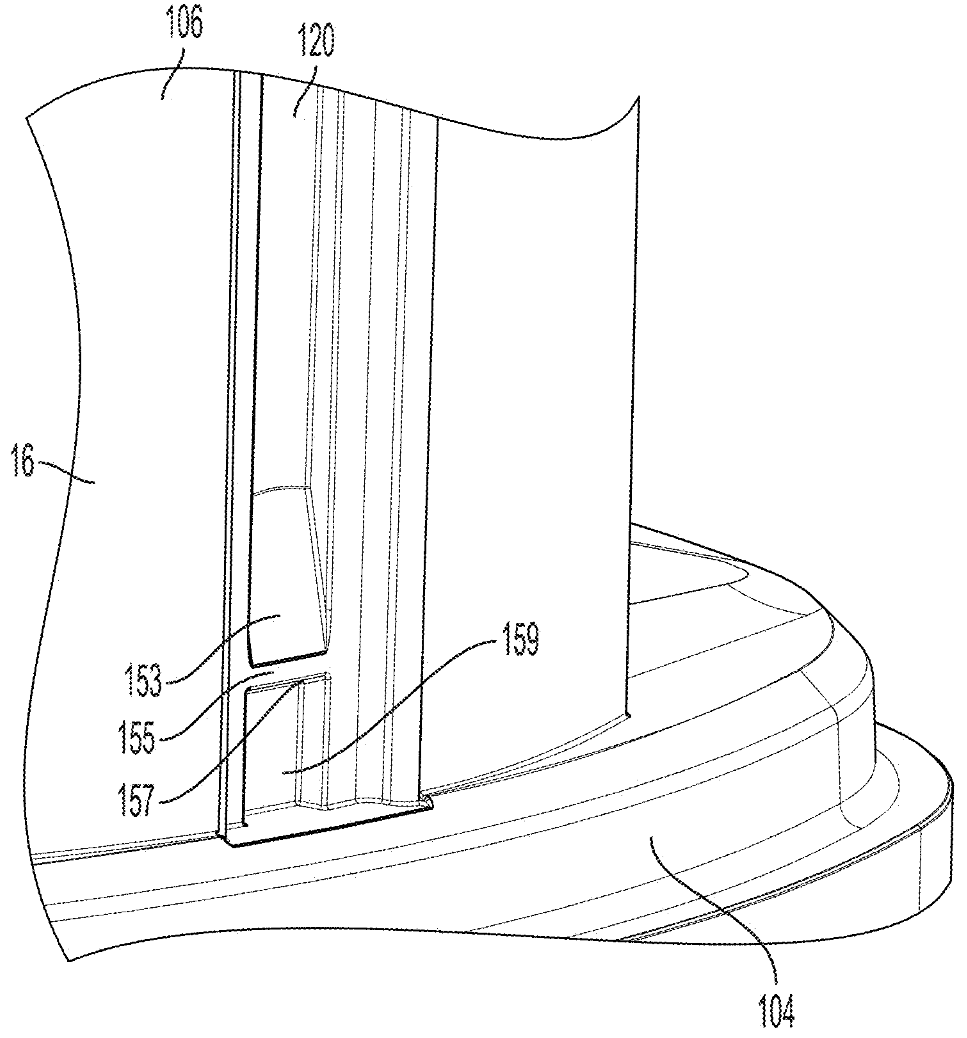
FIG. 25 is a partial, enlarged perspective view of the inner slide.

As shown in FIG. 24, at a bottom of a pair of ridges 136 of cover 16 two slits 145, 147 form a tongue 149. Ridges 136 extend to top wall 17 of cover 16. Tongue 149 has a free end on a first end and a connection to a remainder of inner slide 16 on a second end that is opposite the first end. Tongue 149 has a protrusion 151. Protrusion 151 has a first ramp 149*a* that slants outward toward the free end and a second ramp 149*b* that slants in an opposite direction. As shown in FIG. 25, side wall 106 of inner slide 14 has a ramp 153 at a portion of one of tracks 120 near connection portion 104. Ramp 153 slants from the one of tracks 120 up to a flat portion 155. A wall 157 extends from flat portion 155 to a receiving depression 159. To maintain cover 16 in the closed position on inner slide 14, protrusion 151 of tongue 149 slides in the one of tracks 120 so that first ramp 151*a* of cover 16 contacts ramp 153 of inner slide 14. Ramp 153 deforms tongue 149 outward to allow protrusion 151 to slide over ramp 153 into receiving depression 159. Once protrusion 151 is over receiving depression 159, tongue 149 urges protrusion 151 in receiving depression 159 to secure cover 16 to inner slide 14 in the closed position. To move cover 16 to the open position on inner slide 14, protrusion 151 has second ramp 151*b* facing wall 157. Movement of protrusion 151 away from receiving depression 159 urges second ramp 151*b* against wall 157 to deform tongue 149 outward to allow protrusion 151 to slide over ramp 153 back into the one of tracks 120. Cover 16 has three tongues 149 at bottoms of pairs of ridges 136 on opposite sides of cover 16 and at a back of cover 16. Side wall 106 of inner slide 14 has three of each of ramps 153, flat portions 155 and receiving depressions 159 at portions of tracks 120 near connection portion 104 on opposite sides of inner slide 14 and on a back of inner slide 16 at locations to receive each of the three tongues 149 of cover 16.

Figure 26:
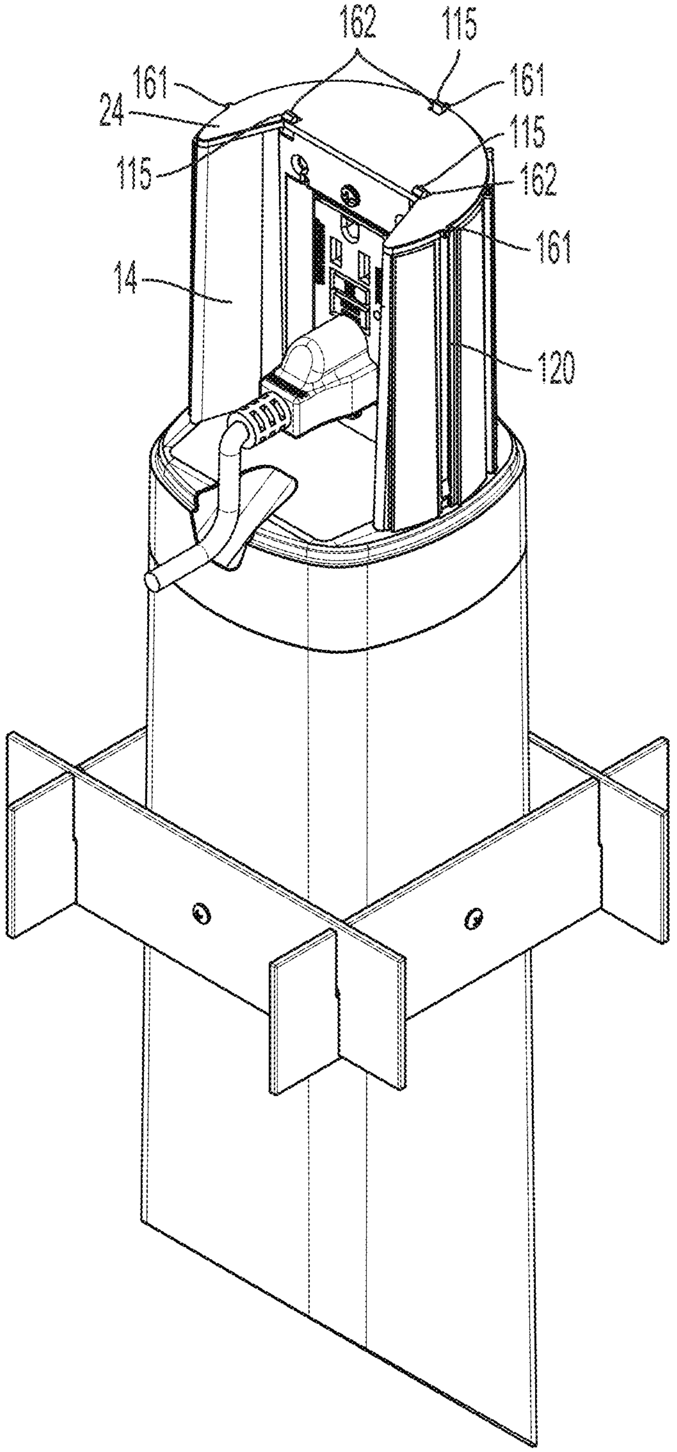
FIG. 26 is a perspective view of the post of FIG. 16 with the cover removed.

Referring to FIG. 26, inner top clip 24 connects to sidewall 106, for example, by a snap fit where hooks 115 of sidewall 106 pass through holes 162 through inner top clip 24. Inner top clip 24 is a flat plate having a shape that corresponds to the shape of side wall 106 of inner slide 14 to cover open end 105 (FIG. 19). Inner top clip 24 has projections 161. To connect cover 16 to inner slide 14, second ramps 151*b* of protrusions 151 on tongues 149 of cover 16 each contact one of projections 161 to deform tongues 149 outward, so that each of protrusions 151 can move over the one of projections 161 into one of tracks 120. Each of projections 161 extends over the one of tracks 120 to block protrusions 151 from moving out of tracks 120 maintaining the connection of cover 16 to inner slide 14. To disconnect cover 16 from inner slide 16, cover 16 is moved to urge first ramps 151*a* of protrusions 151 on tongues 149 of cover 16 against the one of projections 161 to deform tongues 149 outward, so that each of protrusions 151 can move over the one of projections 161 out of the one of tracks 120 to disconnect cover 16 from inner slide 14.

Alternatively, when assembling post 10, before inner top clip 24 connects to inner slide 14, cover 16 is placed on inner slide 14 so that ridges 136 are in tracks 120. After cover 16 is placed on inner slide 14 so that ridges 136 are in tracks 120, then inner top clip 24 connects to inner slide 14. In this alternative, inner top clip 24 can be removed allowing protrusions 151 to slide out of tracks 120 to disassembly cover 16 from inner slide 14.

Plug 502 is removably connectable to electrical outlet 22. When cover 16 is in a closed position, as shown in FIG. 16, plug wire 500 is between cover 16 and depression 20 in inner slide connection portion 104 of inner slide 14.

Referring back to FIG. 21, stabilizing fin 18 is connectable to base 12. Screw 90 passes through aperture 88 of first member 48 and penetrates into body 124 of base 12 connecting first member 48 and base 12. Referring to FIG. 23, screw 94 passes through aperture 92 of second member 50 and penetrates into body 124 of base 12 connecting second member 50 and base 12. Screw 98 passes through aperture 96 of third member 52 connecting third member 52 and base 12. Screw 102 passes through aperture 100 of fourth member 54 connecting fourth member 54 and base 12. Body 124 of base 12 can have holes or depressions that are positioned to receive screws 90, 94, 98 and 102 in a predetermined location. Alternatively, body 124 of base 12 can have holes or depressions that are positioned to receive screws 90, 94, 98 and 102 in different predetermined locations to connect stabilizing fin 18 at different heights on base 12.

Referring to FIGS. 12-15, post 10 has cover 16 that is removably connected to inner slide 14 so that post 10 can interchange with covers 1100, 1200, 1300, 1400 that are modified. Cover 1100 can be modified to be the same as cover 16 except that a wireless speaker 1102 is connected to top wall 17. Cover 1200 can be modified to be the same as cover 16 except that a Bollard style LED light 1202 is connected to top wall 17. Cover 1300 can be modified to be the same as cover 16 except that a Pagoda Style Path light 1302 is connected to top wall 17. Cover 1400 can be modified to be the same as cover 16 except that an area path light 1402 is connected to top wall 17. Each of covers 1100, 1200, 1300, 1400 can be modified to connect and disconnect from inner slide the same as cover 16. Depressions 110, 112, 114 on inner slide 14 are used to capture the device inserts of covers 1100, 1200, 1300, 1400 so that they snap together.

Figure 21:
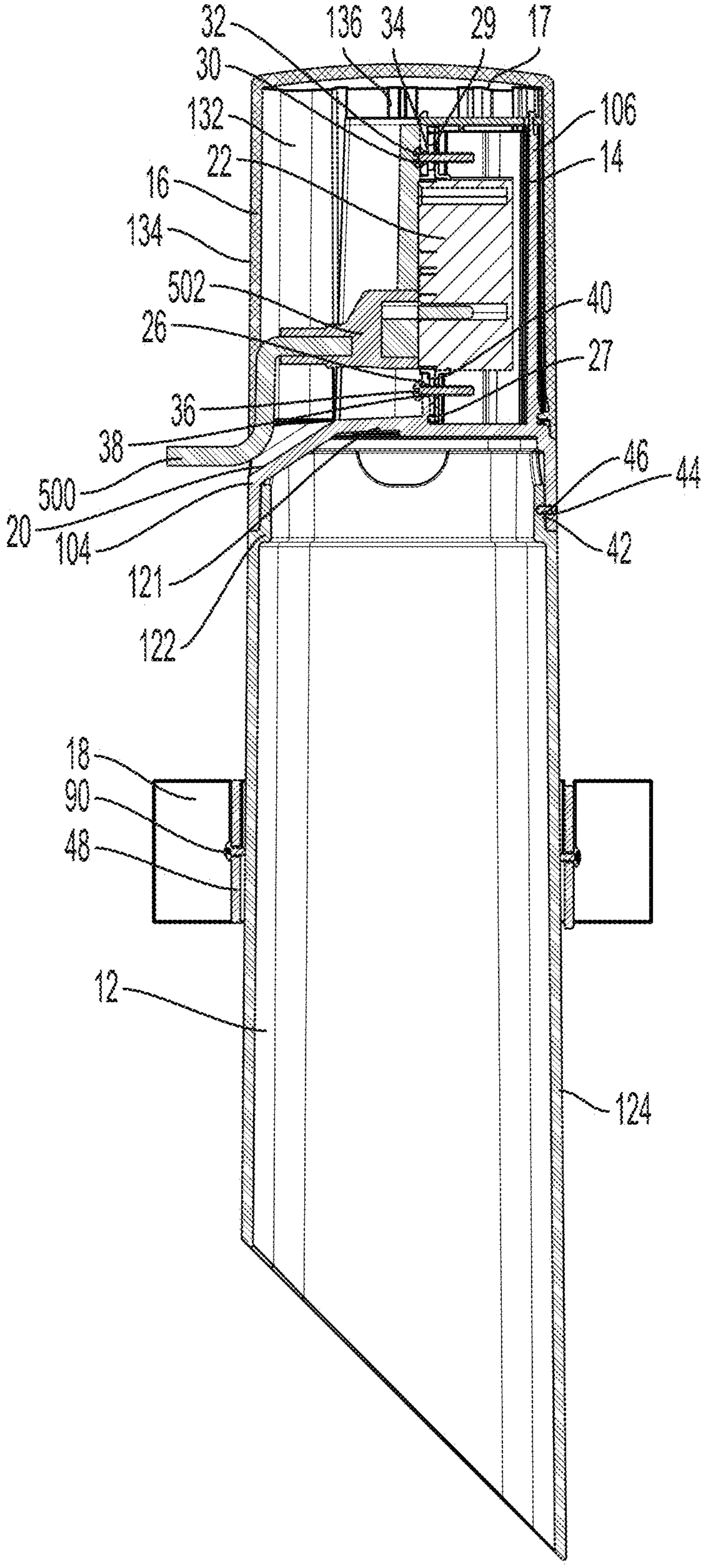
FIG. 21 is a side cross-sectional view of the post of FIG. 16.

Referring to FIG. 21, to install post 10, wires from one or more power sources are inserted through open end of body portion 124 and through one or both knockouts 125. One or more of the wires passes through one of knockouts 125 to connect to electrical outlet 22. One of wires can also pass through the other of knockouts 125 to connected to wireless speaker 1102, Bollard style LED light 1202, Pagoda Style Path light 1302, or area path light 1402 depending on if one of covers 1100, 1200, 1300, 1400 is connected to inner slide 14. The other of knockouts 125 can remain covered when using cover 16 as shown in FIG. 23. Once wires are connected, then a portion of base 12 that is connected to stabilizing fin 18 is buried in a desired location in the ground. Once installed, one of covers 16, 1100, 1200, 1300, 1400 can be lifted to access electrical outlet 22 to plug plug 502 into electrical outlet 22 so that electricity conducts through plug 502 and plug wire 500. If one of covers 1100, 1200, 1300, 1400 are connected to inner slide 14, electricity is conducted to one of Bluetooth speaker 1102, Bollard style LED light 1202, Pagoda Style Path light 1302, or area path light 1402 by the wires.

Figure 27:
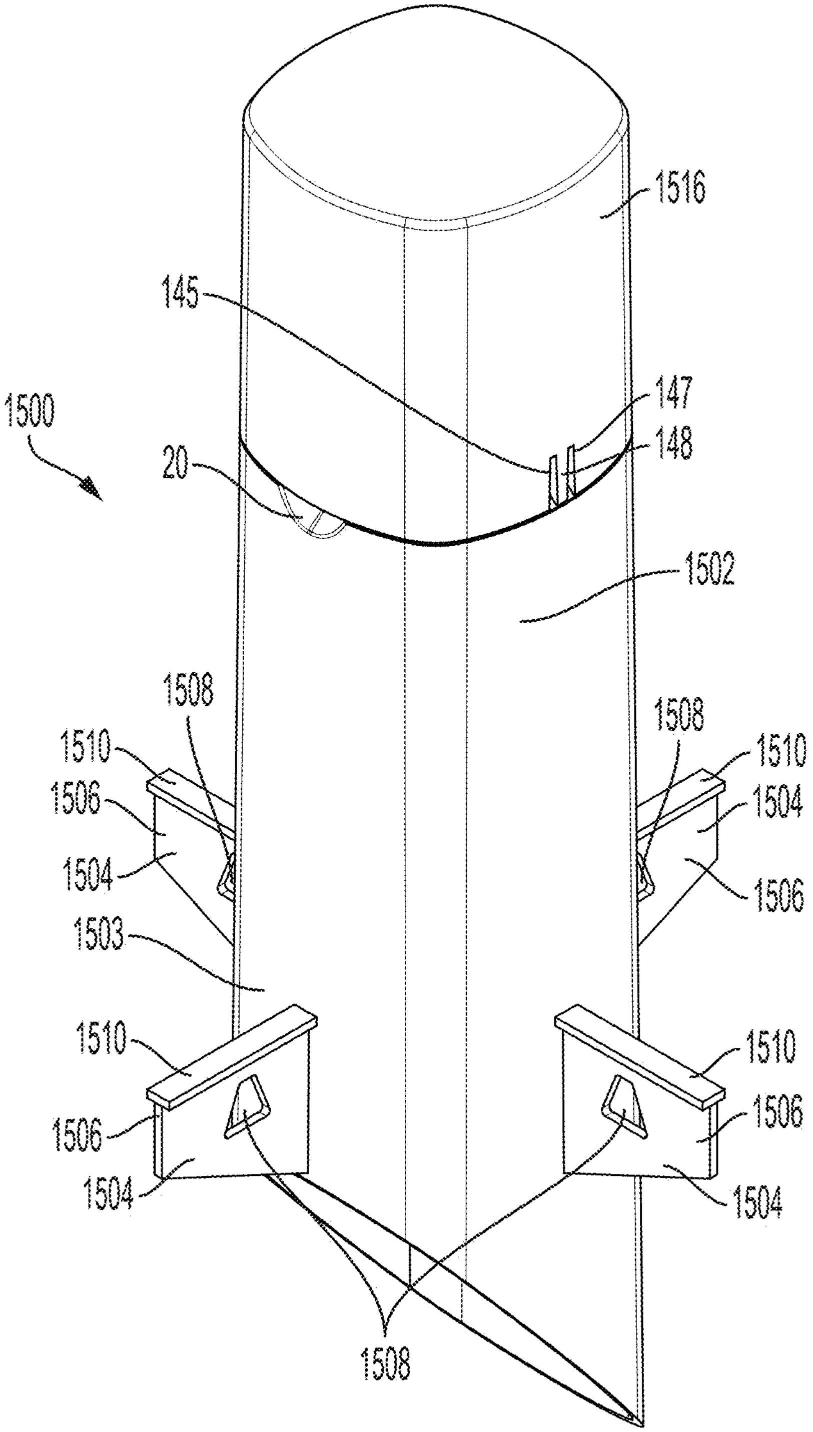
FIG. 27 is a perspective view of a third embodiment of a post of the present disclosure.

Referring to FIG. 27, a third embodiment of a post according to the present disclosure is shown and is generally referred to by reference numeral 1500. Features of post 1500 that are the same as post 10 use the same reference numerals.

Figure 28:
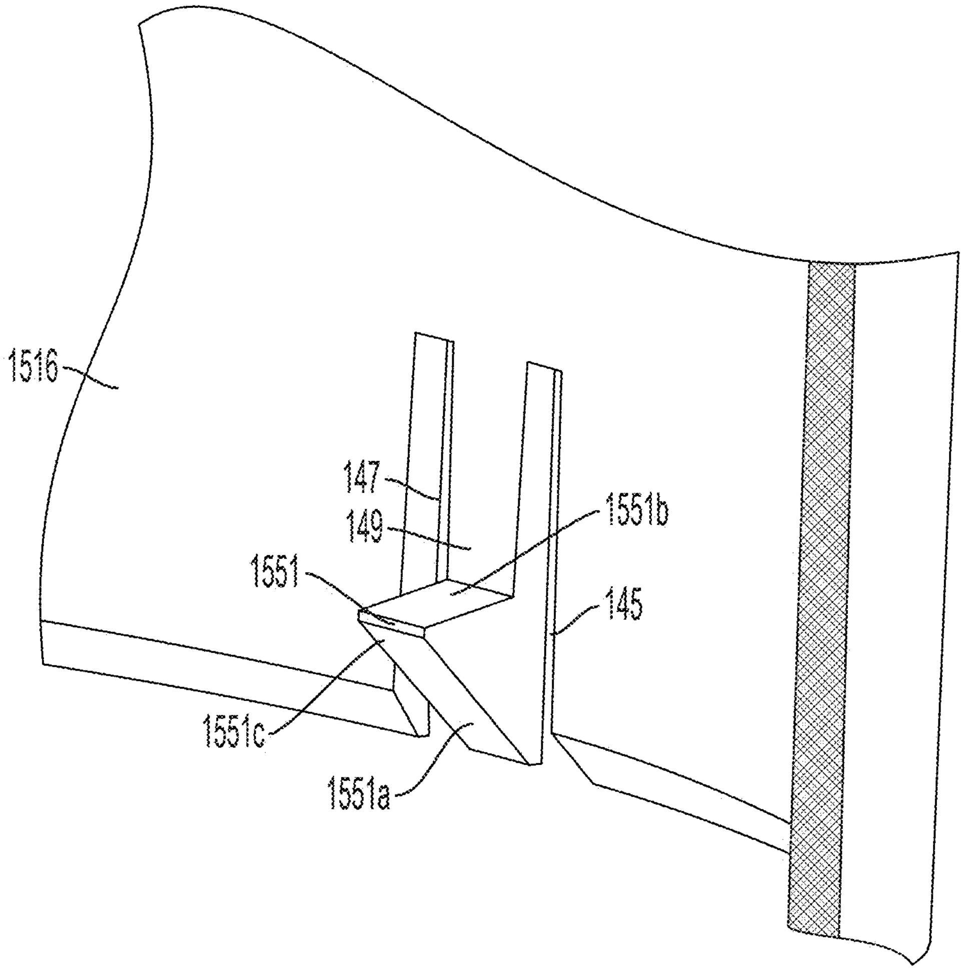
FIG. 28 is a partial, enlarged perspective view of an interior of a cover of the post of FIG. 27.

Post 1500 has a body 1502 and a cover 1516. Cover 1516 is the same as cover 16 except omits ridges 136 and protrusions 151 are replaced with protrusions 1551 having a different shape. Referring to FIG. 28, protrusion 1551 has a first ramp 1551*a* and a second ramp 1551*b* that slant in opposing directions to form an apex 1551*c* where first ramp 1551*a* and second ramp 1551*b* meet. Second ramp 1551*b* is smaller than first ramp 1551*a*.

Figure 29:
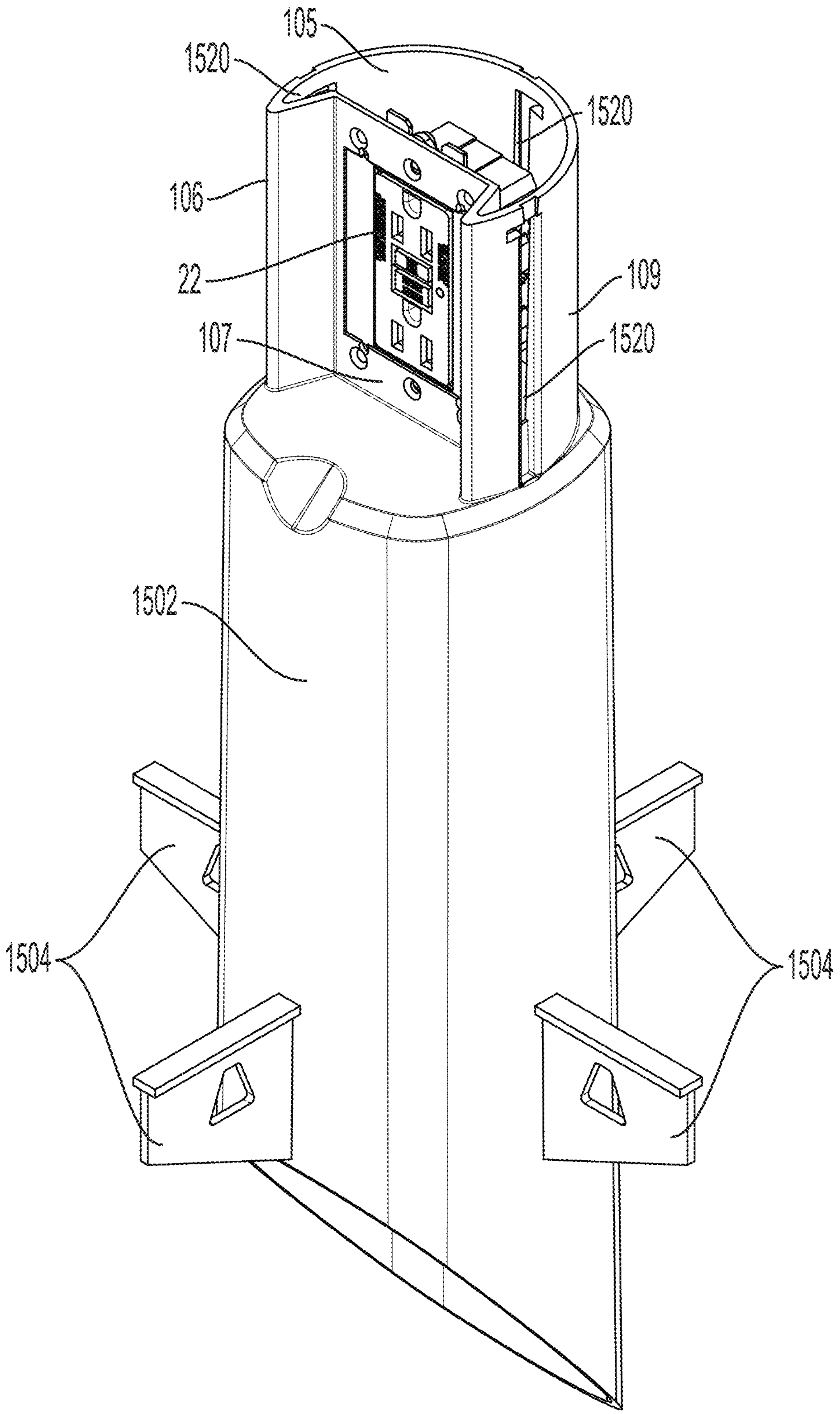
FIG. 29 is a perspective view of the post of FIG. 27 with the cover removed.

Referring to FIG. 29, body 1502 of post 1500 is the same as base 12 of post 10 except (1) body 1502 combines base 12 and inner slide 14 to form of a single integral piece, (2) body 1502 has sidewall 106 that replaces tracks 120 with slots 1520, (3) body 1502 replaces stabilizing fin 18 with fins 1504, and (4) body 1502 has inner wall 121 with a single opening 1525 instead of two knockouts 125.

Each of slots 1520 is an opening. The opening of each of slots is an upside down L shape that has a horizontal portion adjacent open end 105 and a vertical portion that extends from the horizontal portion in a direction towards fins 1504.

Body 1502 has a bottom portion 1503. Fins 1504 are integral with body 1502. Each of fins 1504 has a fin body 1506. Each of fins 1504 has a hole 1508 that passes through fin body 1506. Each of fins 1504 has a flange 1510 connected to a top of fin body 1506.

Figure 30:
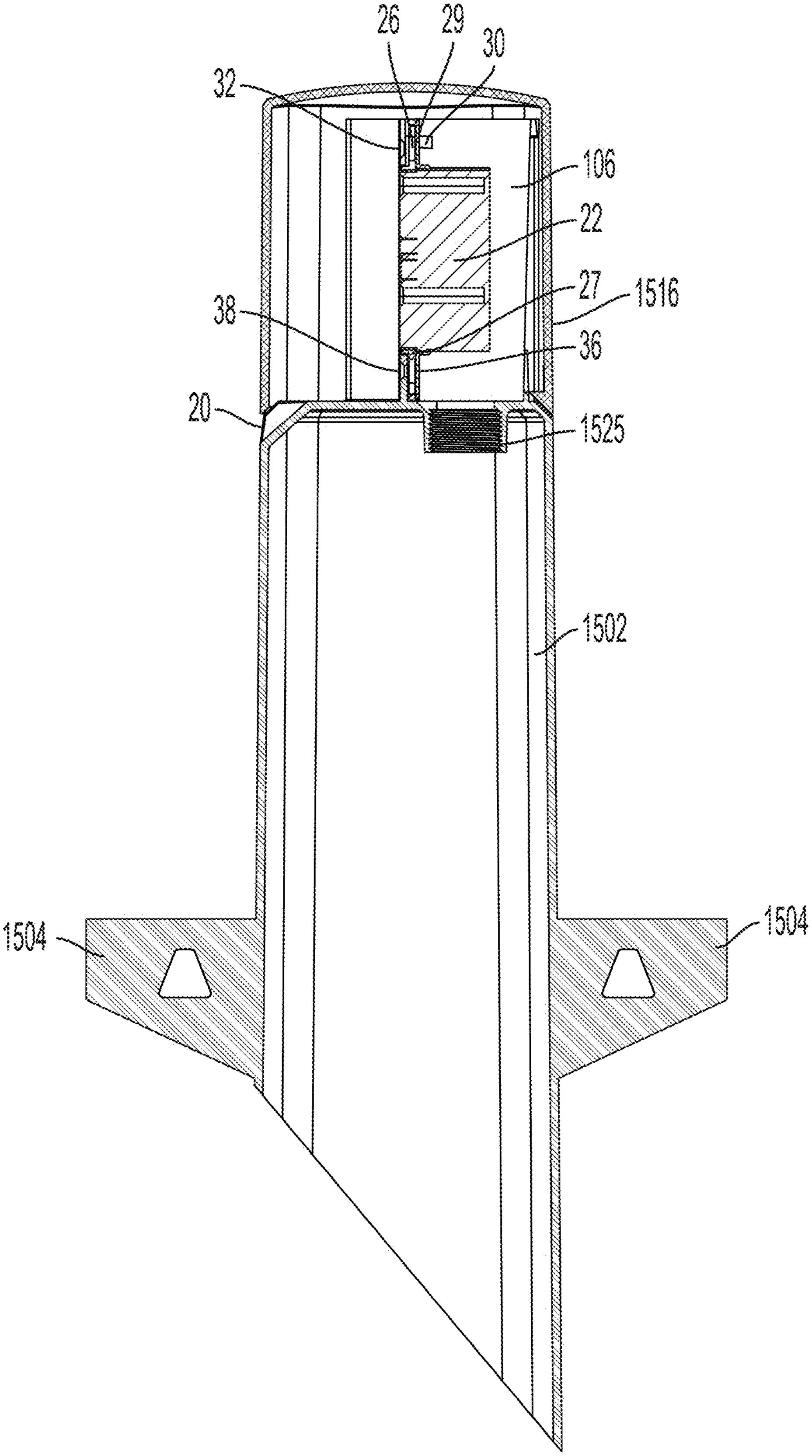
FIG. 30 is a cross-section of the post of FIG. 27.

Referring to FIG. 30, post 1500 is assembled by placing cover 1516 over sidewall 106 of body 1502. Cover 1516 connects to sidewall 106 by positioning each of protrusions 1551 into one of slots 1520 by urging first ramp 1551*a* against sidewall 106 to deform tongue 149 outward to allow protrusion 1551 to slide over sidewall 106 into one of slots 1520. Once protrusion 1551 is over one of slots 1520, tongue 149 urges protrusion 1551 in one of slots 1520 to secure cover 1516 to body 1502. To disconnect cover 1516 from sidewall 106, movement of protrusion 1551 away from one of slots 1520 so that second ramp 1551*b* contacts sidewall 106 to deform tongue 149 outward to allow protrusion 1551 to slide over sidewall 106 out of the one of tracks 1520. Cover 1516 has three tongues 149 on opposite sides of cover 1516 and at a back of cover 1516. Side wall 106 has three slots 1520 on opposite sides of sidewall 106 and on a back of sidewall 106 at locations to receive each of the three protrusions 1551. To maintain cover 1516 in the open position, cover is moved away from body 1502 until protrusions 1551 contact an end of slots 1520 in the vertical portion, then cover 1516 is rotated in a first rotation direction so that protrusions 1551 are moved into the horizontal portion of slots 1520 to a locked position. Cover 1516 can be moved out of the locked position by rotating cover 1516 in a second rotation direction that is opposite the first rotation direction so that protrusions 1551 are moved out of the horizontal portion of slots 1520 back into the vertical portion of slots 1520 allowing protrusions 1551 to move in the vertical portion slots 1520 to the closed position. It is further noted that post 1500 omits inner top clip 24 of post 10 and single opening 1525 is shown as threaded.

Post 1500 has interchangeable covers. Covers 1100, 1200, 1300, 1400 can be modified to omit ridges 136 and replace protrusion 151 with protrusions 1551 so that they can be interchanged with cover 1506.

To install post 1500, wires from one or more power sources are connected through open end of body 1502 and through opening 1525 to connect to electrical outlet 22, and wires can also pass through opening 1525 to be connected to Bluetooth speaker 1102, Bollard style LED light 1202, Pagoda Style Path light 1302, or area path light 1402 depending on if one of covers 1100, 1200, 1300, 1400 is connected to sidewall 106. Once wires are connected, then a portion of body 1502 having fins 1504 is buried in a desired location in the ground. Once installed, one of covers 1516, 1100, 1200, 1300, 1400 can be lifted to access electrical outlet 22 to plug plug 502 into electrical outlet 22 so that electricity conducts through plug 502 and plug wire 500. If one of covers 1100, 1200, 1300, 1400 are connected to sidewall 106, electricity is conducted to one of Bluetooth speaker 1102, Bollard style LED light 1202, Pagoda Style Path light 1302, or area path light 1402 by the wires.

Figure 31:
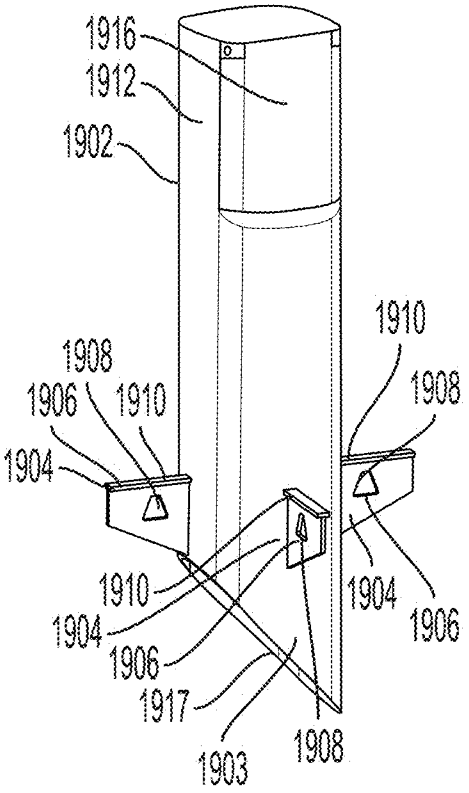
FIG. 31 is a perspective view of a fourth embodiment of a post of the present disclosure in a closed position.
Figure 32:
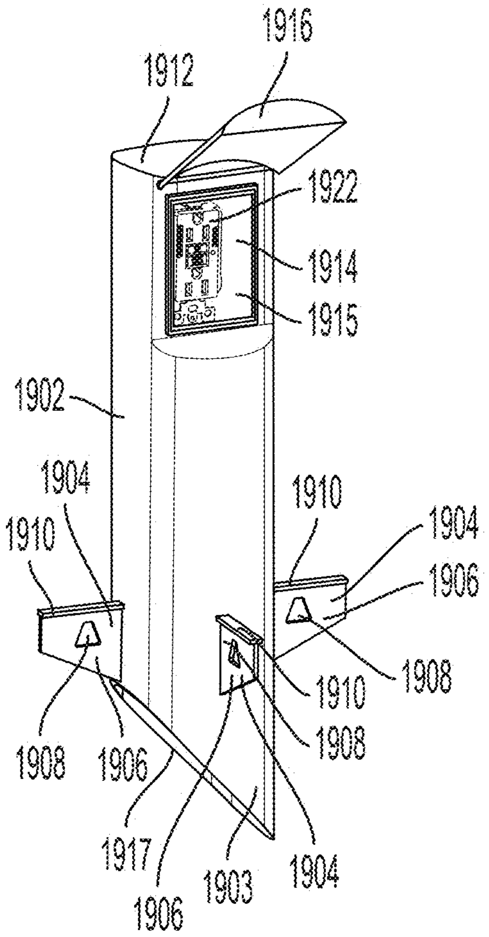
FIG. 32 is a perspective view of the post of FIG. 31 in an open position.
Figure 33:
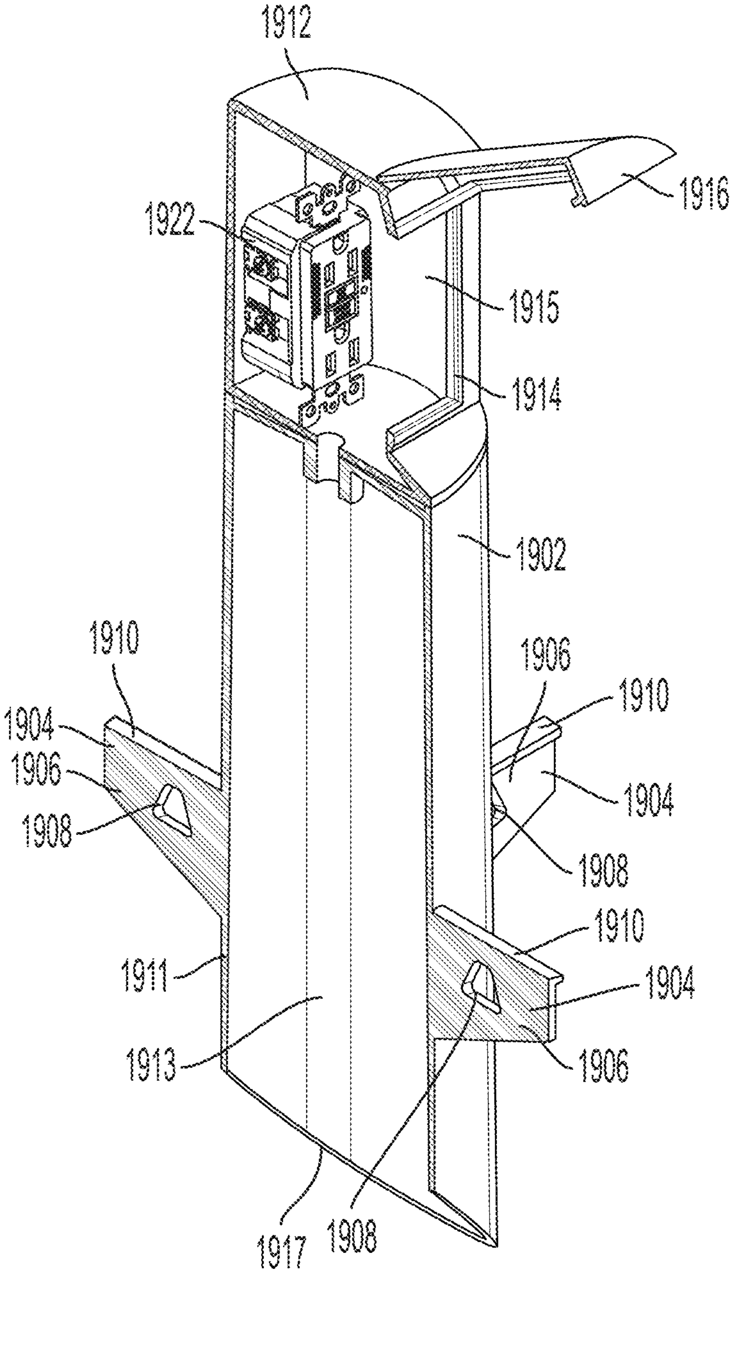
FIG. 33 is a cross-sectional view of the post of FIG. 31.

Referring to FIGS. 31-33, a fourth embodiment of a post according to the present disclosure is shown and is generally referred to by reference numeral 1900.

Post 1900 has a body 1902. Body 1902 has a bottom portion 1903. Bottom portion 1903 has fins 1904. Fins 1904 are integral with body 1902. Each of fins 1904 has a fin body 1906. Each of fins 1904 has a hole 1908 that passes through fin body 1906. Each of fins 1904 has a flange 1910 connected to a top of fin body 1906. As shown in FIG. 33, body 1902 has an outer wall 1911 that surrounds an inner volume 1913 and has an open bottom 1917.

Post 1900 has a top portion 1912. Top portion 1912 has an opening 1914. Opening 1914 is selectively coverable by a cover 1916. Cover 1916 is connected to top portion 1912 by a hinge connection. Cover 1916 is rotatable between a closed position as shown in FIG. 19 and an open position as shown in FIGS. 20 and 21. Cover 1916 is flush with top portion 1912 and body 1902 in the closed position. Cover 1916 is rotatable about an axis of the hinge connection that is parallel with an opening into interior volume 1915 to flip up and down. Alternatively, cover 1916 can be rotatable about an axis that is at a top center portion of cover 1916 to rotate about a point so that cover 1916 moves side-to-side relative to the opening into interior volume 1915. Top portion 1912 surrounds an interior volume 1915 that is accessible when cover 1916 is in the open position. An electrical outlet 1922 is connectable in interior volume 1915 so that electrical outlet 1922 is accessible in the open position.

To install post 1900, wires from one or more power sources are connected through open bottom 1917 to connect to electrical outlet 1922. Once wires are connected, then a portion of bottom portion 1903 having fins 1904 is buried in a desired location in the ground. Once installed, cover 1916 can be lifted to access electrical outlet 1922 to plug a plug into electrical outlet 1922 so that electricity conducts through the plug.

Figure 33A:
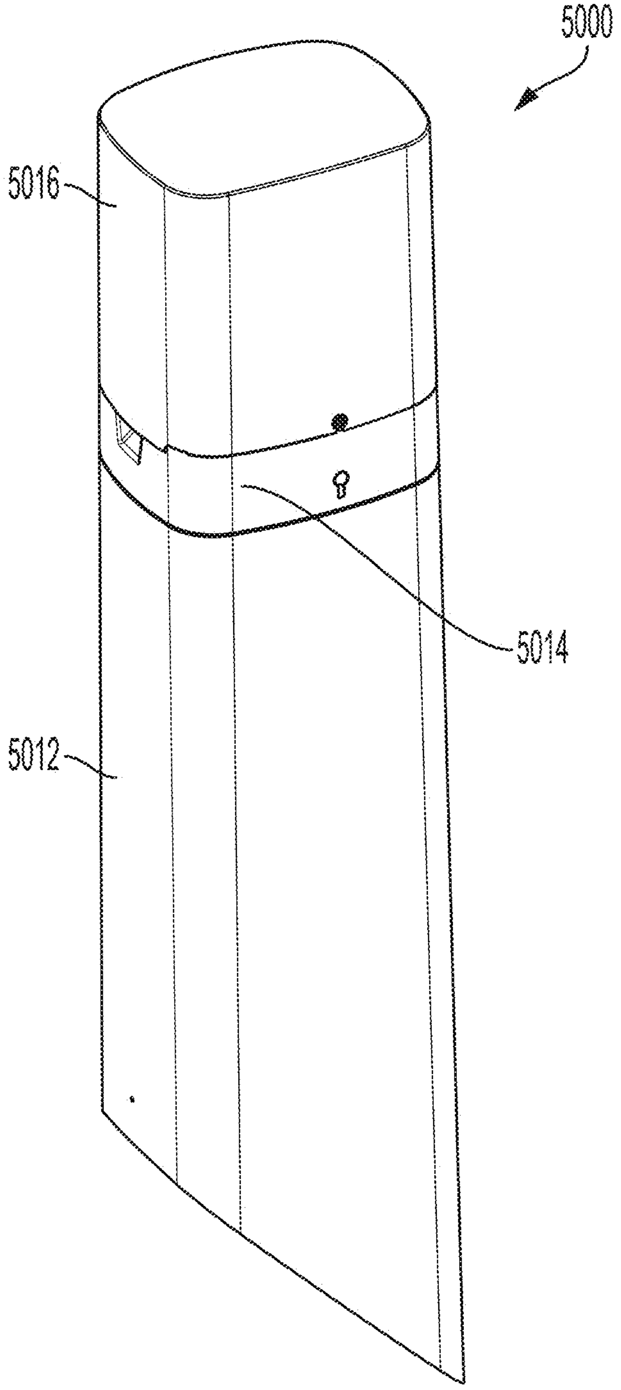
FIG. 33*a* is a perspective view of the post of FIG. 1 that is modified to add stabilizer bars and with the cover in the closed position.
Figure 34:
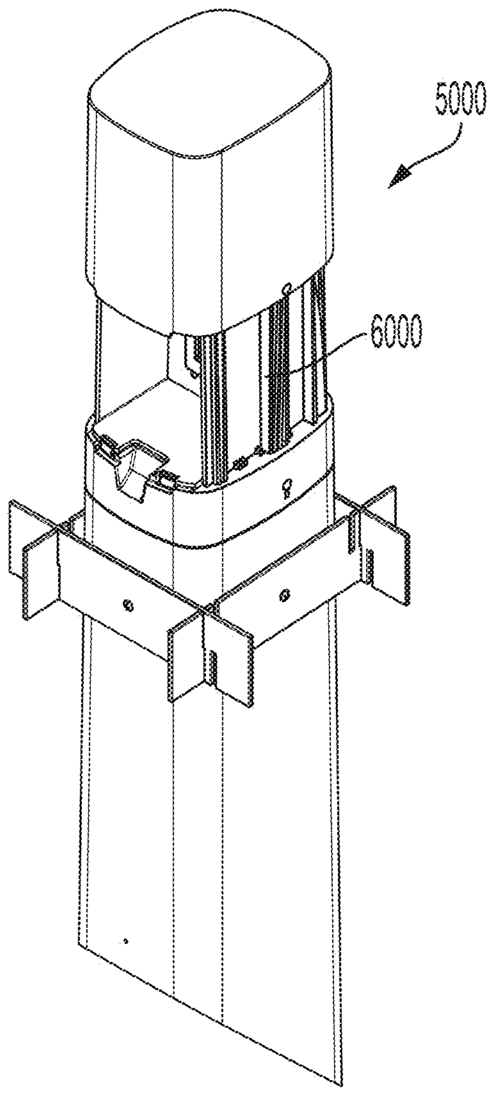
FIG. 34 is a perspective view of the post of FIG. 33*a* with the cover in the open position.

Referring to FIGS. 33*a* and 34, post 1000 of FIGS. 1-15 can include modifications as shown in a post 5000 in FIGS. 34-41 to add stabilizer bars 6000*a*, 6000*b* while the remaining features of post 5000 are the same as post 1000. Features of post 5000 that are the same as post 1000 use the same reference numerals.

Figure 35:
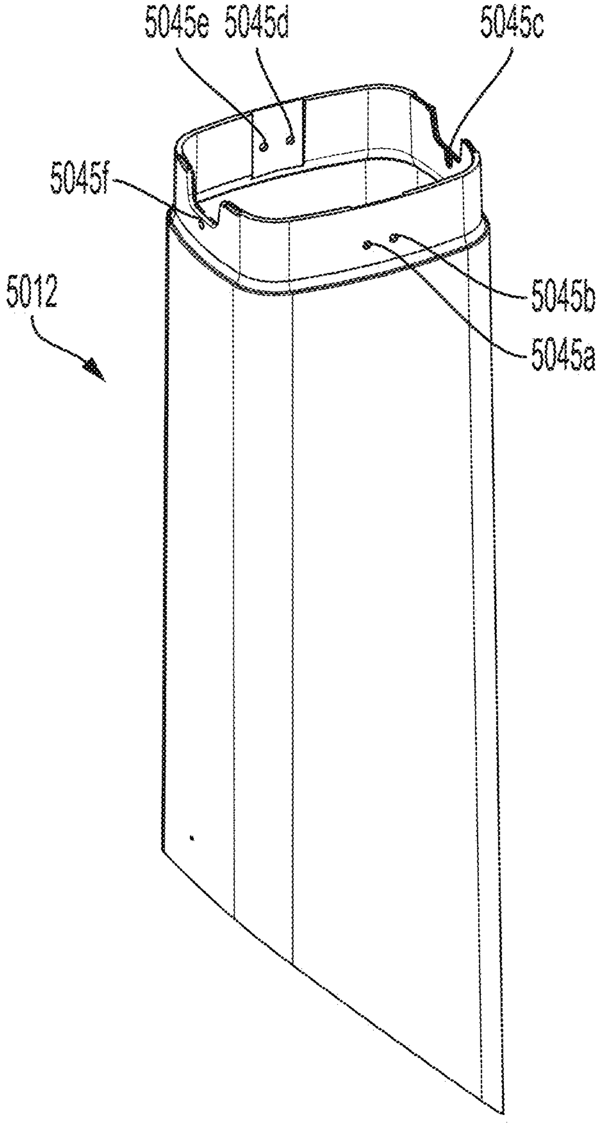
FIG. 35 is a base of the post of FIG. 33*a*.

Referring to FIG. 35, post 5000 has a base 5012 that is the same as base 1012 except base 5012 omits openings 1245 and tongue 1249 and instead has openings 5045*a*, 5045*b*, 5045*c*, 5045*d*, 5045*e*, 5045*f*.

Figure 36:
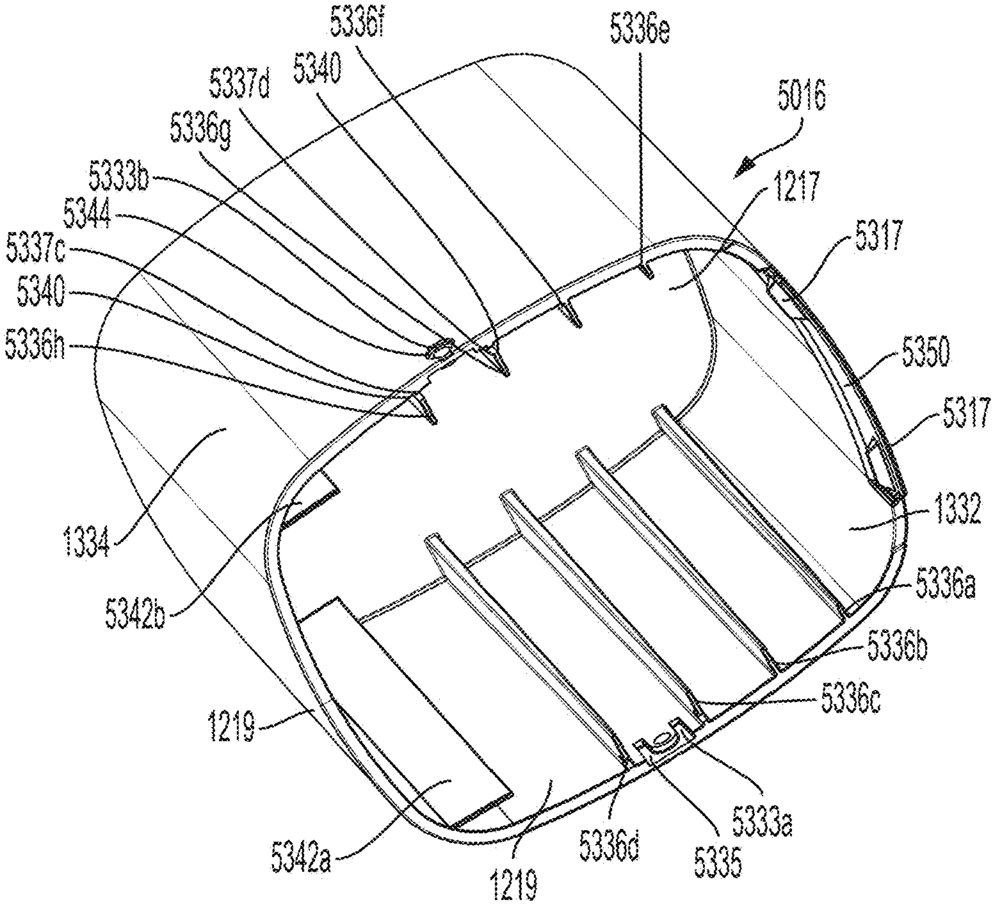
FIG. 36 is a bottom perspective view of the cover of the post of FIG. 33*a*.
Figure 36A:
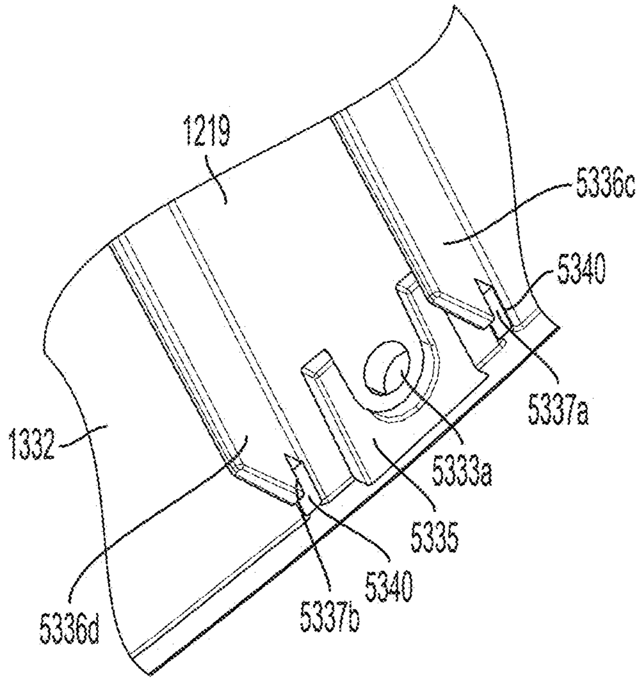
FIG. 36*a* is an enlarged partial perspective view of the cover of FIG. 36.

Referring to FIGS. 36 and 36*a*, cover 5016 of post 5000 is the same as cover 1016 of post 1000 except cover 5016 omits tabs 1343 and protuberances 1338, cover 5016 further omits two of ridges 1336 on opposite sides of cover 1016 furthest from mating tab 1350, thus, has ridges 5336*a*, 5336*b*, 5336*c*, 5336*d* on a first side and 5336*e*, 5336*f*, 5336*g*, 5336*h* on a second opposite side of cover 5016. Ridges 5336*c* and 5336*d* each have a cutout 5337*a*, 5337*b* forming a groove 5340 with interior surface 1332 of side wall 1219. Ridges 5336*g* and 5336*h* each have a cutout 5337*c*, 5337*d* forming a groove 5340 with interior surface 1332 of side wall 1219. Cover 5016 changes a shape of tab 1350 to tab 5350 that is wider and adds two protrusions 5317 extending from interior surface 1332. Cover 5016 also adds holes 5333*a*, 5333*b* on opposite sides of cover 5016 each with a U-shape depression 5335 surrounding each hole 5333*a*, 5333*b* on inner surface 1219 and a depression 5344 surrounding each hole 5333*a*, 5333*b* on exterior surface 1334. Cover 5016 also adds rail members 5342*a*, 5342*b* on opposite sides of cover 5016 extending from side wall 1219 on a side cover 5016 opposite of tab 5350.

Figure 37:
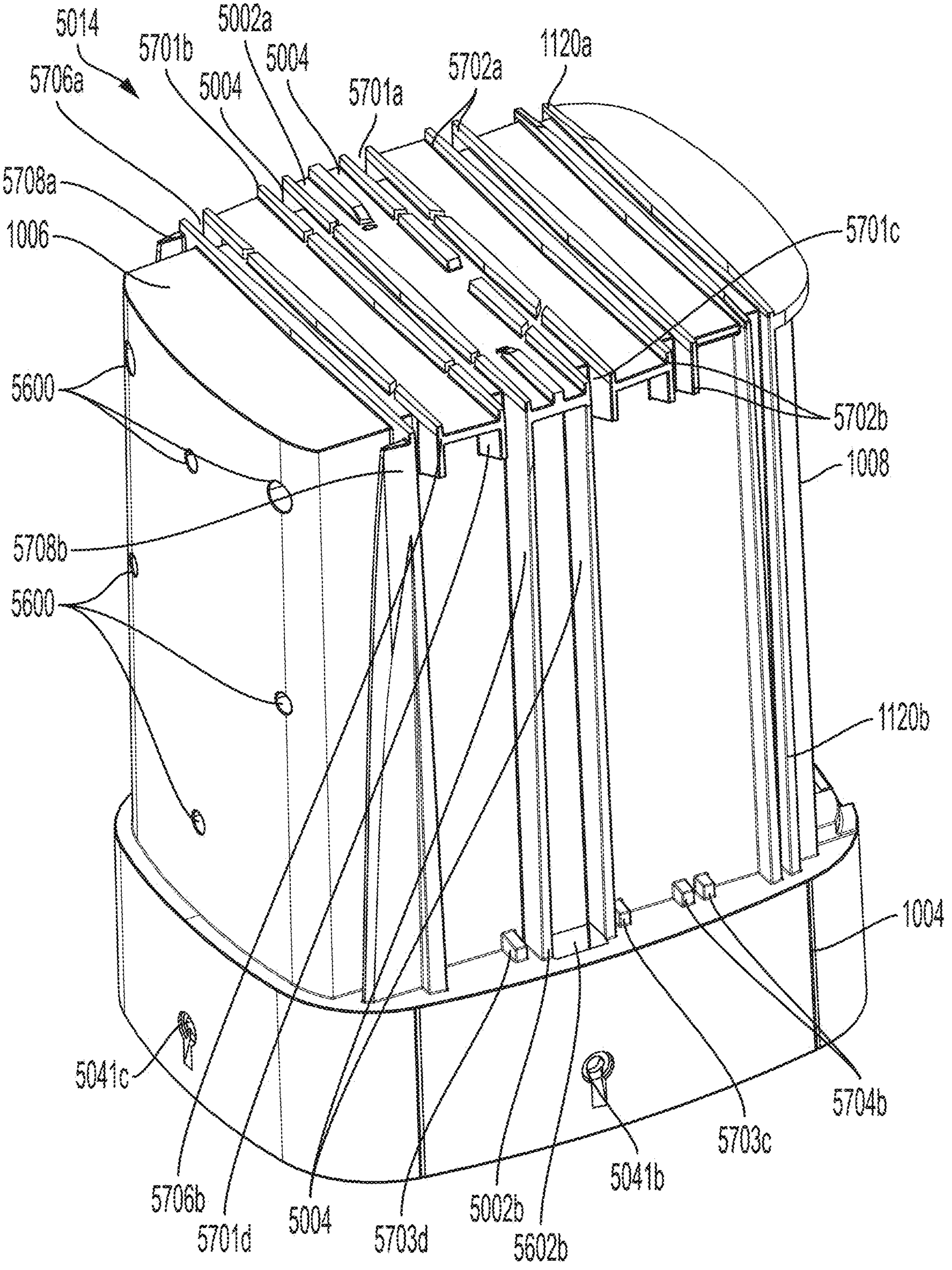
FIG. 37 is a rear perspective view of a top member of the post of FIG. 33*a*.
Figure 38:
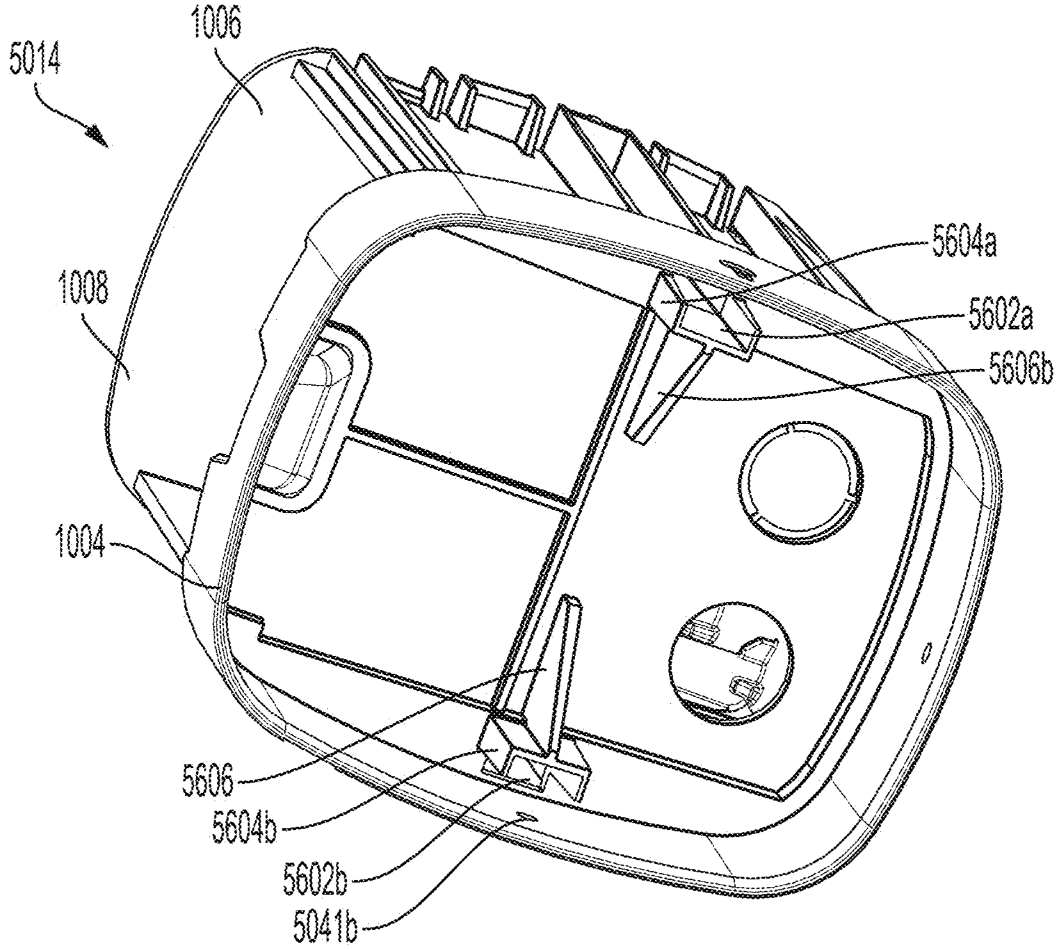
FIG. 38 is a bottom perspective view of the top member of FIG. 37.
Figure 39:
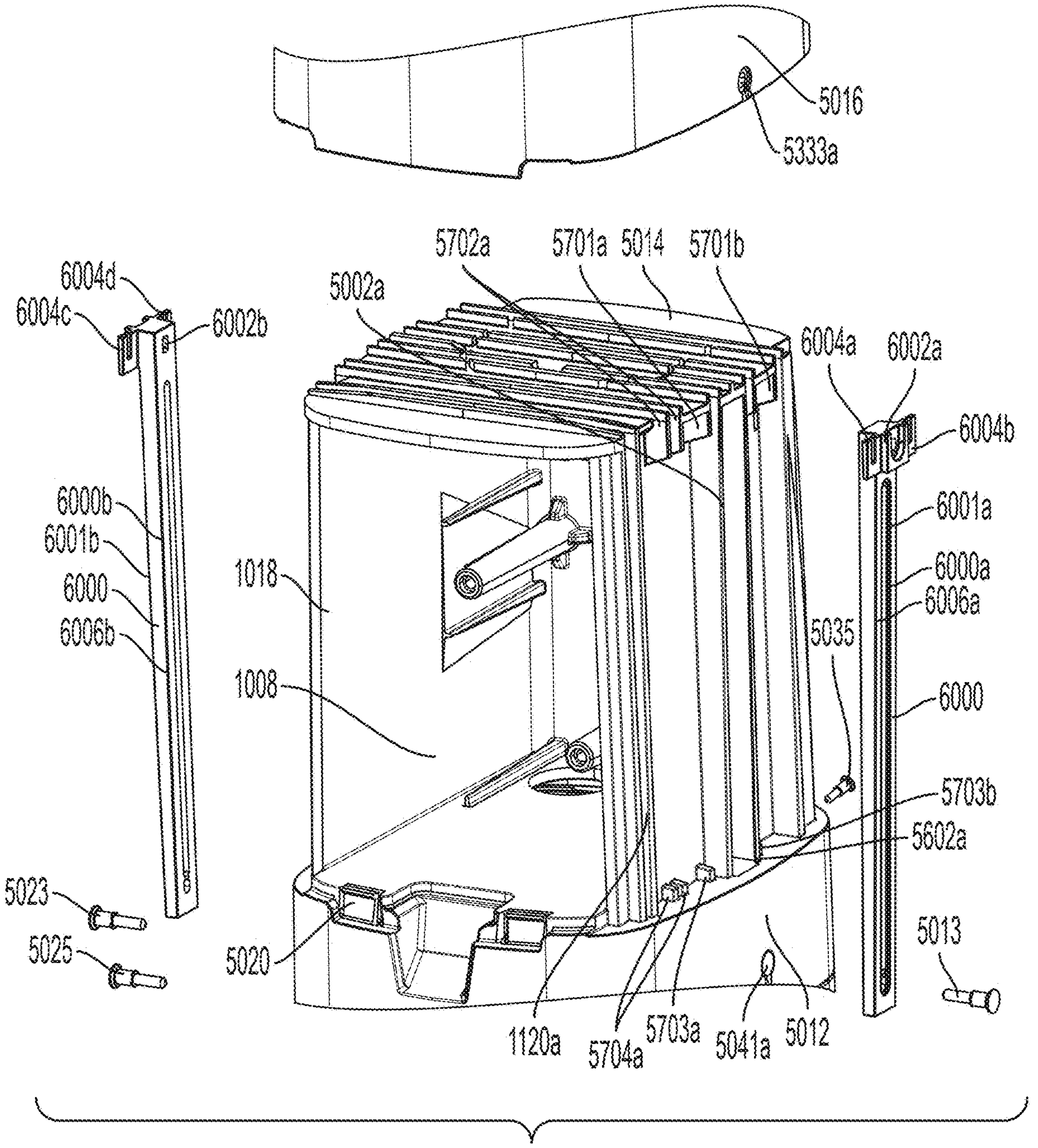
FIG. 39 is a partial, exploded front perspective view of the post of FIG. 33*a*.

Referring to FIG. 37, top member 5014 of post 5000 is the same as top member 1014 of post 1000 except top member 5014 omits four of the rearmost tracks 1120, front ribs 1355, top walls 1160, rear ribs 1357, and, instead top member 5014 of post 5000 has only one of tracks 1120, namely, tracks 1120*a*, 1120*b*, on opposite sides of top member 5014 and adds stabilizing bar tracks 5002*a*, 5002*b* on opposite sides of top member 5014 formed by walls 5004 that are spaced from one another. As shown in FIG. 39, on opposite sides of stabilizing bar track 5002*a* are top side protrusions 5701*a*, 5701*b* and bottom side protrusions 5703*a*, 5703*b*. On opposite sides of stabilizing bar track 5002*b* are top side protrusions 5701*c*, 5701*d* and bottom side protrusions 5703*c*, 5703*d*. Top member 5014 further adds two pairs of adjacent top guide protrusions 5702*a* and 5702*b*, two pairs of adjacent bottom guide protrusions 5704*a* and 5704*b* (FIG. 39), rear top protrusions 5706*a* and 5706*b*, and tracks 5708*a* and 5708*b* formed by L-shaped walls. Top member 5014 also adds holes 5600 on a portion of top member 5014 opposite opening 1008.

Top member 5014 also omits depressions 1141, and, instead includes holes 5041*a*, 5041*b* through sides of top connection portion 1004. Top member 5014 also has depression 5020 that is a different shape than depression 1020 of post 1000 so that tab 5350 can fit in depression 5020, as shown in FIG. 39. Top member 5014 adds pass through holes 5602*a*, 5602*b* on opposite sides of top connection portion 1004. Each of pass through holes 5602*a*, 5602*b* is partially surrounded by a respective track 5604*a*, 5604*b* that also has a support member 5606.

Referring to FIG. 39, stabilizer bars 6000 include a first stabilizer bar 6000*a* and a second stabilizer bar 6000*b* that each have a respective bar body 6001*a*, 6001*b*. Although post 5000 is shown having one stabilizer bar 6000*a* on a first side of cover 5016 and one stabilizer bar 6000*b* on a second side of cover 5016 that is opposite the first side, post 5000 can have two or more of stabilizer bars 6000*a*, 6000*b* on either the first side and/or the second side of cover 5016 to ensure allowable movement. First stabilizer bar 6000*a* has a hole 6002*a* at a first end of bar body 6001*a* with U-shape members 6004*a*, 6004*b* on opposite sides of hole 6002*a*. First stabilizer bar 6000*a* has an elongated opening 6006*a* through bar body 6001*a* that extends to the second end of bar body 6001*a* that is opposite the first end. Second stabilizer bar 6000*b* has a hole 6002*b* at a first end of bar body 6001*b* with U-shape members 6004*c*, 6004*d* on opposite sides of hole 6002*b*. Second stabilizer bar 6000*b* has an elongated opening 6006*b* through bar body 6001*b* that extends to the second end of bar body 6001*b* that is opposite the first end. Each of stabilizer bars 6000 has a bump 6007 (FIG. 40) extending into their respective elongated openings 6006*a*, 6006*b*.

Figure 40:
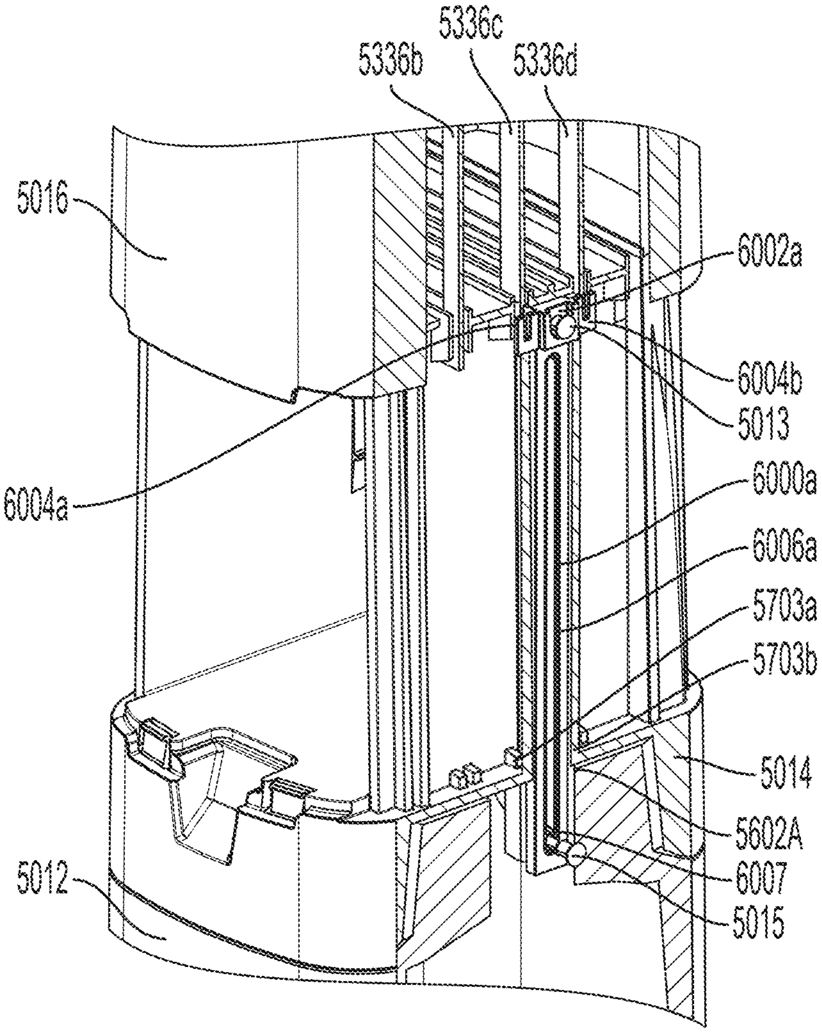
FIG. 40 is a partial, perspective view of the post of FIG. 33*a* in the open position with a portion of the cover, top member and base that are cut away.

Referring to FIGS. 39 and 40, when assembled, first stabilizer bar 6000*a* is connected to the first side of cover 5016 and second of stabilizer bar 6000*b* is connected to the second side of cover 5016 that is opposite the first side. First stabilizer bar 6000*a* has one of U-shape members 6004*a* that fits in groove 5340 formed by ridge 5336*c* and another of U-shape members 6004*b* that fits in groove 5340 formed by ridge 5336*d* and hole 6002*a* at the first end of bar body 6001*a* aligns with one of holes 5333*a* on the first side of cover 5016. First fastener 5013, for example, an overmolded set pin, passes through hole 6002*a* and the one of holes 5333*a* through cover 5016 to connect first stabilizer bar 6000*a* to the first side of cover 5016. Accordingly, first stabilizer bar 6000*a* interlocks with cover 5016 in addition to being held in place with first fastener 5013. A portion of first stabilizer bar 6000*a* passes through pass through hole 5602*a* in top member 5014 so that elongated opening 6006*a* through bar body 6001*a* aligns with one of openings 5045*a* on a first side of base 5012 and one of holes 5041*a* through a first side of top member 5014. A second fastener 5015, for example, an overmolded set pin, passes through the one of holes 5041*a* through the first side of top member 5014, the one of openings 5045*a* in the first side of base 5012 and elongated opening 6006*a* through bar body 6001*a* of first stabilizer bar 6000*a* connecting first stabilizer bar 6000*a* to top member 5014 and base 5012. Second fastener 5015 locates and secures cover 5016 to base 5012 and first stabilizer bar 6000*a* to cover 5016.

When assembled, second stabilizer bar 6000*b* has one of U-shape members 6004*c* that fits in groove 5340 formed by ridge 5336*g* and another of U-shape members 6004*d* that fits in groove 5340 formed by ridge 5336*h* and hole 6002*b* at the first end of bar body 6001*b* aligns with one of holes 5333*b* on the second side of cover 5016. A third fastener 5023, for example, an overmolded set pin, passes through hole 6002*b* and the one of holes 5333*b* through cover 5016 to connect second stabilizer bar 6000*b* to the second side of cover 5016. Accordingly, second stabilizer bar 6000*b* interlocks with cover 5016 in addition to being held in place with second fastener 5023. A portion of second stabilizer bar 6000*b* passes through pass through hole 5602*b* in top member 5014 so that elongated opening 6006*b* through bar body 6001*b* aligns with one of openings 5045*e* on a second side of base 5012 and one of holes 5041*b* through a second side of top member 5014. A fourth fastener 5025, for example, an overmolded set pin, passes through the one of holes 5041*b* through the first side of top member 5014, the one of openings 5045*e* in the second side of base 5012 and elongated opening 6006*b* through bar body 6001*b* of second stabilizer bar 6000*b* connecting second stabilizer bar 6000*b* to top member 5014 and base 5012. Fourth fastener 5025 locates and secures cover 5016 to base 5012 and second stabilizer bar 6000*b* to cover 5016. A fifth fastener 5035 passes through one of holes 5041*c* on a side of top member 5014 opposite opening 1008 and one of openings 5045*c* in base 5012 in which the one of holes 5041*c* on the side of top member 5014 opposite opening 1008 is aligned to connect top member 5014 to base 5012. A sixth fastener 5043 passes through one of holes 5041*d* on a side of top member 5014 with opening 1008 and one of openings 5045*f* in base 5012 in which the one of holes 5041*d* on the side of top member 5014 with opening 1008 is aligned to connect top member 5014 to base 5012.

Figure 41:
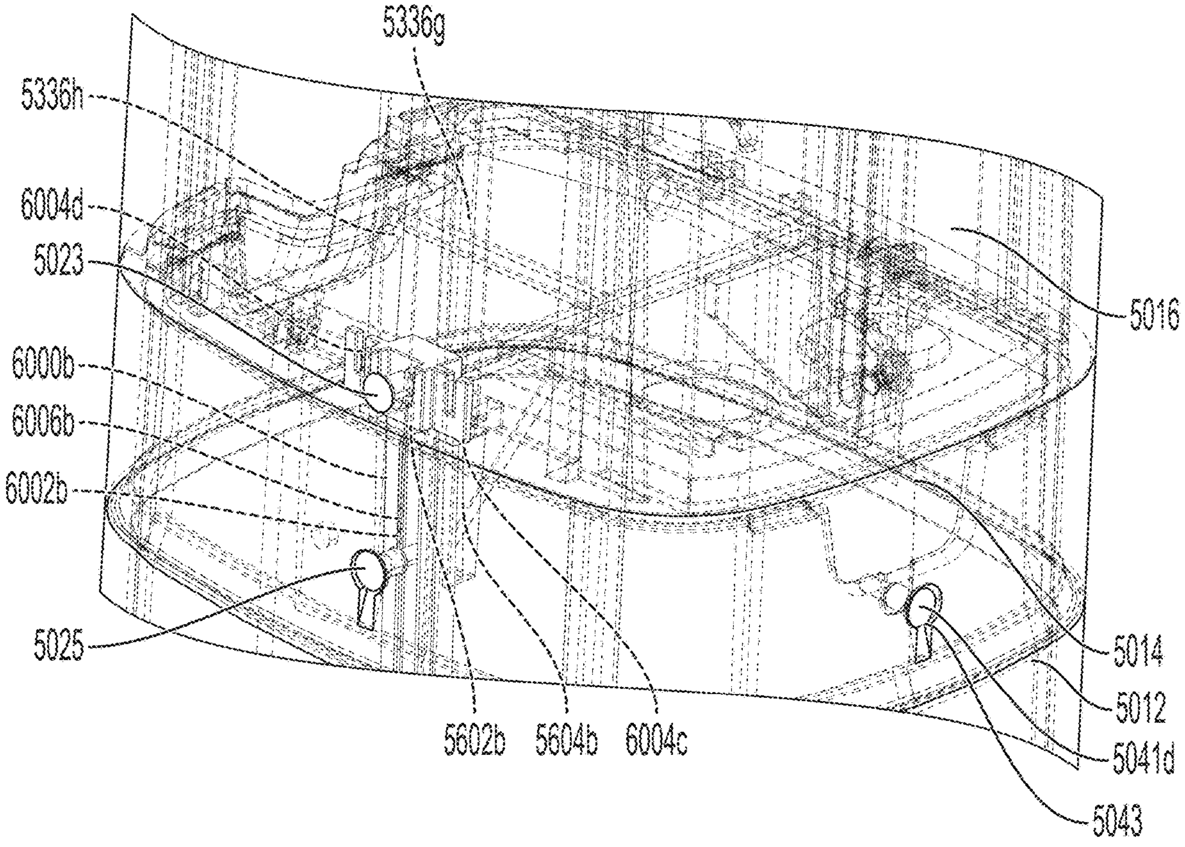
FIG. 41 is a partial, perspective view of the post of FIG. 33*a* in the closed position with the cover, top member and base that are transparent.

In use, cover 5016 can move between the closed position, as shown in FIG. 41, and the open position, as shown in FIG. 40. Post 1000 is modified to add stabilizer bars 6000 to either side of post 5000 for the purpose of limiting free motion when cover 5016 is in the open position to less than 3 degrees rotation in the x or z axis as shown in FIG. 39. When moving from the open position, as shown in FIG. 40, to the closed position, as shown in FIG. 41, first stabilizer bar 6000*a* remains fixed relative to cover 5016 and a portion of first stabilizer bar 6000*a* moves through the hole 5602*a* in the first side of top member 5014 so that elongated opening 6006*a* moves along second fastener 5015 and second stabilizer bar 6000*b* also remains fixed relative to cover 5016 and a portion of second stabilizer bar 6000*b* moves through hole 5602*b* in the second side of top member 5014 so that elongated opening 6006*b* moves along fourth fastener 5025 until cover 5016 reaches the closed position.

When moving from the closed position, as shown in FIG. 41, to the open position, as shown in FIG. 40, first stabilizer bar 6000*a* remains fixed relative to cover 5016 and the portion of first stabilizer bar 6000*a* moves through the hole 5602*a* in the first side of top member 5014 so that elongated opening 6006*a* moves along second fastener 5015 and second stabilizer bar 6000*b* also remains fixed relative to cover 5016 and the portion of second stabilizer bar 6000*b* moves through hole 5602*b* in the second side of top member 5014 so that elongated opening 6006*b* moves along fourth fastener 5025 until cover 5016 reaches the open position where elongated opening 6006*a* at the second end of bar body 6001*a* abuts second fastener 5015 and elongated opening 6006*b* at the second end of bar body 6001*b* abuts fourth fastener 5025 preventing further movement of cover 5016 so cover 5016 cannot be pulled off of top member 5014 and base 5012. Second fastener 5015 can pass over bump 6007 in elongated opening 6006*a* in first stabilizing bar 6000*a* when moving from the closed position to the open position and fourth fastener 5025 can pass over bump 6007 in elongated opening 6006*b* in second stabilizing bar 6000*b* when moving from the closed position to the open position to maintain cover 5016 in the opened position until a force is applied that is strong enough to move second fastener 5015 over bump 6007 in elongated opening 6006*a* in first stabilizing bar 6000*a* and to move fourth fastener 5025 over bump 6007 in elongated opening 6006*b* in second stabilizing bar 6000*b* to move cover 5016 toward the closed position. Alternatively, stabilizing bars 6000 can omit bumps 6007 and cover 5016 can move from the open position to the closed position by a weight of cover 5016.

When moving between the open position and the closed position, ridge 5336*a* also slides in track 1120*a*. Ridge 5336*b* slides between adjacent top guide protrusions 5702*a* and between adjacent bottom guide protrusions 5704*a* when in the closed position of cover 5016. Ridge 5336*c* slides between stabilizing bar track 5002*a* and top side protrusion 5701*a* and bottom side protrusion 5703*a* (FIG. 40) and stabilizing bar track 5002*a* when in the closed position of cover 5016. Ridge 5336*d* slides between stabilizing bar track 5002*a* and top side protrusion 5701*b* and bottom side protrusion 5703*b* (FIG. 40) and stabilizing bar track 5002*a* when in the closed position of cover 5016. Rail member 5342*a* slides in track 5708*a*. Ridge 5336*e* further slides in track 1120*b*. Ridge 5336*f* slides between adjacent top guide protrusions 5702*b* and between adjacent bottom guide protrusions 5704*b* when in the closed position of cover 5016. Ridge 5336*g* slides between stabilizing bar track 5002*b* and top side protrusion 5701*c* and bottom side protrusion 5703*c* and stabilizing bar track 5002*b* when in the closed position of cover 5016. Ridge 5336*h* slides between stabilizing bar track 5002*b* and top side protrusion 5701*d* and bottom side protrusion 5703*d* and stabilizing bar track 5002*b* when in the closed position of cover 5016. Rail member 5342*b* slides in track 5708*b*.

Accordingly, stabilizer bars 6000 are secured with, for example, set pins during installation and provides a controlled tracking motion in the entire path of upward and downward movement of cover 5016. Further there are pass through holes 5602*a*, 5602*b* in top member 5014 that allow stabilizer bars 6000 the space for movement. In addition, post 5000 avoids issues with water by having pass through holes 5602*a*, 5602*b* on opposite sides of top connection portion 1004 so that the walls of cover portion 1006 block water from entering into interior 1018 of cover portion 1006. Further, first fastener 5013, second fastener 5015, third fastener 5023, fourth fastener 5025, fifth fastener 5035 and sixth fastener 5043 are removable to allow for cover 5016, top member 5014 and base 5012 to be selectively assembled and disassembled. First fastener 5013, second fastener 5015, third fastener 5023, fourth fastener 5025, fifth fastener 5035 and sixth fastener 5043 that are set pins will also provide stability and give a smooth surface for stabilizer bars 6000 to track against.

Figure 42:
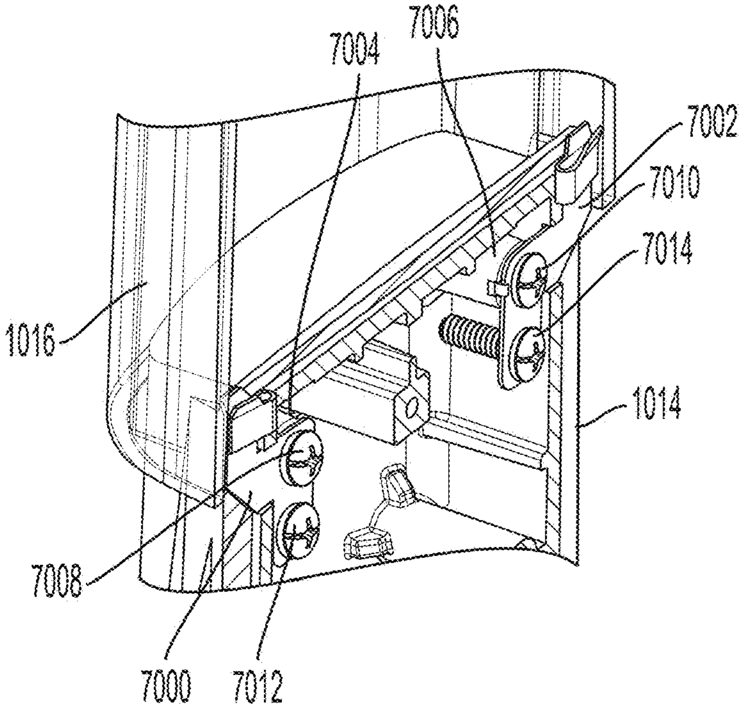
FIG. 42 is a perspective view of the post of FIG. 33*a* that is modified to add electrical contacts with the cover in the open position.
Figure 43:
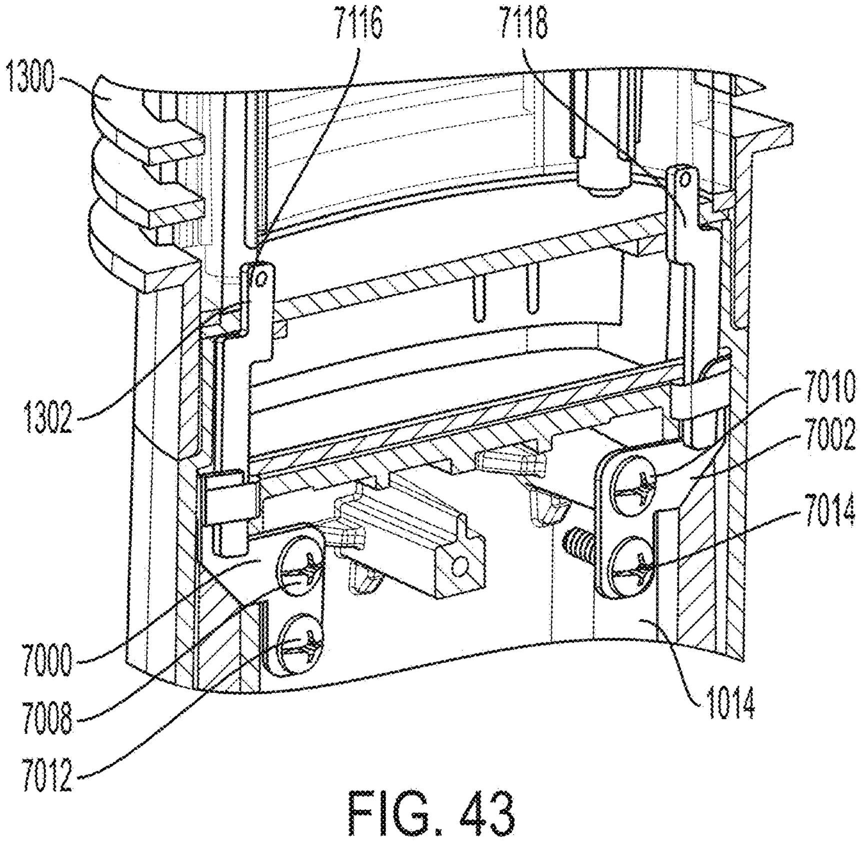
FIG. 43 is a perspective view of the post of FIG. 33*a* that is modified to add electrical contacts and having a cover and pagoda light assembly in a closed position that is interchangeable with the cover of FIG. 42.

Referring to FIGS. 42-43, post 1000 of FIGS. 1-15 or post 5000 of FIGS. 33*a*-41 can include modifications as shown in FIGS. 42-43 to add electrical contacts 7000, 7002 to top member 1014, 5014 that can be connected to covers 1100, 1200, 1300, 1400 so that electricity can be provided while in the closed position to Bollard style LED light 1202, Pagoda Style Path light 1302, area path light 1402 or other accessories provided by covers that can be interchanged with cover 1016, 5016, but remove power, namely, electricity, in the open position. Top member 1014, 5014 is modified to add bosses 7004, 7006 that each receive one of screws 7008, 7010 so that screw 7008 connects electrical contact 7000 to boss 7004 and screw 7010 connects electrical contact 7002 to boss 7006. Electrical contacts 7000, 7002 can be springs as shown or any other type of electrical contact. Power is connected or pigtailed to electrical contacts 7000, 7002 via second screws 7112, 7114, respectively. As shown in FIG. 43, cover contacts 7116, 7118 are incorporated into Pagoda Style Path light 1302 of cover 1300; however, contacts 7116, 7118 can alternatively be incorporated into Bollard style LED light 1202, Pagoda Style Path light 1302, area path light 1402 or other accessories provided by covers that can be interchanged with cover 1016, 5016, so that each of cover contacts 7116, 7118 will engage with one of electrical contacts 7000, 7002 when in the closed position. When cover 1300 is moved to the open position, cover contact 7116 does not contact electrical contact 7000 and cover contact 7118 does not contact electrical contact 7002 so that electricity is not conducted from electrical contact 7000 to cover contact 7116 and electricity is not conducted from electrical contact 7002 to cover contact 7118. When cover is moved to the closed position as shown in FIG. 43, cover contact 7116 contacts electrical contact 7000 and cover contact 7118 contacts electrical contact 7002 so that electricity is conducted from electrical contact 7000 to cover contact 7116 and electricity is conducted from electrical contact 7002 to cover contact 7118. Alternatively, when cover 1016, 5016 is in the closed position, one or more wires can conduct electricity to cover 1016, 5016 from a power source.

Figure 44:
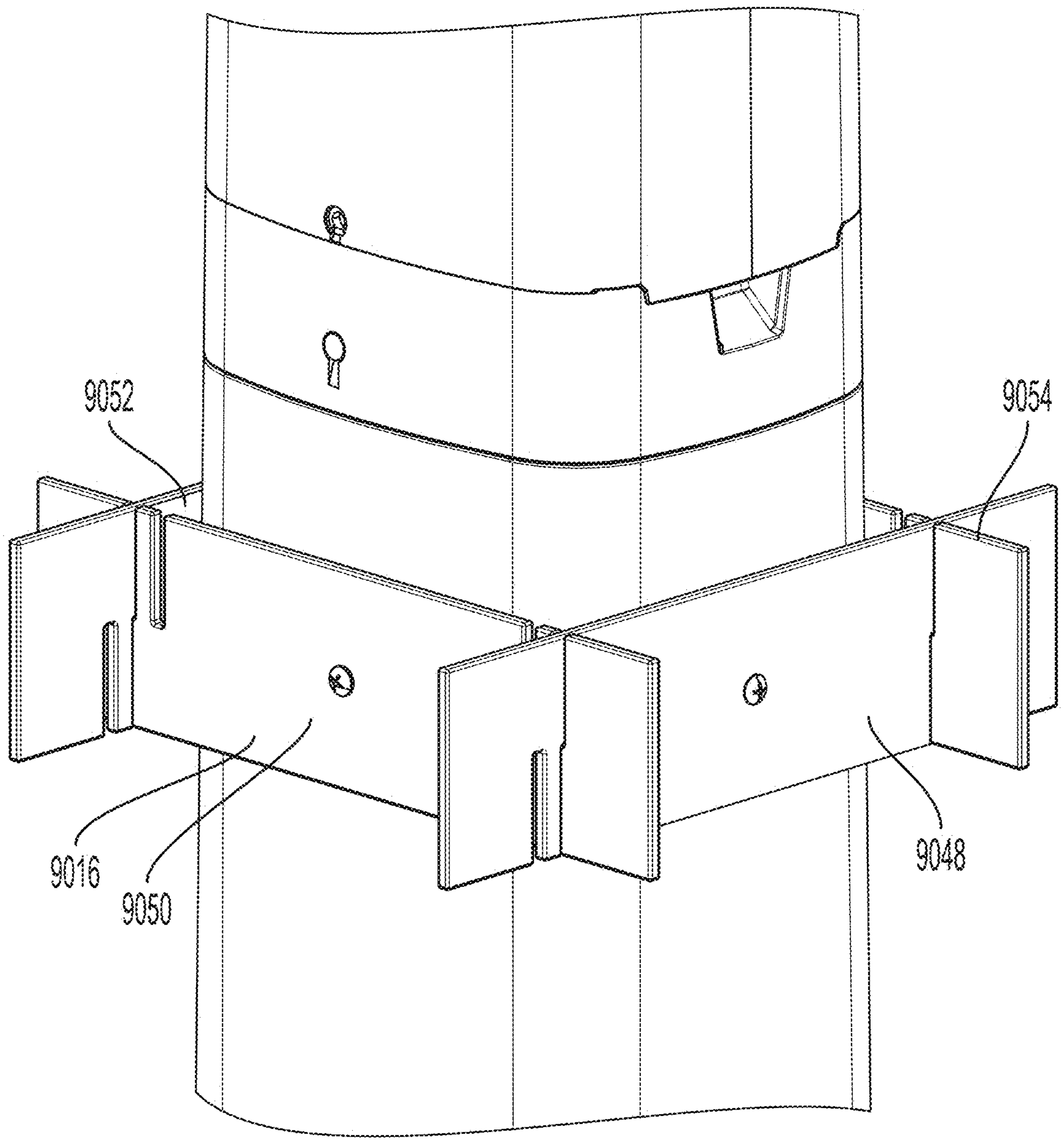
FIG. 44 is a perspective view of the post of FIG. 33*a* connected to a stabilizer that has a portion cut away.
Figure 45:
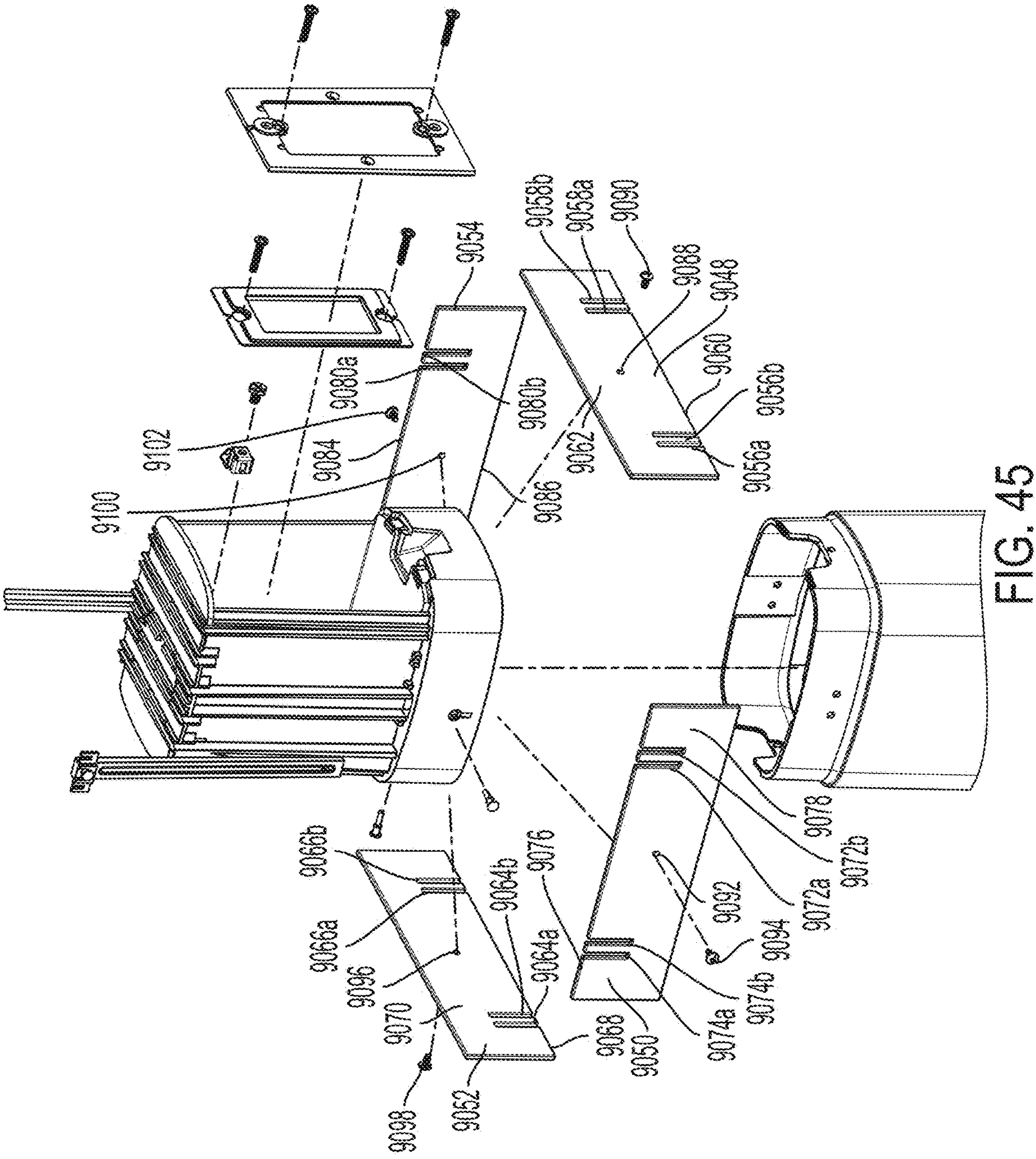
FIG. 45 is a partial exploded view of FIG. 44.
Figure 46:
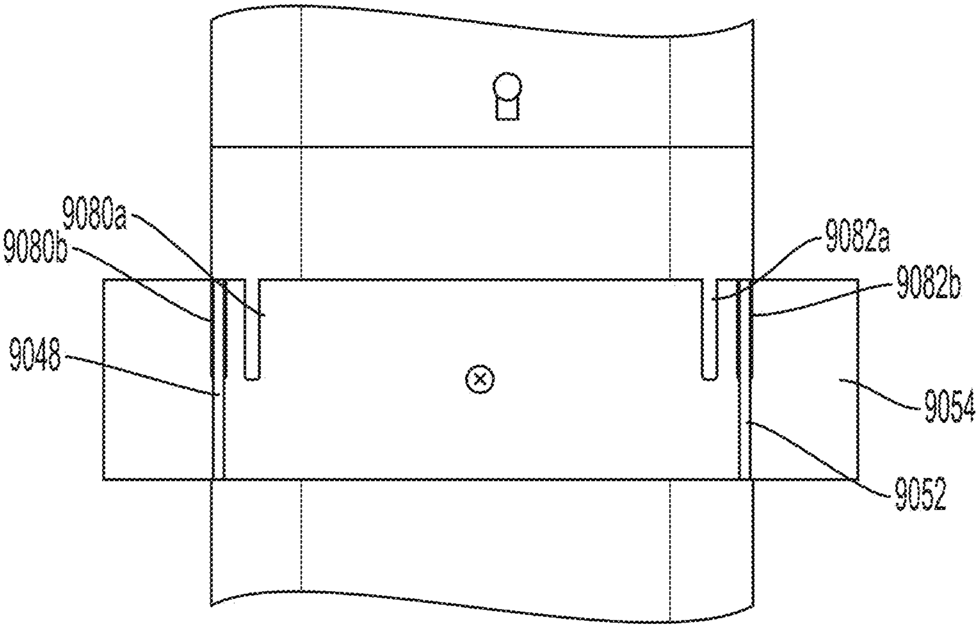
FIG. 46 is a partial side view of FIG. 44.

Referring to FIGS. 44-45, post 1000 of FIGS. 1-15 or post 5000 of FIGS. 34-41 can include stabilizer 9016 that has a first member 9048, a second member 9050, a third member 9052, and a fourth member 9054 that are the same shape. First member 9048 is positioned to have four slits 9056*a*, 9056*b*, 9058*a*, 9058*b* that extend from a lower edge 9060 into a body 9062 of first member 9048. Third member 9052 is positioned to have four slits 9064*a*, 9064*b*, 9066*a*, 9066*b* that extend from a lower edge 9068 into a body 9070 of third member 9052. Second member 9050 is positioned to have four slits 9072*a*, 9072*b*, 9074*a*, 9074*b* that extend from an upper edge 9076 into a body 9078 of second member 9050. Fourth member 9054 is positioned to have four slits 9080*a*, 9080*b*, 9082*a*, 9082*b* that extend from an upper edge 9084 into a body 9086 of second member 9054.

Slit 9056*b* of first member 9048 receives second member 9050 at slit 9072*b*. Slit 9058*a* of first member 9048 receives fourth member 9054 at slit 9080*b*. Slit 9074*a* of second member 9050 receives third member 9052 at slit 9064*b*. Slit 9066*a* of third member 9052 receives fourth member 9054 at slit 9082*b*. First member 9048 has an aperture 9088 and a screw 9090 that passes through aperture 9088 and a hole in base 1012, 5012 that aligns with aperture 9088. Second member 9050 has an aperture 9092 and a screw 9094 that passes through aperture 9092 and a hole in base 1012, 5012 that aligns with aperture 9092. Third member 9052 has an aperture 9096 and a screw 9098 that passes through aperture 9096 and a hole in base 1012, 5012 that aligns with aperture 9096. Fourth member 9054 has an aperture 9100 and a screw 9102 that passes through aperture 9100 and a hole in base 1012, 5012 that aligns with aperture 9100. Holes in base 1012, 5012 are each shown as single apertures; however, alternatively, holes in base 1012, 5012 can be multiple apertures at different heights so that a user can connect stabilizer 9016 at a desired height on base 1012, 5012. Stabilizer 9016 when assembled is smaller in one direction than a footprint of base 1012, 5012 creating a tension fit to help in installation, and, this interference, which spring loads the fin plastic of stabilizer 9016 helps keep stabilizer 9016 in place while setting screws 9090, 9094, 9098, 9102. Accordingly, stabilizer 9016 is a single part put together of a set of four members, namely, first member 9048, second member 9050, third member 9052 and fourth member 9054, and creates a stabilizing structure that is located to the customers needs and secured with self-tapping screws.

Figure 47A:
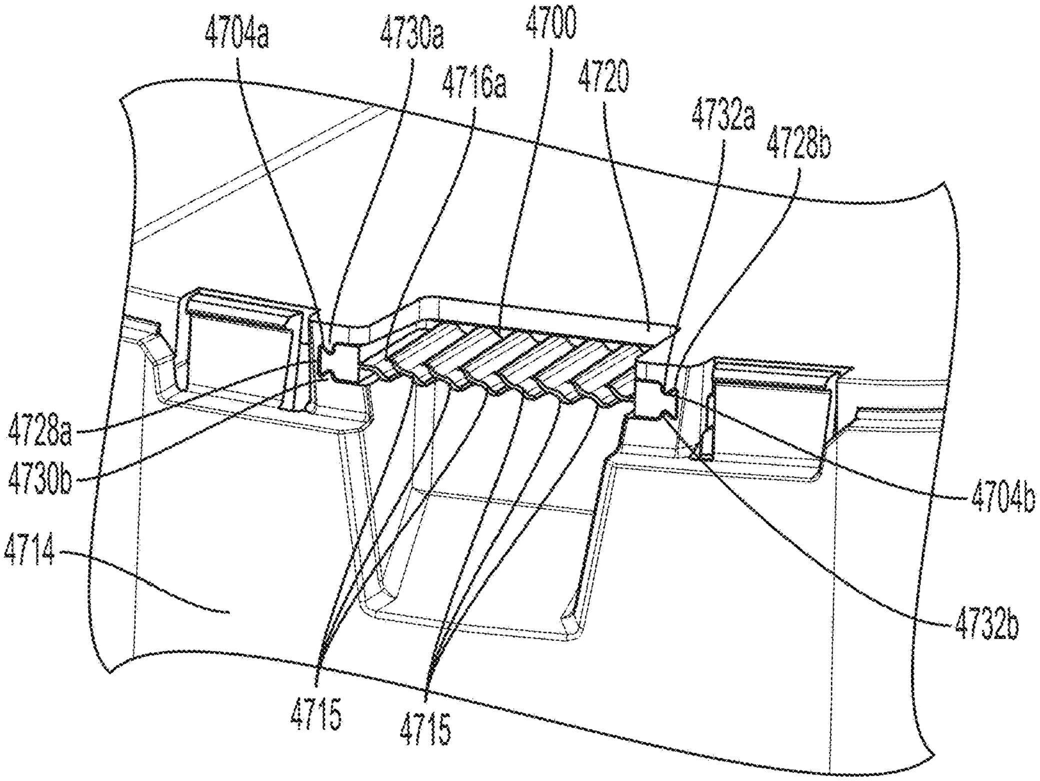
FIG. 47*a* is a partial, top perspective view of a splash guard/insect guard connected to the top member of FIG. 37 that is modified to connect to the splash guard/insect guard.
Figure 47B:
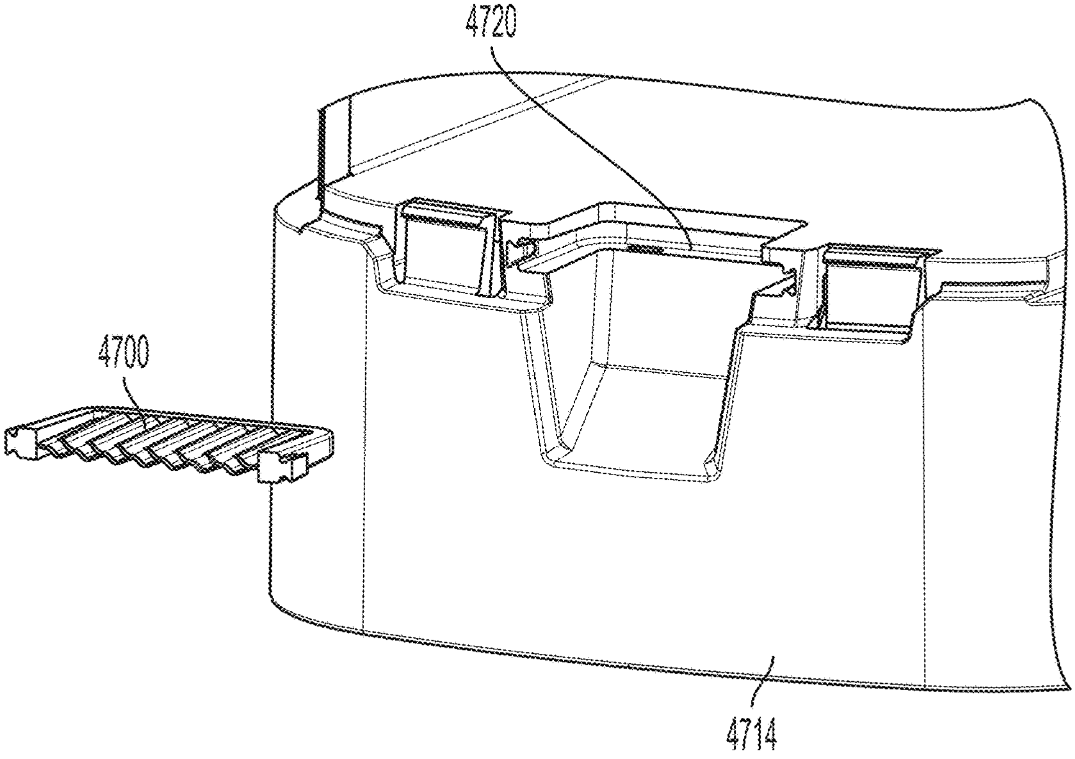
FIG. 47*b* is a partial, top perspective view of the splash guard/insect guard disconnected from the top member of FIG. 37 that is modified to connect to the splash guard/insect guard.
Figure 48:
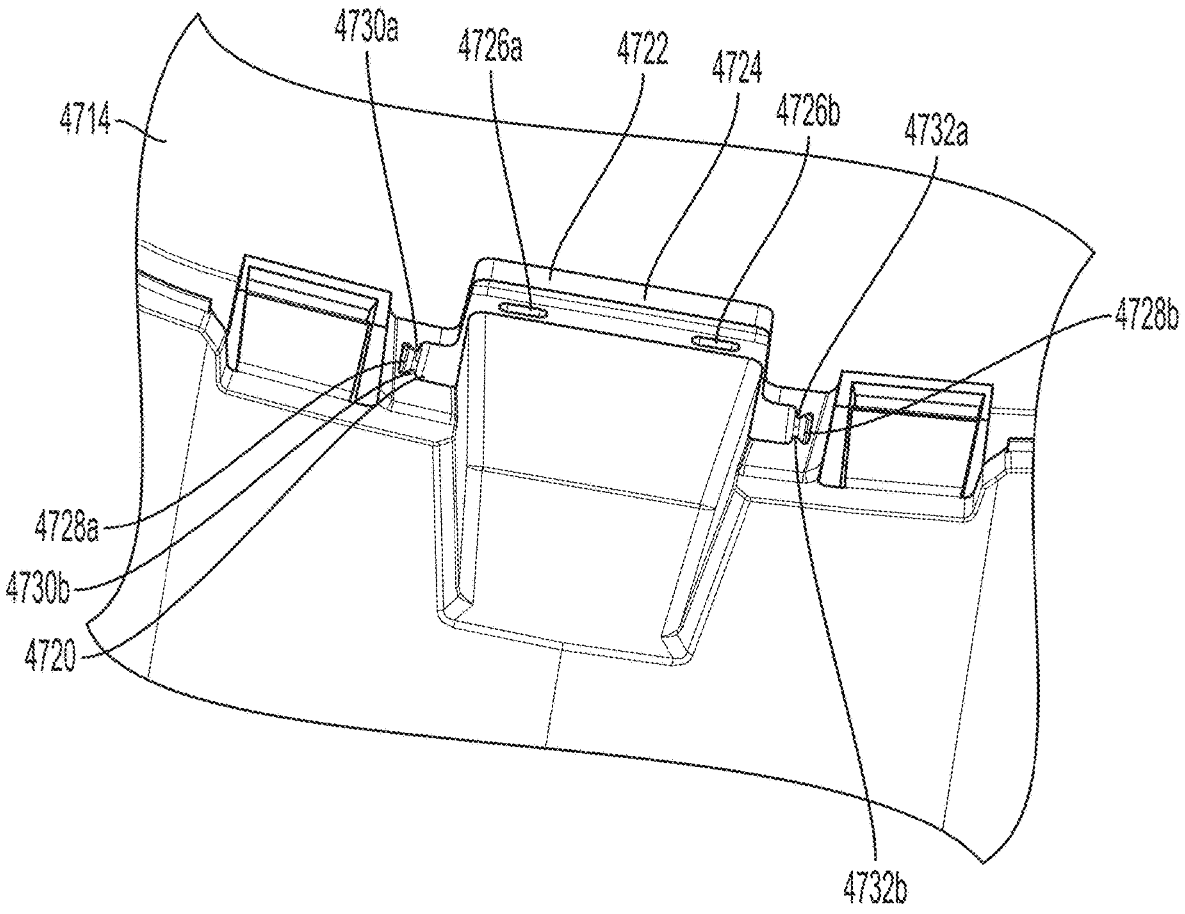
FIG. 48 is a partial, top perspective view of the top member of FIG. 37 that is modified to connect to the splash guard/insect guard.
Figure 49:
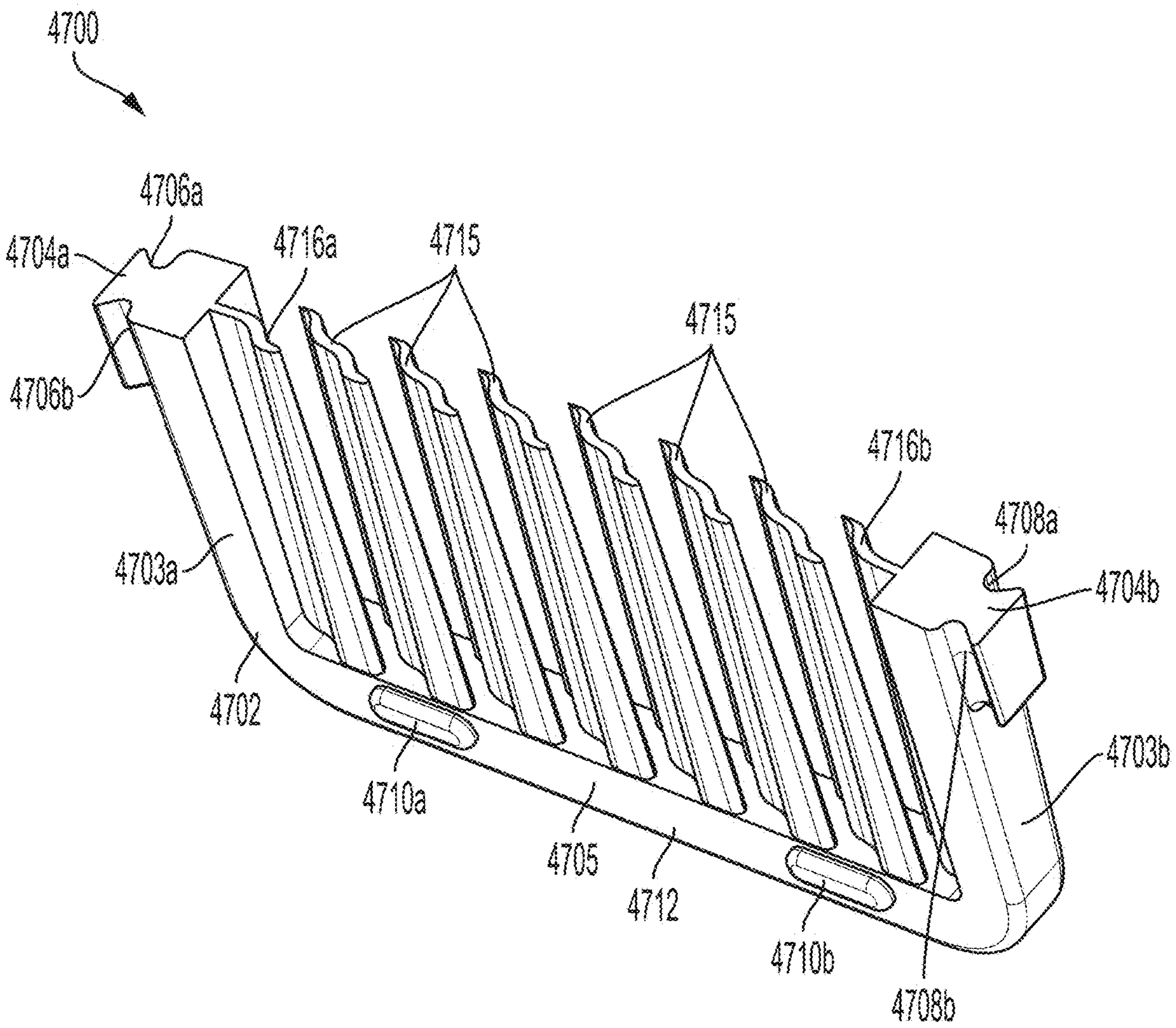
FIG. 49 is a bottom perspective view of the splash guard/insect guard of FIG. 47.

Referring to FIGS. 47*a*-49, post 1000 of FIGS. 1-15 or post 5000 of FIGS. 33*a*-41 can include modifications as shown in FIGS. 47-49 to add a splash guard/insect guard 4700. In particular, top member 1014, 5014 can be modified to connect to splash guard/insect guard 4700. FIGS. 47*a* and 47*b* show a top member 4714 that is the same as top member 5014 except top member 4714 has a depression 4720, as shown in FIG. 48, that is a different shape than depression 5020 of post 5000 so that splash guard/insect guard 4700 can fit in depression 5020. Referring to FIG. 49, splash guard/insect guard 4700 has a U-shape body 4702. U-shape body 4702 has a first side member 4703*a* and a second side member 4703*b* on opposite sides of a middle member 4705. First side member 4703*a* has a first protrusion 4704*a* on a first end of U-shape body 4702 and second side member 4703*b* has a second protrusion 4704*b* on a second end of U-shape body 4702. First protrusion 4704*a* has grooves 4706*a*, 4706*b* on opposite sides. Similarly, second protrusion 4704*b* has grooves 4708*a*, 4708*b* on opposite sides. Middle member 4705 has a first bump 4710*a* and a second bump 4710*b* extending from a bottom surface 4712. Splash guard/insect guard 4700 has slats 4715 that extend from middle member 4705 between first side member 4703*a* and second side member 4703*b*. A first side slat 4216*a* is connected to first side member 4703*a* and middle member 4705 and a second side slat 4216*b* is connected to second side member 4703*b* and middle member 4705. Referring to FIG. 48, depression 4720 has a receiving portion 4722 that is shaped complementary to splash guard/insect guard 4700. Receiving portion 4722 has a U-shape portion 4724 shaped to receive U-shape body 4702. U-shape portion 4724 has a first indentation 4726*a* to receive first bump 4710*a* of middle member 4705 and a second indentation 4726*b* to receive second bump 4710*b* of middle member 4705. Receiving portion 4722 has a first protruded portion 4728*a* extending from U-shape portion 4724 and a second protruded portion 4728*b* extending from U-shape portion 4724 on an opposite side of receiving portion 4722. First protruded portion 4728*a* forms first ridges 4730*a*, 4730*b* and is sized to receive first protrusion 4704*a*. Second protruded portion 4728*b* forms second ridges 4732*a*, 4732*b* and is sized to receive second protrusion 4704*b*. To insert splash guard/insect guard

4700, middle member 2705 is inserted into receiving portion 4722 until first bump 4710*a* is in first indentation 4726*a* and second bump 4710*b* is in second indentation 4726*b*, first protrusion 4704*a* of first side member 4703*a* is positioned in first protruded portion 4728*a* so that first ridge 4730*a* is in groove 4706*a* and first ridge 4730*b* is in groove 4706*b*, and second protrusion 4704*b* of second side member 4703*b* is positioned in second protruded portion 4728*b* so that second ridge 4732*a* is in groove 4708*a* and second ridge 4732*b* is in groove 4708*b*.

Splash guard/insect guard 4700 is a piece of molded or formed rubber/silicone or like material that has protuberances on either side, namely, first protrusion 4704*a* and second protrusion 4704*b*, that mate with slots, namely, first protruded portion 4728*a* and second protruded portion 4728*b*, on top member 4714. Two additional protuberances, namely, first bump 4710*a* and second bump 4710*b*, are found on the bottom of splash guard/insect guard 4700 providing some feedback when seated properly. Splash guard/insect guard 4700 will prevent water from splashing up onto a device in addition to keeping out insects especially when cover 1016, 5016 is in the closed position. The “finger” design, namely, slats 4715, of splash guard/insect guard 4700 is to allow plug wire 500 to pass through splash guard/insect guard 4700 when needed without making a large gaping hole around plug wire 500, slats 4715 themselves are designed in such a way as to rest on one another if needed to prevent splash guard/insect guard 4700 form drooping too low.

Figure 51:
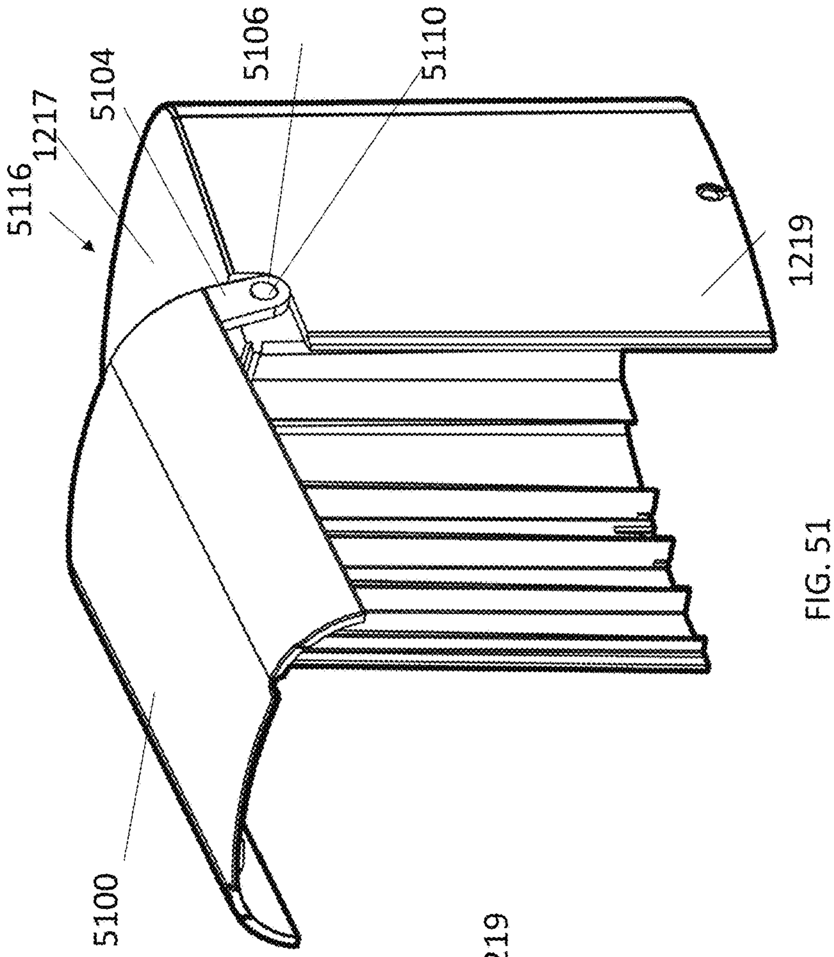
FIG. 51 perspective view of the cover of FIG. 50 in an up position.
Figure 50:
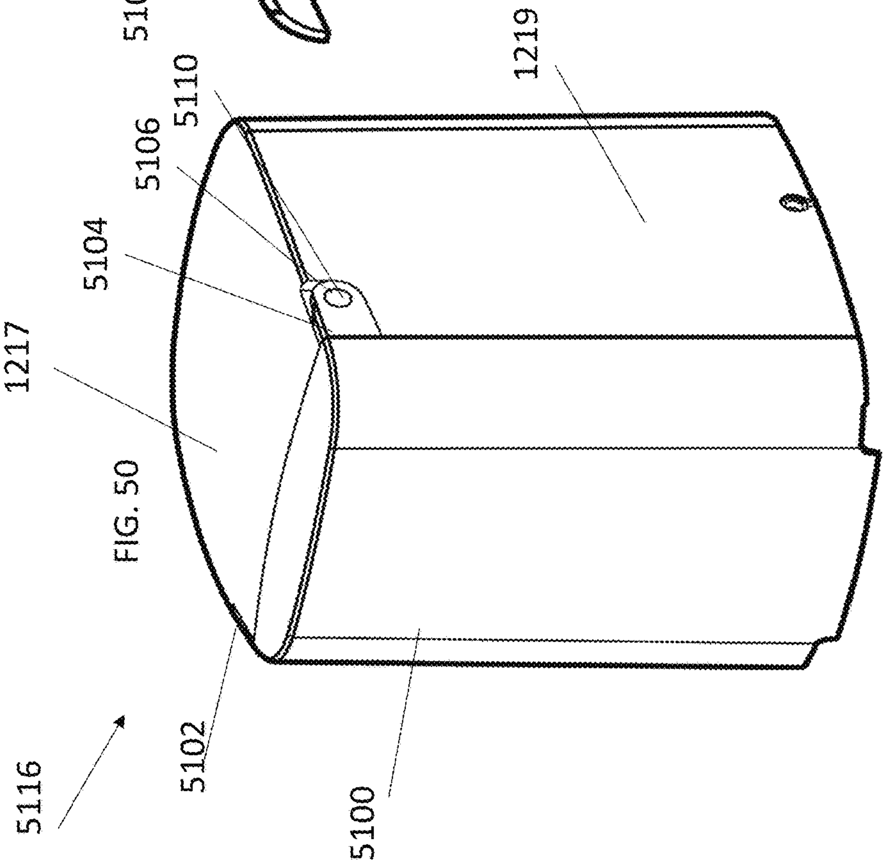
FIG. 50 is a perspective view of the cover of the post of FIG. 33*a* that is modified to have a flip up face cover that is in a down position.

Referring to FIGS. 50-51, post 1000 of FIGS. 1-15 or post 5000 of FIGS. 33*a*-41 can include modifications as shown in FIGS. 50-51 to add a flip up face cover 5100. Cover 5116 is the same as covers 1016, 5016 except cover 5116 is modified to incorporate flip up face cover 5100. Flip up face cover 5100 has two hinge arms 5102, 5104. Hinge arms 5102, 5104 each include one of pass through holes 5106. Cover 5116 has hinge protuberances 5110 extending from opposite sides of side wall 1219 adjacent top wall 1217. Pass through holes 5106 of hinge arms 5102, 5104 each receives one of hinge protuberances 5110 to attach flip up face cover 5100 to side wall 1219 allowing rotation of flip up face cover 5100 between a down position as shown in FIG. 50 and an up position as shown in FIG. 51. A snap feature can secure flip up face 5100 to side wall 1219 of cover 5116 in the down position and prevent water ingress. A force is applied by the snap feature to maintain flip up face cover 5100 in the down position. When a sufficient force is applied to flip up face cover 5100 when flip up face cover 5100 is in the down position, then the force applied by the snap feature is overcome to move flip up face cover 5100 to the up position as shown in FIG. 51 to reveal the electrical device enclosed. Flip up face cover 5100 can be moved from the up position as shown in FIG. 51 to the down position as shown in FIG. 50 by applying a sufficient force to move flip up face cover 5100 to the down position so that the snap feature engages flip up face cover 5100 to maintain flip up face cover 5100 in the down position. Cover 5116 is able to slide between the open position and the closed position that is the same as cover 1016 FIGS. 1 and 2 and cover 5016 as shown in FIGS. 33*a*, 34.

Figure 53:
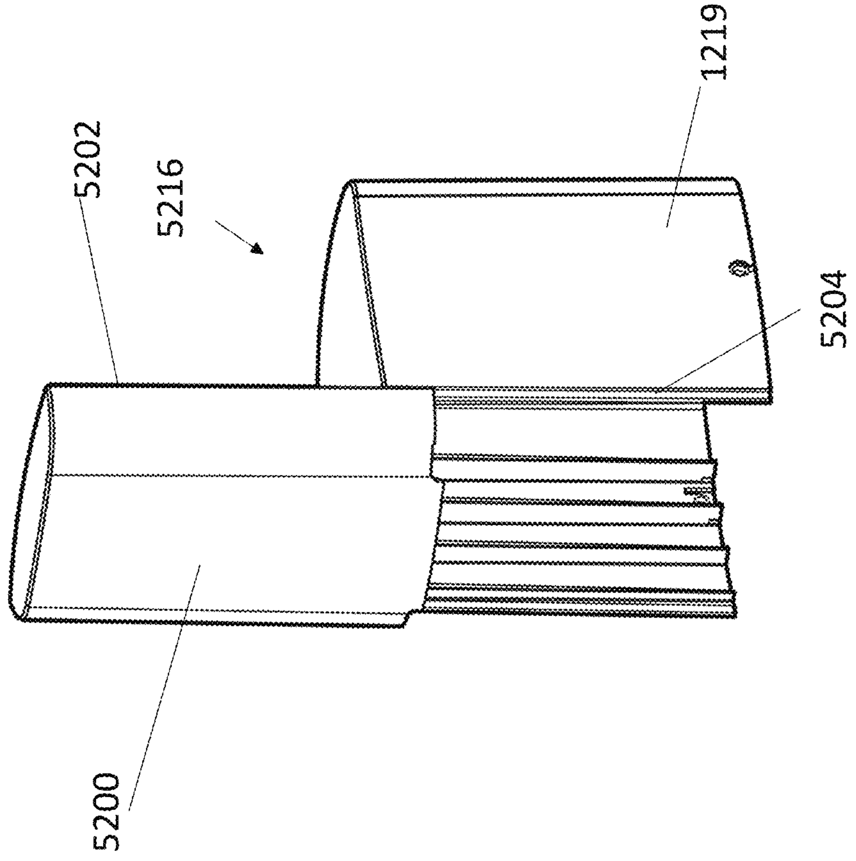
FIG. 53 perspective view of the cover of FIG. 52 in an up position.
Figure 52:
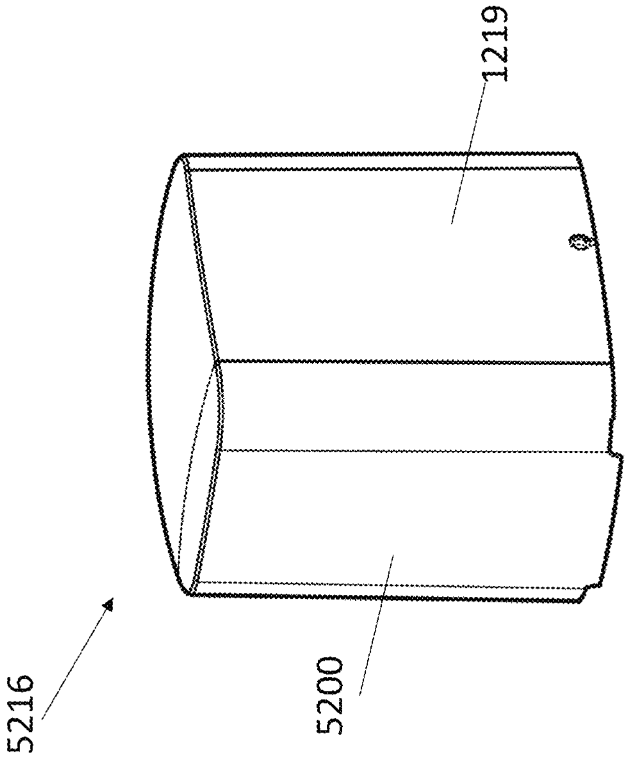
FIG. 52 is a perspective view of the cover of the post of FIG. 33*a* that is modified to have a sliding face cover that is in a down position.

Referring to FIGS. 50-51, post 1000 of FIGS. 1-15 or post 5000 of FIGS. 33*a*-41 can include modifications as shown in FIGS. 52-53 to add a sliding face cover 5200. Cover 5216 is the same as covers 1016, 5016 except cover 5116 is modified to incorporate sliding face cover 5200. Sliding face cover 5200 has rails 5202. Side wall 1219 of cover 5216 has grooves 5204 that are sized to mate with rails 5202 on opposite sides of side wall 1219. Alternatively, side wall 1219 can have rails and sliding face cover 5200 has grooves that are sized to mate with the rails of side wall 1219. Sliding face cover 5200 is secured to side wall 1219 of cover 5216 by rails 5202 mating with grooves 5204. Rails 5202 of sliding face cover 5200 and grooves 5204 of side wall 1216 allow sliding face cover 5200 to track in the vertical direction. Sliding face cover 5200 travels up and down on side wall 1219 to reveal the electrical device enclosed. A snap feature will ensure cover 5216 can be secured in a down position that is a seated/closed location as shown in FIG. 52 and prevent water ingress. A force is applied by the snap feature to maintain sliding face cover 5200 in a down position as shown in FIG. 52. When a sufficient force is applied to sliding face cover 5200 when sliding face cover 5200 is in the down position, then the force applied by the snap feature is overcome to move sliding face cover 5200 to the up position as shown in FIG. 53 to reveal the electrical device enclosed. Sliding face cover 5200 can be moved from the up position as shown in FIG. 53 to the down position as shown in FIG. 52 by applying a sufficient force to move sliding face cover 5200 to the down position so that the snap feature engages sliding face cover 5200 to maintain sliding face cover 5200 in the down position. Side wall 1219 and sliding face cover 5200 form a stop, for example, a structure is in each of grooves 5204 that interferes with each of rails 5202, to maintain sliding face cover 5200 connected to side wall 1219 when sliding face cover 5200 is in the up position. Cover 5216 is able to slide between the open position and the closed position that is the same as cover 1016 FIGS. 1 and 2 and cover 5016 as shown in FIGS. 33*a*, 34.

Post 1000 of FIGS. 1-15 or post 5000 of FIGS. 33*a*-41 can include modifications to include a multi-hinged cover. Multi-hinged cover is the same as covers 1016, 5016 except cover 5116 is modified to incorporate a face of the multi-hinged cover that is made up of several living hinges, creating a corrugation effect and an ability to bend. The corrugated portion will be placed into tracks inside side wall 1219 of the multi-hinged cover restricting the bending to the desired shape. When opened the multi-hinged cover will bend and track into side wall 1219 of the multi-hinged cover above the device enclosure housing the electrical device, namely, top member 1014 and top member 5014. Operation of the multi-hinged cover would be like a garage door in terms of function. The multi-hinged cover is able to slide between the open position and the closed position that is the same as cover 1016 FIGS. 1 and 2 and cover 5016 as shown in FIGS. 33*a*, 34.

It should also be noted that the terms “first”, “second”, “third”, “upper”, “lower”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

| PARTS LIST |
|---|
| Post 10 |
| Base 12 |
| Inner slide 14, |
| Cover 16 |
| Top wall 17 |
| Stabilizing fin 18 |
| Depression 20 |
| Electrical outlet 22 |
| Screw 23 |
| Inner top clip 24 |
| Screw 25 |
| Plate 26 |
| Bottom flange 27 |
| Top flange 29 |
| Upper screw 30 |
| Top portion 31 |
| Top aperture 32 |
| Upper opening 34 |
| Lower screw 36 |
| Bottom aperture 38 |
| Lower opening 40 |
| Screw 42 |
| Hole 44 |
| Hole 46 |
| First member 48 |
| Second member 50 |
| Third member 52 |
| Fourth member 54 |
| Slit 56 |
| Slit 58 |
| Lower edge 60 |
| Body 62 |
| Slits 64, 66 |
| Lower edge 68 |
| Body 70 |
| Slits 72, 74 |
| Upper edge 76 |
| Body 78 |
| Slits 80, 82 |
| Upper edge 84 |
| Body 86 |
| Aperture 88 |
| Screw 90 |
| Aperture 92 |
| Screw 94 |
| Aperture 96 |
| Screw 98 |
| Aperture 100 |
| Screw 102 |
| Inner slide connection portion 104 |
| Open end 105 |
| Sidewall 106 |
| Outlet portion 107 |
| Opening 108 |
| Cover portion 109 |
| Depressions 110, 112, 114 |
| Intermediate portions 111, 113 |
| Hooks 115 |
| Inner surface 117 |
| Interior 118 |
| Outer surface 119 |
| Tracks 120 |
| Inner wall 121 |
| Base connection portion 122 |
| First end 123 |
| Body portion 124 |
| Knockouts 125 |
| Second end 126 |
| Sidewall 128 |
| Cutouts 130 |
| Cover portion 131 |
| Interior surface 132 |
| Breakable strips 133 |
| Exterior surface 134 |
| Ridges 136 |
| First end ridge 137 |
| Second end ridge 139 |
| First groove 141 |

-continued

| PARTS LIST |
|---|
| Second groove 143 |
| Tongue 149 |
| Protrusion 151 |
| Ramp 153 |
| Flat portion 155 |
| Wall 157 |
| Receiving depression 159 |
| Projections 161 |
| Holes 162 |
| Plug wire 500 |
| Plug 502 |
| Prongs 504, 506, 508 |
| Post 1000 |
| Top connection portion 1004 |
| Cover portion 1006 |
| Opening 1008 |
| Base 1012 |
| Top member 1014 |
| Cover 1016 |
| Inner surface 1017 |
| Interior 1018 |
| Outer surface 1019 |
| Depression 1020 |
| Pair of outer ridges 1021 |
| First boss 1022 |
| Second boss 1024 |
| Plate assembly 1026 |
| Plates 1026a, 1026b, 1026c, 1026d, 1026e |
| Solid plate 1027 |
| Third boss 1028 |
| Plate assembly opening 1029 |
| Upper screw 1030 |
| Fourth boss 1032 |
| ground lug 1033 |
| Four gussets 1034 |
| Lower screw 1036 |
| First side screw 1037 |
| Ribs 1038 |
| Second side screw 1039 |
| Cover 1100 |
| Wireless speaker 1102 |
| Sidewall portion 1115 |
| Top wall portion 1117 |
| Inner surface 1118 |
| Tracks 1120, 1120a, 1120b |
| Inner wall 1121 |
| Base connection portion 1122 |
| First end 1123 |
| Body portion 1124 |
| Knockouts 1125 |
| Second end 1126 |
| Ramps 1127 |
| Sidewall 1128 |
| Openings 1129 |
| Cutouts 1130 |
| Cover portion 1131 |
| Breakable strips 1133 |
| Depressions 1141 |
| Interior surface 1143 |
| Exterior surface 1145 |
| Rim 1146 |
| Rim portion 1148 |
| Top walls 1160 |
| Cover 1200 |
| Bollard style LED light 1202 |
| Cover 1300 |
| Pagoda Style Path light 1302 |
| Cover 1400 |
| Area path light 1402 |
| Post 1500 |
| Body 1502 |
| Bottom portion 1503 |
| Fins 1504 |
| Fin body 1506 |
| Hole 1508 |
| Flange 1510 |

-continued

| PARTS LIST |
| --- |
| Cover 1516 |
| Slots 1520 |
| Single opening 1525 |
| Protrusion 1551 |
| First ramp 1551a |
| Second ramp 1551b |
| Apex 1551c |
| Post 1900 has a body 1902. |
| Body 1902 |
| Bottom portion 1903 |
| Fins 1904 |
| Fin body 1906 |
| Hole 1908 |
| Flange 1910 |
| Outer wall 1911 |
| Top portion 1912 |
| Inner volume 1913 |
| Opening 1914 |
| Interior volume 1915 |
| Cover 1916 |
| Open bottom 1917 |
| splash guard/insect guard 4700 |
| U-shape body 4702 |
| first side member 4703a |
| second side member 4703b |
| first protrusion 4704a |
| second protrusion 4704b |
| middle member 4705 |
| grooves 4706a, 4706b |
| grooves 4708a, 4708b |
| first bump 4710a |
| second bump 4710b |
| bottom surface 4712 |
| top member 4714 |
| slats 4715 |
| first side slat 4216a |
| second side slat 4216b |
| depression 4720 |
| receiving portion 4722 |
| U-shape portion 4724 |
| first indentation 4726a second indentation 4726b |
| first protruded portion 4728a |
| second protruded portion 4728b |
| first ridges 4730a, 4730b |
| second ridges 4732a, 4732b |
| post 5000 |
| stabilizing bar tracks 5002a, 5002b |
| base 5012 |
| first fastener 5013 |
| second fastener 5015 |
| cover 5016 |
| depression 5020 |
| third fastener 5023 |
| fourth fastener 5025 |
| fifth fastener 5035 |
| holes 5041a, 5041b |
| openings 5045a, 5045b, 5045c, 5045d, 5045e, 5045f |
| flip up face cover 5100 |
| hinge arms 5102, 5104 |
| pass through holes 5106 |
| hinge protuberances 5110 |
| cover 5116 |
| sliding face cover 5200 |
| rails 5202 |
| grooves 5204 |
| cover 5216 |
| holes 5333a, 5333b |
| U-shape depression 5335 |
| ridges 5336a, 5336b, 5336c, 5336d, 5336e, 5336f, 5336g, 5336h |
| cutout 5337a, 5337b, 5337c, |

-continued

| PARTS LIST |
| --- |
| 5337d |
| groove 5340 |
| depression 5344 |
| two protrusions 5317 |
| rail members 5342a, 5342b |
| tab 5350 |
| holes 5600 |
| pass through holes 5602a, 5602b |
| track 5604a, 5604b |
| support member 5606 |
| top side protrusions 5701a, 5701b, 5701c, 5701d |
| top guide protrusions 5702a and 5702b |
| bottom side protrusions 5703a, 5703b, 5703c, 5703d |
| bottom guide protrusions 5704a and 5704b |
| rear top protrusions 5706a and 5706b |
| tracks 5708a and 5708b |
| first stabilizer bar 6000a |
| second stabilizer bar 6000b |
| bar body 6001a, 6001b |
| hole 6002a |
| U-shape members 6004a, 6004b |
| elongated opening 6006a |
| hole 6002b |
| U-shape members 6004c, 6004d |
| elongated opening 6006b |
| bump 6007 |
| electrical contacts 7000, 7002 |
| bosses 7004, 7006 |
| screws 7008, 7010 |
| second screws 7112, 7114 |
| cover contacts 7116, 7118 |
| stabilizer 9016 |
| first member 9048 |
| second member 9050 |
| third member 9052 |
| fourth member 9054 |
| slits 9056a, 9056b, 9058a, 9058b |
| lower edge 9060 |
| body 9062 |
| slits 9064a, 9064b, 9066a, 9066b |
| lower edge 9068 |
| body 9070 |
| slits 9072a, 9072b, 9074a, 9074b |
| upper edge 9076 |
| body 9078 |
| slits 9080a, 9080b, 9082a, 9082b |
| upper edge 9084 |
| body 9086 |
| second member 9054 |
| aperture 9088 |
| screw 9090 |
| aperture 9092 |
| screw 9094 |
| aperture 9096 |
| screw 9098 |
| aperture 9100 |
| screw 9102 |

What is claimed is:

1. A post for holding an electrical device, comprising:

a body having an interior volume to hold the electrical device, the body having a base connected to a top member, the top member having a sidewall surrounding an interior that has an open front portion; and a cover that is slidable on the body between an open position to access the interior volume and a closed position covering the interior volume, the cover having a top wall and a side wall that extends from the top wall, the side wall of the cover surrounding a cover portion of the top member in the closed position, and the cover maintaining a continuous connection to the body as it slides the entire length of the top member of the body to uncover the opening.

2. The post of claim 1, wherein the cover is removably connected to the post.

3. The post of claim 1, further comprising a plurality of different covers connectable to the body so that the post has interchangeable covers.

4. The post of claim 2, wherein the cover further comprises a second electrical device that is selected from a group consisting of, but not limited to, a wireless speaker, a Bollard style LED light, a Pagoda Style Path light, an area path light, and any combinations thereof.

5. The post of claim 1, wherein the top member has a plurality of tracks on an exterior of the sidewall.

6. The post of claim 1, wherein the interior is accessible through the open front portion for installing/operating/removing the electrical device.

7. The post of claim 1, wherein the top member has depression in a top connection portion that connects to the base, and wherein the cover covers the electrical device in the closed position while allowing a plug wire to pass between the depression and the cover.

8. The post of claim 1, wherein the base and the top member are connected by snap or interference fit.

9. The post of claim 1, wherein the side wall of the cover has an outer perimeter that is the same shape as an outer perimeter of a top connection portion of the top member.

10. The post of claim 1, wherein the side wall of the cover moves vertically to slide between the closed position and the open position.

11. The post of claim 1, wherein the interior of the top member further comprises a plurality of bosses for connection of the electrical device.

12. The post of claim 1, wherein the base connects to a stabilizer that has four members of the same shape that connect around the base.

13. The post of claim 1, wherein, when the cover is in a closed position, one or more wires can conduct electricity to the cover.

14. The post of claim 1, further comprising a splash guard/insect guard attached to prevent water and insect ingress while the cover is in the closed position.

15. A post for holding an electrical device, comprising:

a body having an interior volume to hold the electrical device, the body having a base connected to a top member, the top member having a sidewall surrounding an interior that has an open front portion, the top member having a plurality of tracks on an exterior of the sidewall; and a cover that is slidable on the body between an open position to access the interior volume and a closed position covering the interior volume, the cover has a top wall and a side wall that extends from the top wall, the cover having an interior surface and an exterior surface, and the interior surface of the cover having a plurality of ridges that mate with the plurality of tracks of the top member.

16. The post of claim 15, wherein the plurality of tracks are each formed between two ridges on a sidewall of the top member.

17. The post of claim 16, wherein the interior surface of the cover has a plurality of protuberances, and wherein the top member has a plurality of top walls each between adjacent pair of tracks so that the plurality of protuberances are each urged against one of the plurality of top walls to pass over the one of the plurality of top walls so that the cover connects to the top member.

18. The post of claim 17, wherein the cover is disconnected from the top member by applying a sufficient force to the cover moving the cover away from the base to urge the plurality of protuberances over the one of the plurality of top walls.

19. The post of claim 15, wherein the top member has a plurality of ribs adjacent a top wall portion, and wherein the cover has a plurality of tabs extending from an interior surface of the top wall so that each of the plurality of tabs of the cover selectively mate with one of the plurality of ribs of the top member to maintain the cover in the closed position.

20. A post for holding an electrical device, comprising:

a body having an interior volume to hold the electrical device, the body having a base connected to a top member; and a cover that is slidable on the body between an open position to access the interior volume and a closed position covering the interior volume, the cover having a top wall and a side wall that extends from the top wall, the cover having one or more cover contacts and the top member having one or more electrical contacts, and, when the cover is in a closed position, the one or more electrical contacts can conduct electricity to the one or more cover contacts and, when the cover is in the open position, the one or more electrical contacts do not conduct electricity to the one or more cover contacts.

21. A post for holding an electrical device, comprising:

a body having an interior volume to hold the electrical device;

a cover that is slidable on the body between an open position to access the interior volume and a closed position covering the interior volume; and a first stabilizer bar and a second stabilizer bar that are each connected to the cover and move with the cover between the open position and the closed position, the first stabilizer bar and the second stabilizer bar extending from a bottom of the cover, the first stabilizer bar and the second stabilizer bar each remaining fixed relative to the cover while a portion of the first stabilizer bar moves through a first hole in the top member and a second portion of the second stabilizer bar moves through a second hole in the top member when the cover slides on the body between the open position and the closed position.

22. A post for holding an electrical device, comprising:

a body having an interior volume to hold the electrical device; and a cover that is movable from an open position to access the interior volume and a closed position covering the interior volume, the cover maintaining a continuous connection to the body as it slides between the open position and the closed position, the cover being removably connected to the post so that a plurality of different covers are connectable to the body, and each of the plurality of different covers incorporating a different accessory feature that is configured to receive electricity.

23. A post for holding an electrical device, comprising:

a body having an interior volume to hold the electrical device, the body having a top portion and a bottom portion, the bottom portion being configured to be buried in the ground; and a cover that is movable from an open position to access the interior volume and a closed position covering the interior volume, the cover maintaining a continuous connection to the body as it slides the entire length of the top member of the body to uncover the opening, and the cover being flush with the top portion and the bottom portion in the closed position.

* * * * *